US 8,077,562 B2

(12) United States Patent
Ezawa et al.

(10) Patent No.: US 8,077,562 B2
(45) Date of Patent: Dec. 13, 2011

(54) OPTICAL DISC DEVICE

(75) Inventors: Kozo Ezawa, Osaka (JP); Masahiro Inata, Hyogo (JP); Teruyuki Takizawa, Osaka (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 354 days.

(21) Appl. No.: 12/375,975

(22) PCT Filed: Apr. 18, 2008

(86) PCT No.: PCT/JP2008/001033
§ 371 (c)(1),
(2), (4) Date: Feb. 2, 2009

(87) PCT Pub. No.: WO2008/132827
PCT Pub. Date: Nov. 6, 2008

(65) Prior Publication Data
US 2009/0310460 A1  Dec. 17, 2009

(30) Foreign Application Priority Data

Apr. 19, 2007 (JP) .................................. 2007-110225
Sep. 10, 2007 (JP) .................................. 2007-233784

(51) Int. Cl.
*G11B 7/00* (2006.01)
(52) U.S. Cl. ..................... 369/44.19; 720/659; 720/661; 720/662; 720/672
(58) Field of Classification Search .... 369/44.17–44.19; 720/659, 661–662, 672
See application file for complete search history.

(56) References Cited

U.S. PATENT DOCUMENTS 4,403,316 A * 9/1983 van de Veerdonk .......... 720/662
5,682,364 A * 10/1997 Ogawa ....................... 369/30.81
6,404,726 B1 * 6/2002 Makita .......................... 369/222
7,191,456 B2 * 3/2007 Guo et al. ...................... 720/659

(Continued)

FOREIGN PATENT DOCUMENTS

EP       1 058 243        12/2000

(Continued)

OTHER PUBLICATIONS

International Search Report for corresponding Application No. PCT/JP2008/001033 mailed Jul. 29, 2008.

(Continued)

*Primary Examiner* — Lixi C Simpson
(74) *Attorney, Agent, or Firm* — Renner, Otto, Boisselle & Sklar, LLP

(57) ABSTRACT

An optical disc apparatus according to the present invention includes a disc rotation mechanism 2 for allowing an optical disc 1 having an information recording face to be placed thereon and rotating the optical disc 1; an optical pickup 3 including an engaging section and irradiating the information recording face with a light beam to perform at least one of information recording and information reproduction; a base main body 13 for rotatably supporting the optical pickup and having the disc rotation mechanism; a driving source 5, supported by the base main body, for generating a force for rotating the optical pickup; and a driving force transmission mechanism 610 supported by the base main body, including a worm, and engaged with the engaging section to transmit a driving force of the driving source to the optical pickup, thereby rotating the optical pickup. A distance between the engaging section and a rotating axis of the optical pickup is longer than a distance between the center of gravity of the optical pickup and the rotating axis of the optical pickup.

15 Claims, 38 Drawing Sheets

U.S. PATENT DOCUMENTS

| | | | |
|---|---|---|---|
| 2001/0012260 A1* | 8/2001 | Tamiya et al. | 369/192 |
| 2006/0053431 A1* | 3/2006 | Nakade et al. | 720/662 |
| 2006/0072388 A1* | 4/2006 | Rosmalen | 369/44.19 |

FOREIGN PATENT DOCUMENTS

| | | |
|---|---|---|
| JP | 61-064675 U1 | 5/1986 |
| JP | 63-074178 | 4/1988 |
| JP | 3024692 | 3/1996 |
| JP | 2000-222745 | 8/2000 |
| JP | 2000-339882 | 12/2000 |

OTHER PUBLICATIONS

Notice of Reasons for Rejection for corresponding Japanese Application No. 2009-511678 issued on Oct. 4, 2011 and a partial English translation thereof.

* cited by examiner

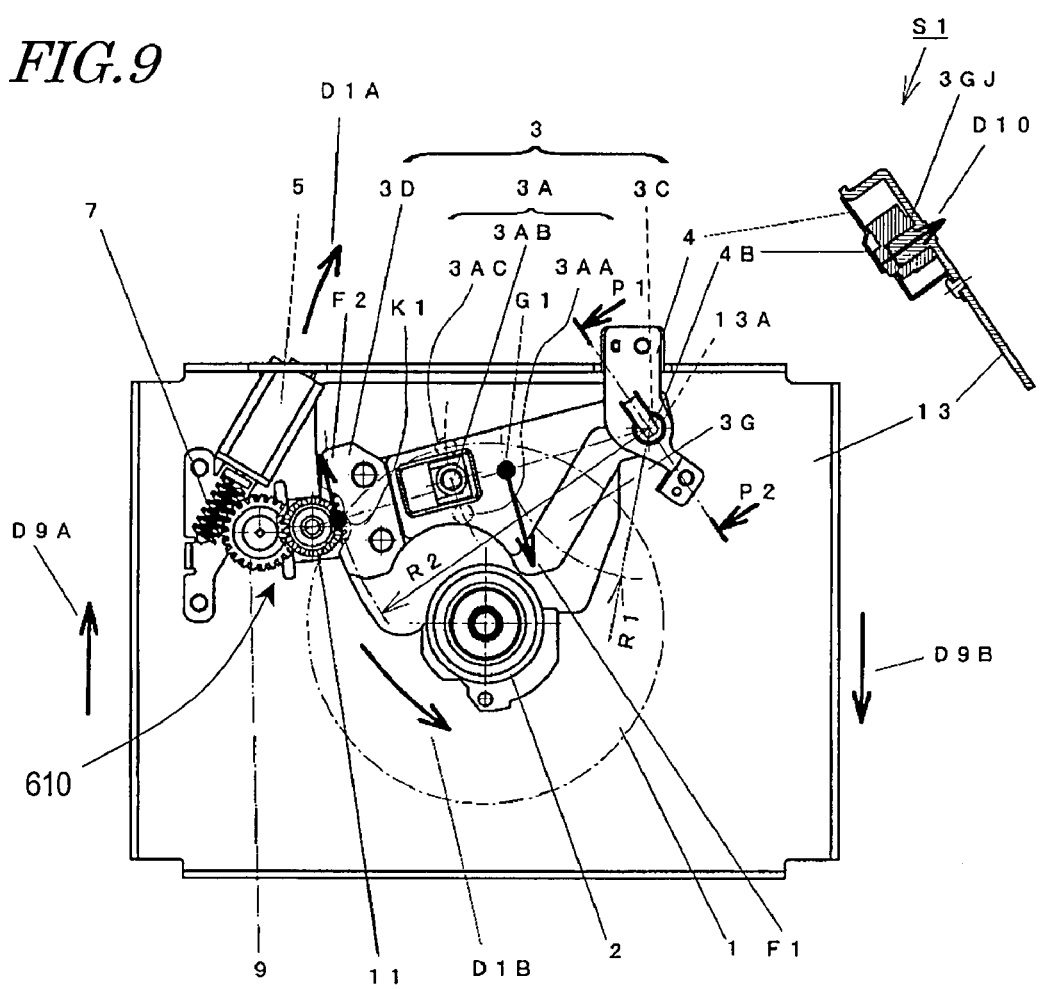
FIG.9
(a)
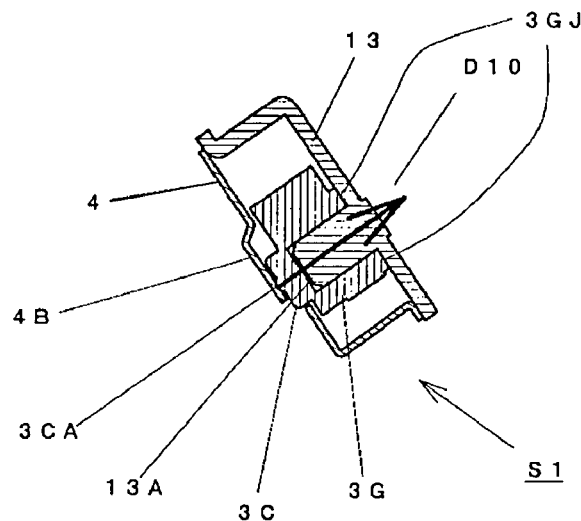
(b)

(a)

(b)

(a)

(b)

(a)

(b)

(a)

(b)

(a)

(b)

(a)

(b)

(a)

(b)

(a)

(b)

CONVENTONAL ART

OPTICAL DISC DEVICE

TECHNICAL FIELD

The present invention relates to an optical disc apparatus including a pickup for performing at least one of recording to a disc or reproduction from a disc.

BACKGROUND ART

Data recording and reproduction systems for recording, for example, video, audio or computer data on a disc-like recording medium and reproducing such data from a recording medium are widely used. Specifically, optical discs such as CDs (compact discs), DVDs (digital versatile discs), BDs (Blu-ray discs) and the like, and optical disc apparatuses compatible therewith; opto-magnetic discs such as MOs (magnetic optical discs), MDs (minidiscs) and the like, and opto-magnetic disc apparatuses compatible therewith; and magnetic discs such as FDs (floppy discs) and magnetic disc apparatuses compatible therewith are already in wide use in the society.

Because of the rapid increase of data amount of such information in recent years, a recording medium having a large capacity is desired. Among the above-mentioned recording and reproduction systems, those using optical discs or opto-magnetic discs use record data in the form of minute recording marks using a light beam, and reproduce data from reflected light obtained by irradiating recording marks with a light beam. Hereinafter, the optical discs and the opto-magnetic discs will be collectively referred to as "optical discs", and the optical disc apparatuses and the opto-magnetic disc apparatuses will be collectively referred to as "optical disc apparatuses".

In order to record data at a higher density using an optical disc, it is necessary to form a smaller recording mark. For this purpose, an optical disc apparatus needs to provide highly precise control on an optical pickup for irradiating an optical disc with a light beam to perform recording or reproduction, so that smaller recording marks can be accurately formed and data can be accurately read from the recording marks thus formed.

Such optical disc apparatuses are incorporated into a wide range mobile devices. A mobile device is carried around, or held or used at a position high from the ground or floor by a user. Hence, the user may inadvertently drop the mobile device. When this happens, an optical pickup, which is a moving mechanism in the optical disc apparatus, receives an impact force due to the dropping. A conventional optical disc apparatus for mobile devices has a structure for inhibiting malfunctioning which could otherwise occur due to such an impact force. Hereinafter, an example of such a conventional optical disc apparatus will be described. This structure is disclosed in, for example, Patent Document 1.

A conventional optical disc shown in FIG. 40 includes a turntable 101 for allowing a spindle motor 103 and a disc to be mounted thereon. The turntable 101 is rotated and driven by the spindle motor 103. FIG. 40 does not show the disc or any chucking member for securing the disc.

The optical disc apparatus further includes an optical pickup 105 for emitting a light beam to perform recording to, or reproduction from, the disc. The optical pickup 105 is guided by a main guide shaft 107A and a sub guide shaft 107B in a radial direction of the disc placed on the turntable 101. The main guide shaft 107A and the sub guide shaft 107B are supported by bearings 109A, 109B, 109C and 109D.

A transportation motor 111 is a driving source for transporting the optical pickup 105 in the radial direction of the disc placed on the turntable 101. A driving force obtained by the transportation motor 111 is transmitted to the optical pickup 105 by a lead screw 113 rotatable via a continuous spiral groove formed on a circumferential surface thereof and by a transmission member 115 engaged with the lead screw 113 to transmit a thrust for transporting the optical pickup 105 in the radial direction of the disc. A base member 117 supports these elements integrally.

In the structure shown in FIG. 40, the transportation motor 111 is driven to transport the optical pickup 105 in a direction of arrow D101A or arrow D101B, which is the radial direction of the disc. Thus, the optical pickup 105 performs a recording operation or a reproduction operation at an arbitrary radial position of the disc.

FIG. 41 shows a state in which the transmission member 115 and the lead screw 113 are engaged with each other. The transmission member 115 includes an engaging section 115A having teeth 115AB and 115AC engageable with a spiral groove 113A of the lead screw 113, and a regulating part 115B for preventing the teeth 115AB and 115AC from coming off from the spiral groove 113A.

Owing to the regulating part 115B, when the optical pickup 105 receives an excessive transportation force by an impact or the like in a transportation direction, the engaging section 115A is prevented from moving in a direction perpendicular to the transportation direction, and so the teeth 115AB and 115AC are prevented from coming off from the spiral groove 113A. Thus, such a situation that the transmission member 115 is disengaged from the lead screw 113 and the optical pickup 105 cannot be not driven is avoided.

Patent Document 1: Japanese Laid-Open Patent Publication No. 2002-339882

DISCLOSURE OF THE INVENTION

Problems to be Solved by the Invention

The conventional optical disc apparatus prevents the teeth 115AB and 115AC from coming off from the spiral groove 113A and thus avoids such a situation that optical pickup 105 cannot be not driven.

Meanwhile, when the optical disc apparatus receives an impact force in the direction of arrow D101A or arrow D101B shown in FIG. 40 and so a force F101 shown in FIG. 41 is applied on the optical pickup 105, a component force F102, which is a cosine component of the force F101, and a vertical drag N101, which is a reaction force thereto, are generated in accordance with an advancing angle A101 of the spiral of the spiral groove 113A as shown in FIG. 41. A value obtained by multiplying the vertical drag N101 by a static coefficient of friction is a frictional force R101 generated between each of the teeth 115AB and 115AC and the lead screw 113.

When the advancing angle A101 of the spiral increases, the component force F102 and the vertical drag N101 decrease and the frictional force R101 also decreases. As a result, a tangential force F103, which is a component force of the force F101 in a direction of groove face of the lead screw 113, may occasionally exceed a resultant of a force, for rotating the lead screw 113 associated with the transportation motor 111, and the frictional force R101. In this case, the lead screw 113 is rotated and as a result, the optical pickup 105 is transported in the direction of the force F101 to reach the limit of a movable range thereof. In the end, the optical pickup 105 collides against the base member 117 itself or any component integral with the base member 117. Thus, the moving precision of the optical pickup 105 in the radial direction may be undesirably reduced.

Even when the advancing angle A101 is sufficiently small, if the force F101 is excessively large, there may be an undesirable situation where the teeth 115A and 115AC are broken and the optical pickup 105 cannot be driven. Unless the rigidity of the transmission member 115 is sufficiently high, the regulating part 115B is plastically deformed and so cannot maintain the engagement between the teeth 115AB and 115AC and the spiral groove 113A.

Especially where the optical disc apparatus is small, the diameter of the lead screw 113 cannot be sufficiently large. Therefore, the above-described undesirable situations are likely to occur.

As described above, the conventional optical disc apparatus involves the problem that when the optical disc apparatus receives a large external impact in a moving direction of the optical pickup, the optical pickup 105 moves and damages which directly deteriorate the performance occur; for example, the internal components are broken or positional precision among the components is declined.

The present invention for solving such problems of the prior art has an object of providing an optical disc apparatus capable of preventing damages or performance deterioration even when receiving a large external impact force.

Means for Solving the Problems

An optical disc apparatus according to the present invention includes a disc rotation mechanism for allowing an optical disc having an information recording face to be placed thereon and rotating the optical disc; an optical pickup including an engaging section and irradiating the information recording face with a light beam to perform at least one of information recording and information reproduction; a base main body for rotatably supporting the optical pickup and having the disc rotation mechanism; a driving source, supported by the base main body, for generating a force for rotating the optical pickup; and a driving force transmission mechanism supported by the base main body, including a worm, and engaged with the engaging section to transmit a driving force of the driving source to the optical pickup, thereby rotating the optical pickup; A distance between the engaging section and a rotating axis of the optical pickup is longer than a distance between the center of gravity of the optical pickup and the rotating axis of the optical pickup.

In one preferable embodiment, the base main body includes a base shaft for rotatably holding the optical pickup; the optical pickup includes a pickup rotating hole for allowing the base shaft to be inserted thereto and having a bottom; and the base main body includes a shaft forcing part for forcing the optical pickup toward the base main body at a general axis of the base shaft in the state where the base shaft is inserted into the pickup rotating hole.

In one preferable embodiment, the base shaft has a tip contactable with the bottom of the pickup rotating hole; and the tip of the base shaft has a convexed spherical shape, and the bottom of the pickup rotating hole has a concaved spherical shape.

In one preferable embodiment, the base main body includes an engaging section forcing part for forcing optical pickup at the engaging section or the vicinity thereof toward a main surface of the base main body; and the optical pickup includes a roller contactable with the engaging section forcing part of the base main body and having a rotation axis in a direction perpendicular to the rotating axis of the optical pickup.

In one preferable embodiment, the spherical shape of the bottom of the pickup rotating hole has a radius larger than a radius of the spherical shape of the tip of the base shaft; and the bottom of the pickup rotating hole and the tip of the base shaft contact each other to determine the height of the optical pickup from the base main body.

In one preferable embodiment, the base main body includes a pickup holding section for, when at least one of the optical pickup, the base shaft and the base main body receives an external force, contacting the optical pickup so as to inhibit an axis of the base shaft from being inclined beyond a prescribed range and thus deformed.

In one preferable embodiment, the optical pickup includes a support boss provided coaxially with the rotating axis and projecting on the opposite side to the pickup rotating hole, and the pickup holding section inhibits the support boss from being inclined beyond a prescribed range and thus deformed.

In one preferable embodiment, the pickup holding section inhibits the optical pickup from moving away from the base main body beyond a prescribed range.

In one preferable embodiment, the optical pickup includes a weight in an area located opposite to the center of gravity of the optical pickup with respect to the rotating axis.

In one preferable embodiment, the base main body includes a first base including a first regulating part for rotatably supporting the optical pickup and regulating a movement of the optical pickup in a direction of the rotating axis; and a second base including a second regulating part for supporting the driving source and the driving force transmission mechanism and regulating a movement of the engaging section in the direction of the rotating axis.

In one preferable embodiment, the first base includes a base shaft for rotatably supporting the optical pickup and a shaft forcing part; the optical pickup includes a pickup rotating hole for allowing the base shaft to be inserted thereto and having a bottom; and the shaft forcing part forces the optical pickup toward the first base at a general axis of the base shaft in the state where the base shaft is inserted into the pickup rotating hole.

In one preferable embodiment, the disc rotation mechanism includes an attaching base face facing a main surface of the first base, and the attaching base face is interposed between the first base and the second base.

In one preferable embodiment, the second base is formed of a material having a lower specific gravity than that of the first base.

In one preferable embodiment, the optical pickup includes a pickup rotating hole outer cylinder projecting on the rotating axis, a pickup rotating hole provided inside the pickup rotating hole outer cylinder, a support boss projecting in the direction of the rotating axis on the opposite side to the pickup rotating hole outer cylinder, and a space provided between the pickup rotating hole outer cylinder and the support boss; and the base main body includes the first base having a support hole for receiving the support boss and a second base having a base shaft insertable into the pickup rotating hole.

In one preferable embodiment, the optical pickup includes an optical system including a light source, an optical element, and an objective lens; and an optical path of the optical system crosses the space.

In one preferable embodiment, the driving force transmission mechanism includes a worm wheel engageable with the worm and driven by the worm; and where the advancing angle of the worm is θ and the static coefficient of friction is μ, tan θ<μ.

In one preferable embodiment, the diameter of the disc is equal to or larger than 40 mm and equal to or smaller than 60 mm; and where the distance between the center of gravity of the entire optical pickup and the rotating axis of the optical pickup is R1 and the distance between the engaging section and the rotating axis of the optical pickup is R2, the relationship of R1<0.2×R2 is fulfilled.

In one preferable embodiment, the diameter of the disc is equal to or larger than 40 mm and equal to or smaller than 60 mm; and where the distance between the center of gravity of the entire optical pickup and the rotating axis of the optical pickup is R1, the distance between the engaging section and the rotating axis of the optical pickup is R2, and the distance between the center of gravity of the weight and the rotating axis of the optical pickup is R3, the relationship of R1<0.2×R2+0.6×R3 is fulfilled.

EFFECTS OF THE INVENTION

According to the present invention, the distance between the engaging section and the rotating axis of the optical pickup is longer than the distance between the center of gravity of the entire optical pickup and the rotating axis of the optical pickup. Therefore, when the entire apparatus receives an impact force in the rotating direction of the optical pickup, the force applied on the center of gravity of the optical pickup is divided into a component applied on the shaft for supporting the optical pickup and a component applied on the driving force transmission mechanism. As a result, the force applied on the driving force transmission mechanism is decreased. Therefore, the driving force transmission mechanism only needs to provide a small stopping force to prevent the optical pickup from rotating due to the impact force. The strength of the components or the entire structure of the driving force transmission mechanism can also be reduced.

Since the driving force transmission mechanism includes a worm, inverse transmission of the driving force toward the driving source can be avoided by a simple structure when the optical pickup receives an impact force in a rotation direction thereof.

BRIEF DESCRIPTION OF THE DRAWINGS

FIG. 9 (a) is a plan view showing an overall structure of the optical disc apparatus in Embodiment 1, and (b) is a cross-sectional view of (a) taken along line P1-P2.

DESCRIPTION OF THE REFERENCE NUMERALS

Figure 1:
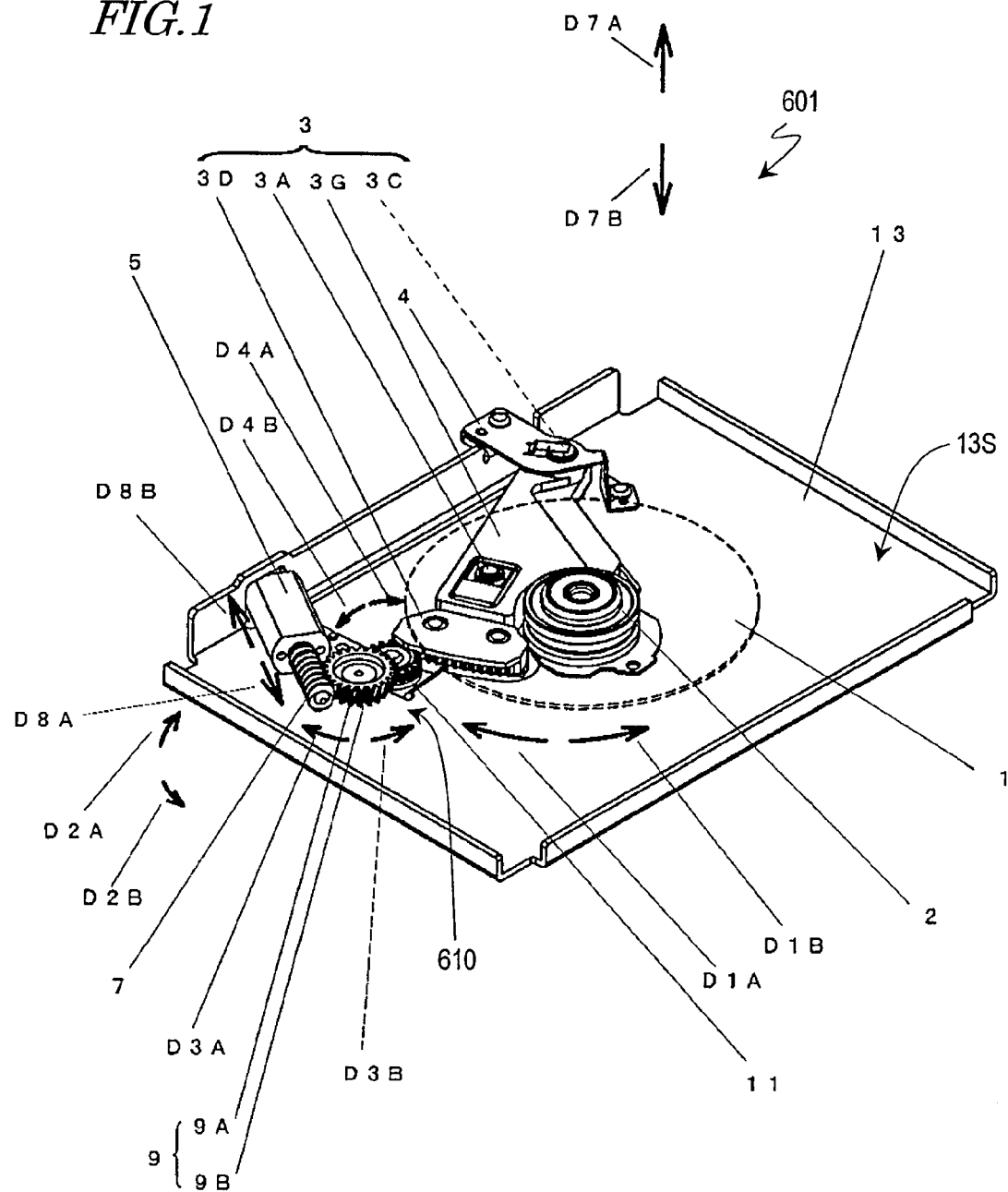
FIG. 1 shows an overall structure of an optical disc apparatus in Embodiment 1 according to the present invention.

1 Optical disc
2 Disc motor
3 Optical pickup
3A Objective lens
3AA Innermost circumferential position
3AB Middle circumferential position
3AC Outermost circumferential position
3B Pickup rotating hole
3C Support boss
3CA Projection
3D Pickup gear
3DA Pickup gear flange
3G Pickup gear base
3GJ Thrust bearing face
4 Pickup holding section
4A Support hole
4B Forcing part
5 Transportation motor
6 Motor base
6A Regulating part
7 Worm
7A Worm projection
9 Middle gear
9A Worm wheel part
9B Spur teeth part
9C Middle gear projection
11 Pickup driving gear
11A Pickup driving gear flange
11B Pickup driving gear rib
13 Base
13A Base shaft
15 Protective cover
15A Middle gear part
15B Pickup gear protective part
17 Contact
54 Second pickup holding section
64 Shaft forcing spring
200 Disc motor
211 Motor positioning boss
221 Motor positioning pin circular hole
222 Motor positioning pin rectangular hole
300 Optical pickup
310 Pickup base
311 Support boss
315 Pickup rotating hole
320 Pickup base
321BB Support boss
321BT Pickup rotating hole
321BJ Pickup rotating hole outer cylinder
330 Pickup gear
350 Balancing weight
351 Rotating balancer
360 Pickup roller
370A Gear fixing screw
370B Weight fixing screw
400 First base unit
410 First base
411 Base shaft
421 Motor positioning boss hole
431 Base positioning pin circular hole
432 Base positioning pin rectangular hole
500 Second base unit
510 Second base
511 Support hole
512 Forcing bearing face
513A Positioning pin
513B Positioning pin
517A Middle shaft
519A Driving gear shaft
530 Shaft forcing part
540 Transportation motor
550A Middle gear
550B Pickup driving gear
551 Base positioning pin
552 Base positioning pin
561 Rotating gear forcing part
570 Base fixing screw
600 Control circuit board
610 driving force transmission mechanism
670 Circuit board fixing screw
700 Disc cartridge
710A Positioning hole
710B Positioning hole
900 Second base unit
910 Second base
911J Rotating shaft
911K Assisting cylindrical part
911S Fixing screw hole
912 Forcing bearing face
913 Base fixing screw
915 Driving system
950 First base unit
951 first base
951A support hole
951B Thrust regulating face
980 Axis forcing part

BEST MODE FOR CARRYING OUT THE INVENTION

Embodiment 1

Hereinafter, an optical disc apparatus in Embodiment 1 according to the present invention will be described.

Figure 2:
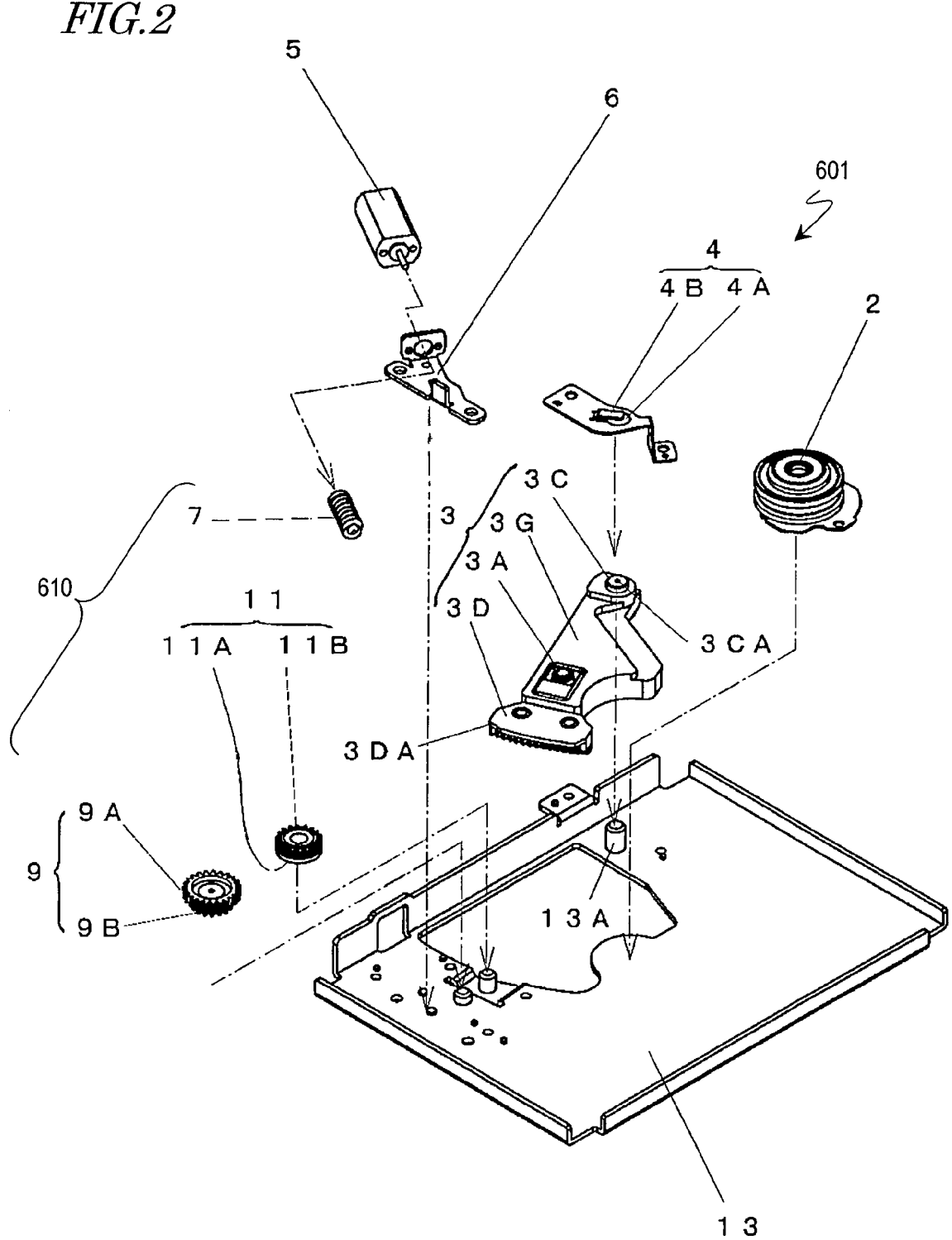
FIG. 2 is an exploded isometric view of the optical disc apparatus in Embodiment 1.

FIG. 1 is an isometric view showing an overall structure of an optical disc apparatus 601, and FIG. 2 is an exploded isometric view of the optical disc apparatus 601.

The optical disc apparatus 601 includes a disc motor 2, an optical pickup 3, a transportation motor 5, a driving force transmission mechanism 610, and a base main body 13.

The disc motor 2 is a disc rotation mechanism for allowing the optical disc 1 to be placed thereon and rotating the optical disc 1, and is supported by the base main body 13. The optical disc 1 is represented with the dashed line in FIG. 1, and a face thereof facing the optical pickup 3 is an information recording face.

The optical pickup 3 includes an objective lens 3A and irradiates the information recording face of the optical disc 1 placed on the disc motor 2 with a light beam through the objective lens 3A. By modulating the light beam in accordance with the information to be recorded, a recording mark or pit in accordance with the information to be recorded is formed on the information recording face of the optical disc 1. By irradiating the recording mark formed on the information recording face of the optical disc 1 with a light beam and thus detecting the reflected light, the optical pickup 3 reproduces information recorded on the optical disc 1.

Figure 3:
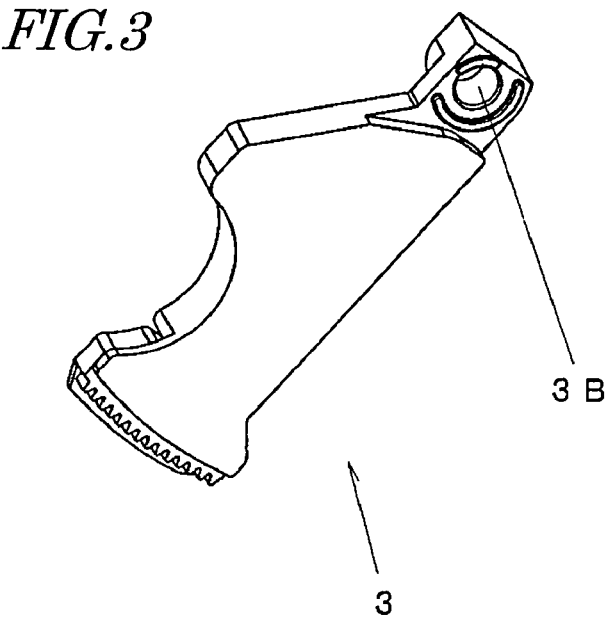
FIG. 3 is an isometric view showing an optical pickup in the optical disc apparatus in Embodiment 1.

FIG. 3 is an isometric view of the optical pickup 3 seen from the side on which the objective lens 3A is not provided. As shown in FIG. 3, a pickup rotating hole 3B is provided at one end of the optical pickup 3 in a general longitudinal direction thereof. As shown in FIG. 1 and FIG. 2, the optical pickup 3 includes a pickup gear 3D at the other end in the longitudinal direction thereof. The pickup gear 3D is an engaging section engageable with the driving force transmission mechanism 610 and includes a spur gear.

Figure 4:
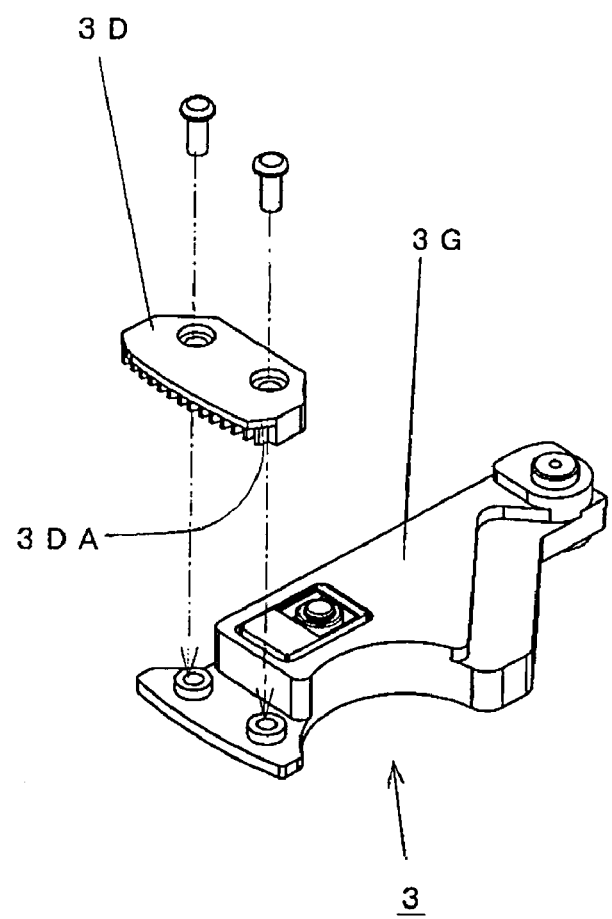
FIG. 4 is an exploded isometric view of the optical pickup in the optical disc apparatus in Embodiment 1.

Preferably, the pickup gear 3D is formed of a material suitable for a gear. Therefore, as shown in FIG. 2 and FIG. 4, the optical pickup 3 preferably includes a pickup base 3G and the pickup gear 3D separate from the pickup base 3G. The pickup gear 3D is fixed to the pickup base 3G via screws. Preferably, the pickup gear 3D includes a flange 3DA.

The base main body 13 has a main surface 13S, and a shaft-like base shaft 13A is provided on the main surface 13S. By inserting the base shaft 13A into the pickup rotating hole 3B, the base main body 13 supports the optical pickup 3 such that the optical pickup 3 is rotatable centering on a rotating axis, which is the axis of the base shaft 13A, in a direction of arrow D1A or arrow D1B.

Preferably, the base main body 13 includes a pickup holding section 4. As shown in FIG. 2, the pickup holding section 4 includes a flat part having a support hole 4A and an forcing part 4B, and a support boss 4C provided in the optical pickup 3 is inserted into the support hole 4A. When the optical pickup 3 inserted to the base shaft 13A receives an external force, the contact of an inner circumferential face of the support hole 4A of the flat part and the support boss 3C restricts the axis of the base shaft 13A from being inclined beyond a prescribed range and thus deformed. The contact of an outer circumferential face of the support boss 3C of the optical pickup 3 and the flat part of the pickup holding section 4 restricts the optical pickup 3 from being separated from the main surface 13S of the base main body 13 beyond a prescribed range.

The forcing part 4B contacts a semispherical projection 3CA provided on a top face of the support boss 3C in a point contact state and forces the base shaft 13A toward the main surface 13S of the base main body 13 in the axial direction of the base shaft 13A. The projection 3CA is provided to reduce the frictional resistance at the time of rotating. In this embodiment, it is preferable that the flat part and the forcing part 4B of the pickup holding section 4 are integrally formed. By forming the entire pickup holding section 4 of a spring material such as SUS301CSP or the like, the spring characteristic of the forcing part 4B can be exhibited effectively.

The transportation motor 5 is a driving source for generating a driving force to rotate the optical pickup 3, and generates a rotation force. As shown in FIG. 2, the transportation motor 5 is attached to the base main body 13 in the state of being held on a motor base 6. In FIG. 1, the motor base 6 is not shown to avoid complication.

The driving force transmission mechanism 610 includes a worm 7, a middle gear 9, and a pickup driving gear 11. The worm 7 is fixed to a shaft of the transportation motor 5 and rotates in a direction of arrow D2A or arrow D2B. Preferably, the mid gear 9 has a stepped gear structure including a worm wheel part 9A engageable with the worm 7 and a spur teeth part 9B.

Figure 5:
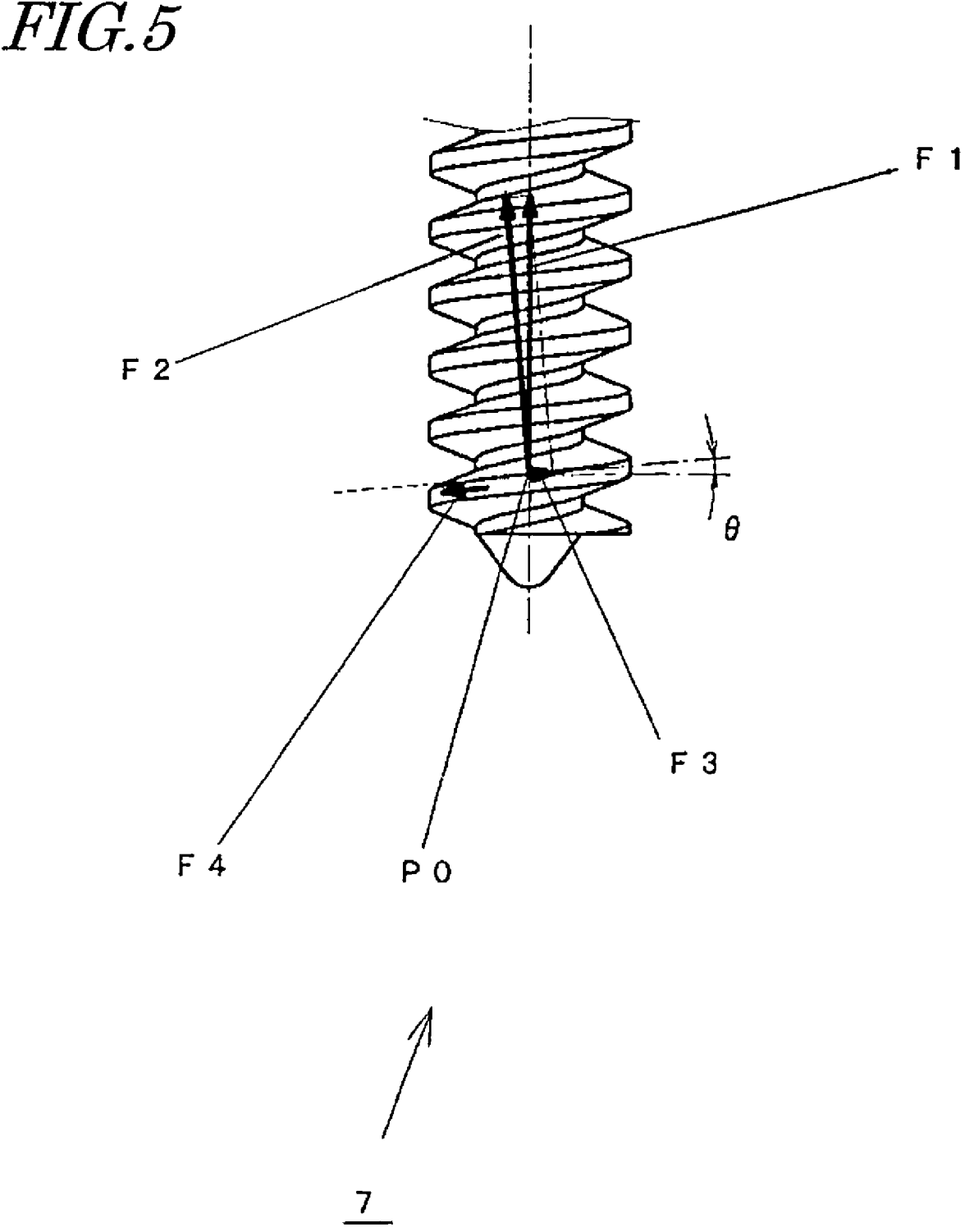
FIG. 5 shows a force acting on a worm in the optical disc apparatus in Embodiment 1.

The worm wheel part 9A of the middle gear 9 is driven by rotating the worm 7. It is preferable that an advancing angle of the worm 7 is set to be sufficiently small such that the mid gear 9 does not drive the worm 7 inversely. With reference to FIG. 5, the advancing angle of the worm 7 will be described. As shown in FIG. 5, an engaging point of the worm 7 and the worm wheel part 9A (not shown) is labeled as P0. An inverse driving force applied from the worm wheel part 9A to the engaging point P0 in a direction parallel to the axis of the worm 7 is labeled as F1, a component force of the inverse driving force F1 which is applied in a direction perpendicular to the tooth face is labeled F2, a tangential force in a circumferential direction of the worm 7 is labeled as F3, an advancing angle of the worm 7 is labeled as θ, and a frictional force between the tooth face of the worm 7 and the tooth face of the worm wheel part 9A based on the vertical drag by the component F2 is labeled as F4. The static coefficient of friction is labeled as μ. A condition for preventing the inverse driving force F1 from rotating the worm 7 is represented by the following expression 1.

$$F3 < F4 \qquad \text{expression 1}$$

In this case, F3 and F4 are respectively represented by the following expressions 2 and 3.

$$F3 = F1 \cdot \sin\theta \qquad \text{expression 2}$$

$$F4 = \mu \cdot F2 \qquad \text{expression 3}$$

F2 is represented by the following expression 4.

$$F2 = F1 \cdot \cos\theta \qquad \text{expression 4}$$

Accordingly, from expressions 3 and 4, the following expression 5 is derived.

$$F4 = \mu \cdot F1 \cdot \cos\theta \qquad \text{expression 5}$$

From expressions 1, 2 and 5, the following expression 6 holds true.

$$\sin\theta < \mu \cdot \cos\theta \qquad \text{expression 6}$$

Accordingly, the following expression 7 is derived.

$$\mu > (\sin\theta / \cos\theta) = \tan\theta \qquad \text{expression 7}$$

It is seen from the above that as long as the advancing angle θ is in the range represented by expression 7, the inverse driving does not occur regardless of the value of F1. Since the driving force transmission mechanism includes the worm, the inverse transmission of the driving force toward the driving source can be avoided by a simple structure when the optical pickup receives an impact force in a rotation direction thereof.

As shown in FIG. 1 and FIG. 2, the pickup driving gear 11 includes a spur gear, which is engageable with the spur teeth part 9B of the middle gear 9. The pickup driving gear 11 is also engageable with the pickup gear 3D of the optical pickup 3. When the middle gear 9 rotates in a direction of arrow D3B or arrow D3A, the pickup driving gear 11 transmits the driving force in a direction of arrow D4A or arrow D4B. Thus, the optical pickup 3 engaged with the pickup driving gear 11 via the pickup gear 3D rotates in the direction of arrow D1B or arrow D1A. The pickup driving gear 11 includes a pickup driving gear flange 11A for preventing the pickup driving gear 11 engaged with the optical pickup 3 from coming off in a direction of arrow D7A. A rib 11B is provided on an end face of the pickup driving gear 11 in order to avoid the interference between the flange 3DA (FIG. 4) of the pickup gear 3D and the teeth of the pickup driving gear 11.

The pickup driving gear 11 and the pickup gear 3D are engaged with each other via spur gears thereof. Therefore, while the pickup driving gear 11 and the pickup gear 3D are being driven, no force is generated in a direction parallel to the spur gears (i.e., an axial direction of the pickup driving gear 11 and the pickup gear 3D). Thus, such a situation can be avoided that, for example, the optical pickup 3 is unnecessarily moved or vibrated in a direction parallel to the rotating axis thereof while the pickup gear 3D is driven by the pickup driving gear 11.

In this embodiment, as shown in FIG. 1 and FIG. 2, the worm 7 is twisted rightward and the worm wheel part 9A is also twisted rightward. Therefore, as shown in FIG. 1, when the transportation motor 5 rotates in the direction of arrow D2A, the worm 7 receives a force in directions of arrow D7A and arrow D8B, and the worm wheel part 9A receives a force in a direction of arrow D7B. When the transportation motor 5 rotates in the direction of arrow D2B, the worm 7 receives a force in directions of arrow D7B and arrow D8A, and the worm wheel part 9A receives a force in a direction of arrow D7A.

When the worm 7 receives a force for moving in a direction of arrow D8A, the force acts in such a direction that the shaft of the transportation motor 5 comes off. This applies a load on internal components of the transportation motor 5. Therefore, the force in this direction needs to be counteracted. When the worm 7 receives a force for moving in a direction of arrow D7A, the middle gear 9 may come off. Therefore, the force in this direction also needs to be counteracted.

Figure 6:
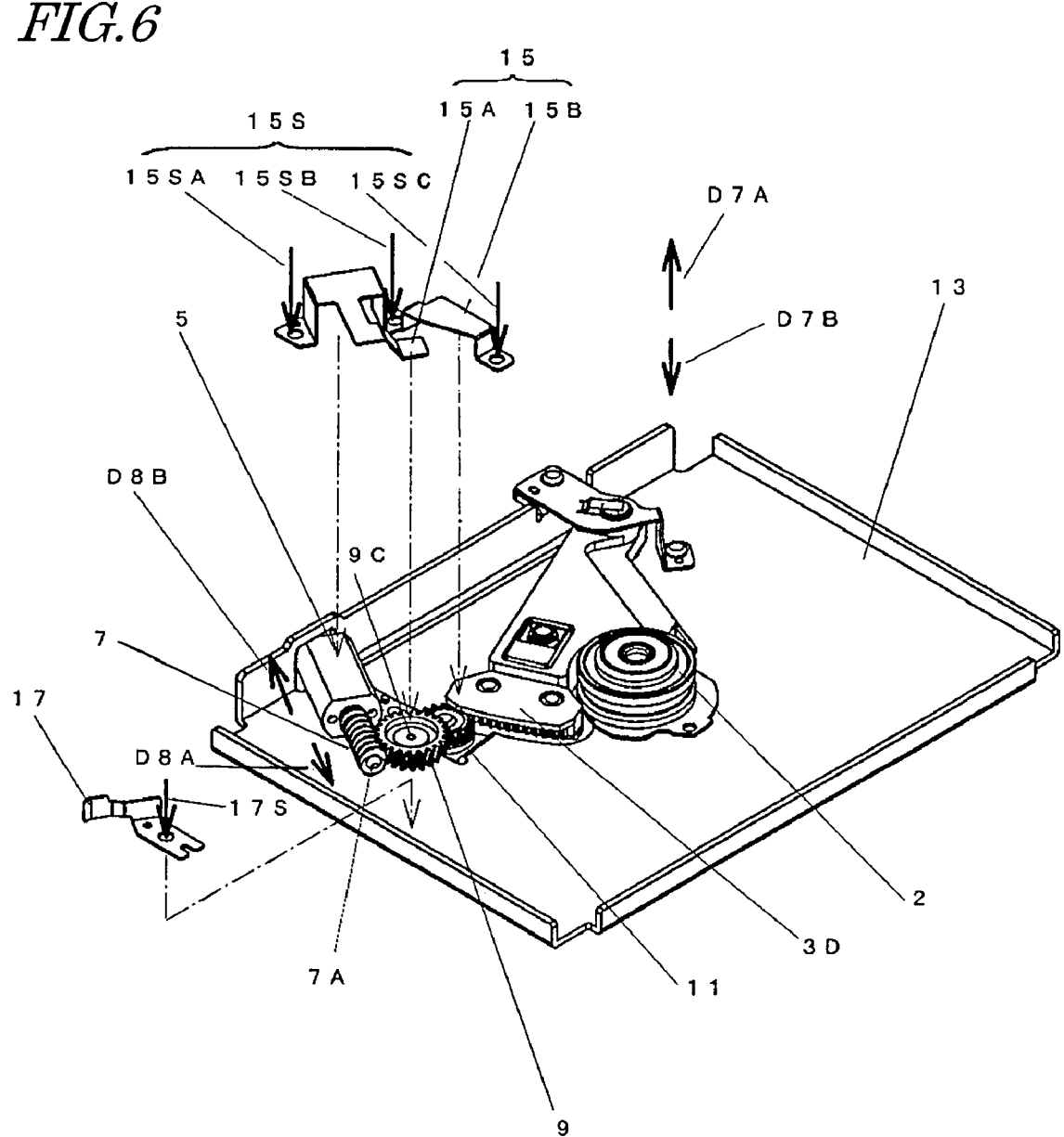
FIG. 6 is an isometric view showing a protective cover and a contact in the optical disc apparatus in Embodiment 1.
Figure 7:
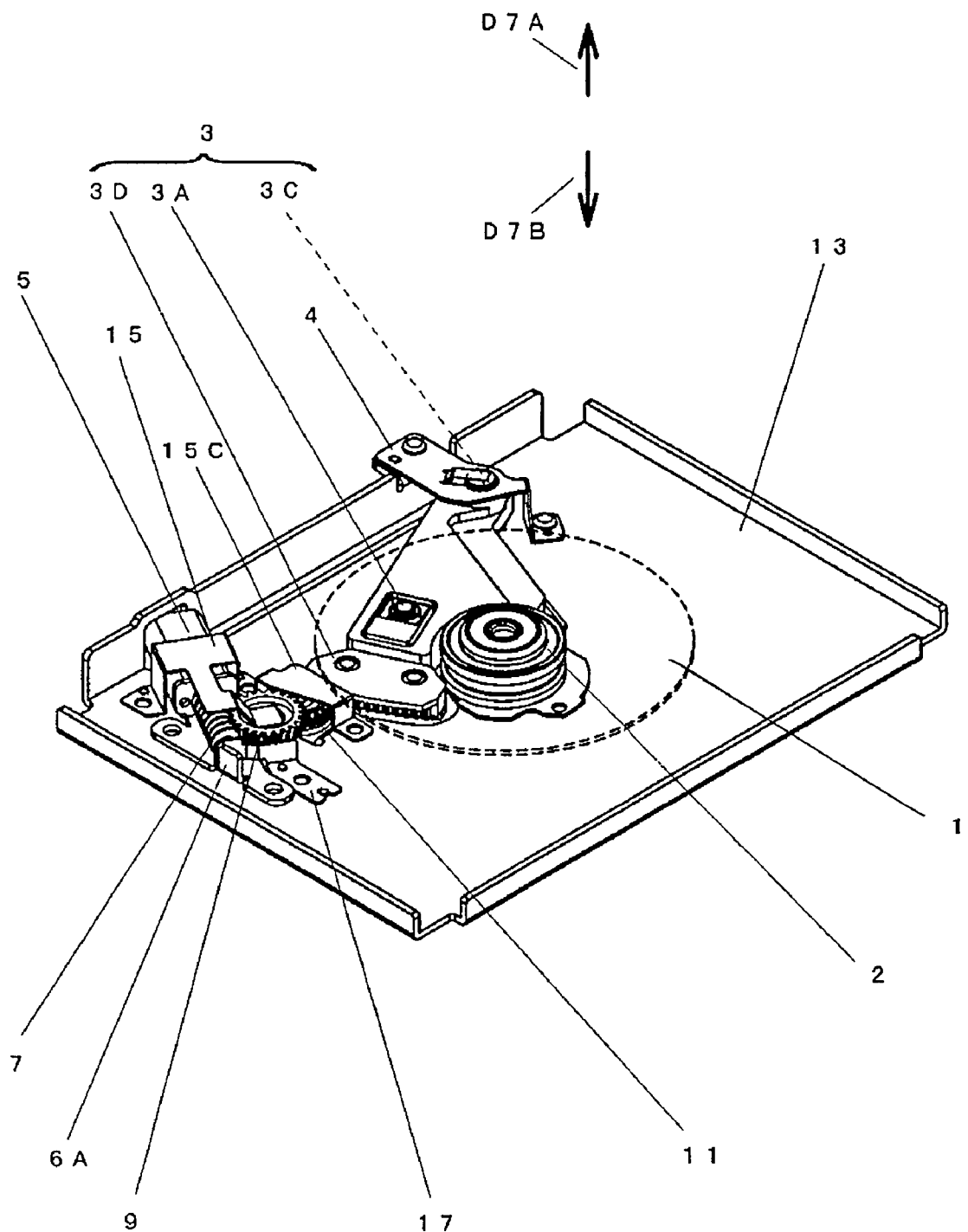
FIG. 7 shows an overall structure of the optical disc apparatus in Embodiment 1.

In this embodiment, in order to counteract these forces, the base main body 13 is preferably provided with a protective cover 15 and a contact 17 as shown in FIG. 6. The protective cover 15 is fixed to the base main body 13 at three positions 15S (15SA, 15SB and 15SC), and the contact 17 is fixed to the base main body 13 at a position 17S, via a tightening member such as screws or the like. The protective cover 15 includes a middle gear part 15A for covering the middle gear 9 from the top and a pickup gear protective part 15B for covering the engaging section of the pickup gear 3D and the pickup driving gear 11 and the vicinity thereof from the top. The middle gear part 15A and the pickup gear protective part 15B are integrally formed. The worm 7 and the middle gear 9 respectively include a worm projection 7A and a middle gear projection 9C. These are specific parts to be in contact with the contact 17 and the middle gear part 15A. FIG. 7 shows a state where the contact 17 and the protective cover 15 are attached to the base main body 13.

As shown in FIG. 1, when an external force other than the driving force from the pickup driving gear 11 gives a force acting to rotate the optical pickup 3 in the direction of arrow D1A or arrow D1B, a force is generated by the pickup gear 3D to rotate the pickup driving gear 11 in the direction of arrow D4B or arrow D4A. Then, a force is generated to rotate the middle gear 9 in the direction of arrow D3A or arrow D3B. Therefore, the middle gear 9 receives a force for causing itself to move in the direction of arrow D7B or arrow D7A, and the worm 7 receives a force for causing itself to move in the direction of arrow D8B or arrow D8A. The contact 17 and the protective cover 15 can counteract the force to move the worm 7 in the direction of arrow D8A and the force to move the middle gear 9 in the direction of arrow D7A as described above. Therefore, the load on the internal components of the transportation motor 5 can be prevented, and the middle gear 9 can be prevented from coming off.

The contact 17 and the protective cover 15, when being attached to the base main body 13 and in contact with the worm projection 7A and the middle gear projection 9C respectively, can completely prevent the worm 7 from moving in the direction of arrow D8A and prevent the middle gear 9 from moving in the direction of arrow D7A. However, in actuality, there is a size error in the axial direction in both cases. In order to accommodate the error, a slight gap needs to be made. In this case, it is preferable that the contact 17 and the at least the middle gear part 15A of the protective cover 15 are formed of an elastic material and these parts are forced in a direction toward, and in contact with, the worm projection 7A and the middle gear projection 9C. Thus, the size error can be accommodated. In this case, a regulating part 6A for regulating the bending of the contact 17 may be provided on the motor base 6 as shown in FIG. 7. Thus, excessive bending of the contact 17 can be avoided.

Figure 8:
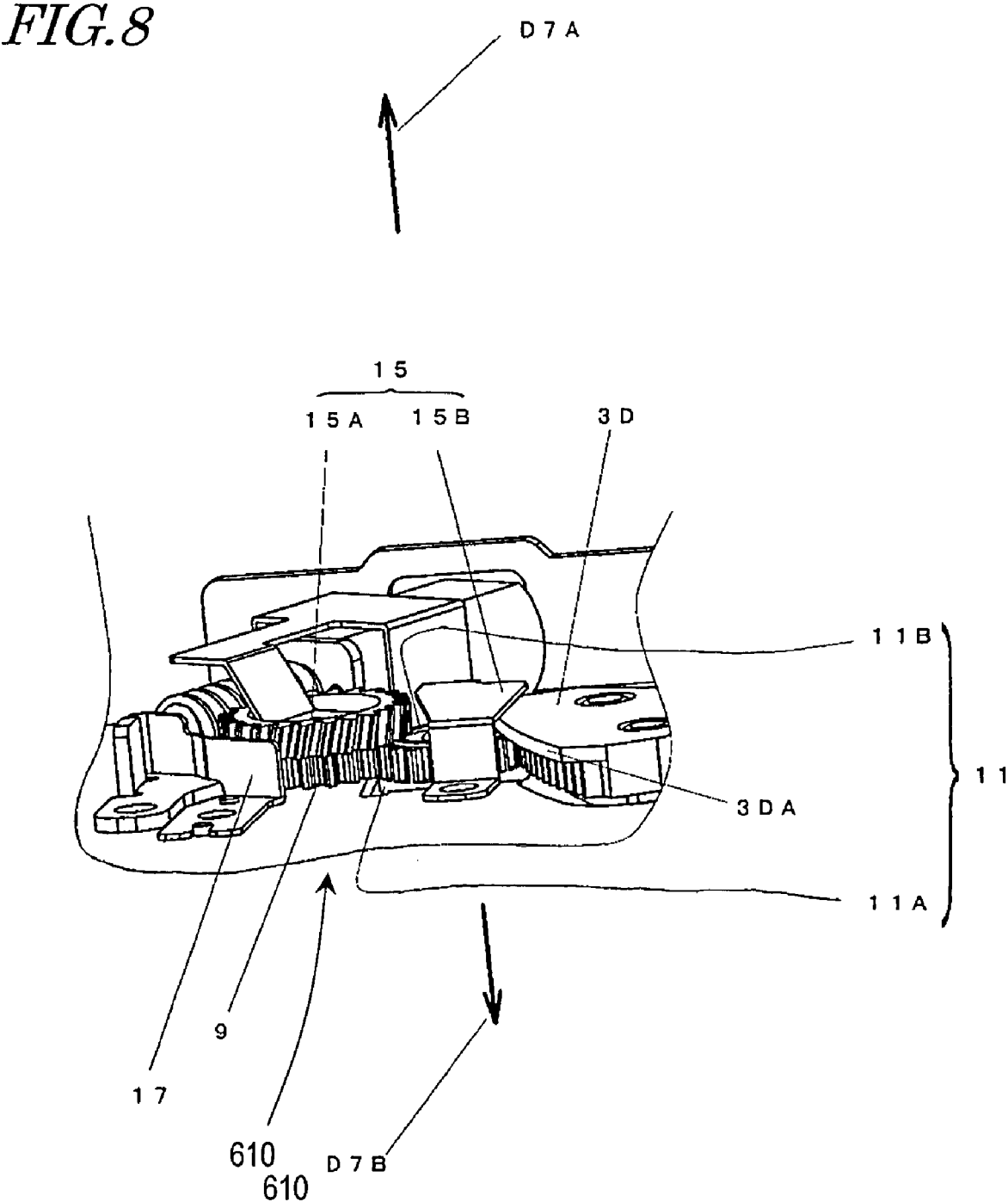
FIG. 8 is an isometric view showing a driving force transmission mechanism in the optical disc apparatus in Embodiment 1.

FIG. 8 is an isometric view showing the driving force transmission mechanism 610 and the vicinity thereof in enlargement. As shown in FIG. 8, the pickup gear protective part 15B covers an end of the pickup gear 3D at the position of the pickup driving gear 11. Therefore, wherever the optical pickup 3 may be located as a result of rotating, the pickup gear 3D is positioned between the pickup gear protective part 15B and the pickup driving gear flange 11A. Thus, the pickup gear 3D is regulated so as not to move in either direction of arrow D7A or arrow D7B. This means that the entirety of the optical pickup 3 is regulated so as not to move in either direction of arrow D7A or arrow D7B. The pickup gear 3D and the pickup gear protective part 15B may have a gap therebetween or may be in contact with each other. It is preferable to provide a certain size of gap because when the pickup gear 3D and the pickup gear protective part 15B are in contact with each other, a large frictional load is applied on the optical pickup 3 during the transportation of the optical pickup 3.

Now, with reference to FIG. 9(a) and FIG. 9(b), how the structure of the optical disc apparatus 601 can prevent the elements thereof from being damaged due to an impact caused by an external force when such an external force is applied will be described.

FIG. 9(a) is a plan view of the optical disc apparatus 601 in the state shown in FIG. 1 seen in the direction of arrow D7B. In order to clearly show the engaging state of the pickup gear 3D, the pickup driving gear 11 and the middle gear 9, the contact 17 and the protective cover 15 are omitted. As shown in FIG. 9(a), the optical pickup 3 rotates in the range of about 20 degrees, in which the objective lens 3A moves from a position corresponding to an innermost circumferential position 3AA of the optical disc 1 via a position corresponding to a middle circumferential position 3AB up to a position corresponding to an outermost circumferential position 3AC.

In FIG. 9(a), S1 is a partial cross-sectional view taken along line P1-P2. FIG. 9(b) is an enlarged view of S1. As shown in FIG. 9(b), the forcing part 4B of the pickup holding section 4 forces the support boss 3C via the projection 3CA in a direction of arrow D10, i.e., toward the main surface of the base main body 13.

In a usual state, an inner circumferential face of the support hole 4A and an outer circumferential face of the support boss 3C have a gap therebetween so as not to contact with other. This is for accommodating an axial shift, caused by an assembly error, between the base shaft 13A and the support hole 4A in the state where the pickup holding section 4 is attached to the base main body 13. This gap is set to have a size in such a range that even when at least a part of the inner circumferential face of the support hole 4A and at least a part of the outer circumferential face of the support boss 3C contact each other, the base main body 13, the pickup base 3G and the base shaft 13A can all be regulated not to deform beyond the elastic deformation region of the respective material. Thus, the base main body 13, the pickup base 3G and the base shaft 13A can be prevented from being plastically deformed beyond the respective elastic deformation amount. Namely, even if these components are deformed by an external impact, the deformation can be restricted to the respective elastic deformation region, and these components are protected against being broken.

Preferably, the pickup base 3G has a thrust bearing face 3GJ. The thrust bearing face 3GJ is used as the reference in a height direction with respect to the base main body 13 of the optical pickup 3.

As shown in FIG. 9(a), in the optical disc apparatus 601, the distance between the pickup gear 3D and the rotating axis of the optical pickup 3 is longer than the distance between the center of gravity G1 of the entire optical pickup 3 and the rotating axis of the optical pickup 3. Therefore, when the entire apparatus receives an impact force in the rotating direction the pickup, the force applied on the center of gravity of the optical pickup 3 is divided into a component applied on the base shaft 13A and a component applied on the driving force transmission mechanism 610. As a result, the force applied on the driving force transmission mechanism 610 is alleviated. Hence, the driving force transmission mechanism 610 only needs to provide a small stopping force to prevent the optical pickup 3 from rotating due to the impact force. Thus, the strength of the components or the entire structure of the driving force transmission mechanism 610 can be reduced.

Hereinafter, the strength will be calculated specifically. As shown in FIG. 9(a), the position of the center of gravity of the optical pickup 3 in a direction parallel to the recording face of the optical disc 1 placed on the disc motor 2 is labeled as G1. The position of the engaging point of the pickup gear 3D and the pickup driving gear 11 is labeled as K1. The distances from the positions G1 and K1 to the rotating axis of the optical pickup 3 are respectively labeled as R1 and R2. R1 is also a rotating radius when the center of gravity rotates centering on the rotating axis of the optical pickup 3. R2 is also a radius of an engaging pitch circle of the pickup gear 3D.

It is assumed that, for example, the entire apparatus receives an impact force in a direction of arrow D9B and the tangential force F1 acts at the center of gravity G1. At this point, moment M1 represented by the following expression 8 is generated.

$$M1=F1 \cdot R1 \quad \text{expression 8}$$

Moment M2 at the engaging point position K1 generated by the tangential force F2 of a reaction force which is caused from the pickup driving gear 11 to the pickup gear 3D against the moment M1 is represented by the following expression 9.

$$M2=F2 \cdot R2 \quad \text{expression 9}$$

A condition for preventing the optical pickup 3 from rotating in the direction of arrow D1B even when the moment M1 is generated can be represented by the following expression 10.

$$M1<M2 \quad \text{expression 10}$$

This condition may be represented by the following expression 11 from expressions 8 through 10.

$$F2>F1 \cdot R1/R2 \quad \text{expression 11}$$

Namely, when the entire apparatus receives an impact force in the direction of arrow D9B, in order to protect the pickup gear 3D and the pickup driving gear 11 against being broken at the engaging point position K1, the teeth of the pickup gear 3D and the pickup driving gear 11 need to have a strength equal to or larger than F2, which fulfills the condition of expression 11.

Expression 11 indicates that when the tangential force F1 acts on the optical pickup 3, the force received by the pickup gear 3D and the pickup driving gear 11 is reduced to F1·R1/R2. Accordingly, when the entirety of the optical disc apparatus 601 receives an impact force in the direction of arrow D9B, the impact force received by the optical pickup 3 is received by the pickup gear 3D, the pickup driving gear 11 and gears on a later stage in a relaxed state. Therefore, the gears can be protected against disengagement or breaking of teeth or the like. In addition, the rotating of the optical pickup 3 is prevented. As a result, such a situation can be prevented that the optical pickup 3 moves to the limit of the movable range without being regulated and collides against the component such as the base main body 13 or the like to damage the optical pickup 3 itself, the components thereof, or joints of the components.

Now, the magnitude of the impact force received by the optical disc apparatus 601 will be described with specific examples. For example, the outer diameter $D_d$ of the disc used in this embodiment is set to be equal to or larger than about 40 mm and equal to or smaller than about 60 mm. According to the design of the present inventors, the weight of the optical pickup 3 is about 5 g to 7 g.

Where the outer diameter $D_d$ of the disc is in the above-mentioned range, the gear module m of the pickup driving gear 11 and the pickup gear 3D as a general designing element is set to m=0.4 in consideration of the transportation precision of the like. It is assumed that the number of teeth of the pickup driving gear 11 is 18, the pitch circle diameter of the pickup driving gear 11 is $PCD_{11}=7.2$ mm, the number of teeth of the pickup gear 3D (corresponding to the entire circumference) is 218, and the pitch circle diameter of the pickup gear 3D is $PCD_{3D}=87.2$ mm) (=R2×2). According to a handbook (for example, the tooth form factor table shown in "Duracon (registered trademark)" technology series, Gear, Polyplastics Co., Ltd. issued on Feb. 1, 1996; Duracon (registered trademark) is a trade name of a polyacetal resin) or the like, the tooth form factor in the above case is: in the pickup driving gear 11, $Y'_{11}$=about 0.52, and in the pickup gear, $Y'_{3}$=about 0.80. Considering the thickness of the apparatus based on the balance with the outer diameter of the disc at this point, the width of the gear of each of the pickup driving gear 11 and the pickup gear 3D is: $b_{11}=2$ mm and $b_{3D}=2$ mm.

Where, for example, a polyacetal resin having high slidability is used for the material of the pickup driving gear 11 and the pickup gear 3D, the bending strength of the material is $\sigma_{POM}=8$ to 12 kgf/mm² approximately.

Using the above conditions, the tolerable tangential forces $F_{11}$ and $F_{30}$ at the foot of the teeth of the pickup driving gear 11 and the pickup gear 3D can be represented by expressions 12 and 13.

$$F_{11}=\sigma_{POM} \cdot b_{11} \cdot m \cdot Y'_{11} \quad \text{expression 12}$$

$$F_{3D}=\sigma_{POM} \cdot b_{3D} \cdot m \cdot Y'_{3D} \quad \text{expression 13}$$

By substituting the above set values into expressions 12 and 13, expressions 14 and 15 are obtained.

$$F_{11}\approx 3.5 \text{ to } 5.00 \text{ kgf} \quad \text{expression 14}$$

$$F_{3D}\approx 5.0 \text{ to } 7.5 \text{ kgf} \quad \text{expression 15}$$

Accordingly, under the above conditions, when F2 is equal to or lower than about 3.5 kgf, the pickup driving gear 11 and the pickup gear 3D of the driving force transmission mechanism 610 can be protected against being broken. Namely, F2 needs to fulfill the following expression 16.

$$F2 < 3.5 \text{ kgf} \quad \text{expression 16}$$

From expressions 11 and 16, expression 17 holds true under the above conditions.

$$F1 \cdot R1/R2 < 3.5 \text{ kgf} \quad \text{expression 17}$$

Namely, expression 18 is obtained.

$$R1 < (3.5/F1) \cdot R2 \text{ mm} \quad \text{expression 18}$$

In the case of a small apparatus suitable to mobile phones as in this embodiment, it is expected that the apparatus is dropped by the user from a height of 1 to 1.5 m in use. The experiments performed by the present inventors have revealed that in such a case, a shock acceleration of 10,000 to 30,000 m/s$^2$ (1,020 to 3,060 G) is applied on the apparatus. Where the weight of the optical pickup 3 is 5 to 7 g as described above, the impact force F1 applied on the center of gravity G1 is as represented by expression 19.

$$F1 = 5.1 \text{ to } 21 \text{ kgf} \quad \text{expression 19}$$

Based on expression 18, R1 as represented by expression 20 is obtained in consideration of the range of F1.

$$R1 < 0.2 \cdot R2 \text{ mm} \quad \text{expression 20}$$

For example, under the above conditions, where R2 (the radius of the engaging pitch circle of the pickup gear 3D)=43.6 mm (=1.5 to 2.2 $D_d/2$) and R1 (the rotating radius of the center of gravity G1 of the optical pickup 3) is equal to or smaller than about 8 mm, expression 20 holds true when the diameter of the disc used is 40 to 60 mm (=0.8·R2 to 1.4·R2). Accordingly, it is seen that even when the optical disc apparatus 601 is dropped from a height of about 1.5 m, neither pickup driving gear 11 nor the pickup gear 3D is broken and the optical pickup 3 can be prevented from rotating due to the impact force generated by the dropping.

Embodiment 2

Hereinafter, an optical disc apparatus in Embodiment 2 according to the present invention will be described.

Figure 10:
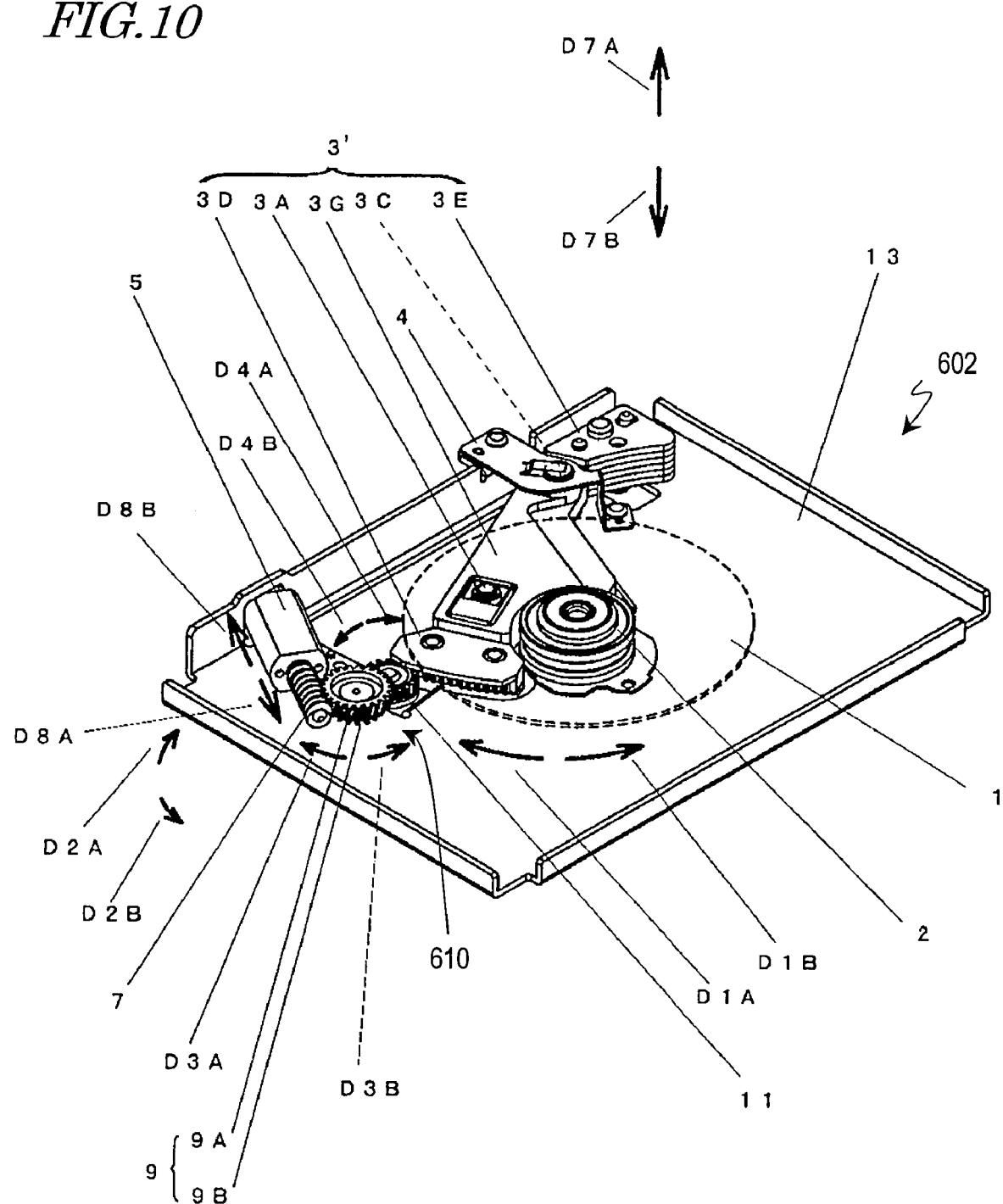
FIG. 10 is an isometric view showing an overall structure of an optical disc apparatus in Embodiment 2 according to the present invention.

FIG. 10 is an isometric view showing a structure of an optical disc apparatus 602. Unlike in Embodiment 1, the optical disc apparatus 602 includes an optical pickup 3' including a balancing weight 3E. As shown in FIG. 10, the structures and functions of the disc motor 5, the driving force transmission mechanism 610, the pickup holding section 4 and the components of the optical pickup 3' other than the balancing weight 3E are as described in Embodiment 1.

Figure 11:
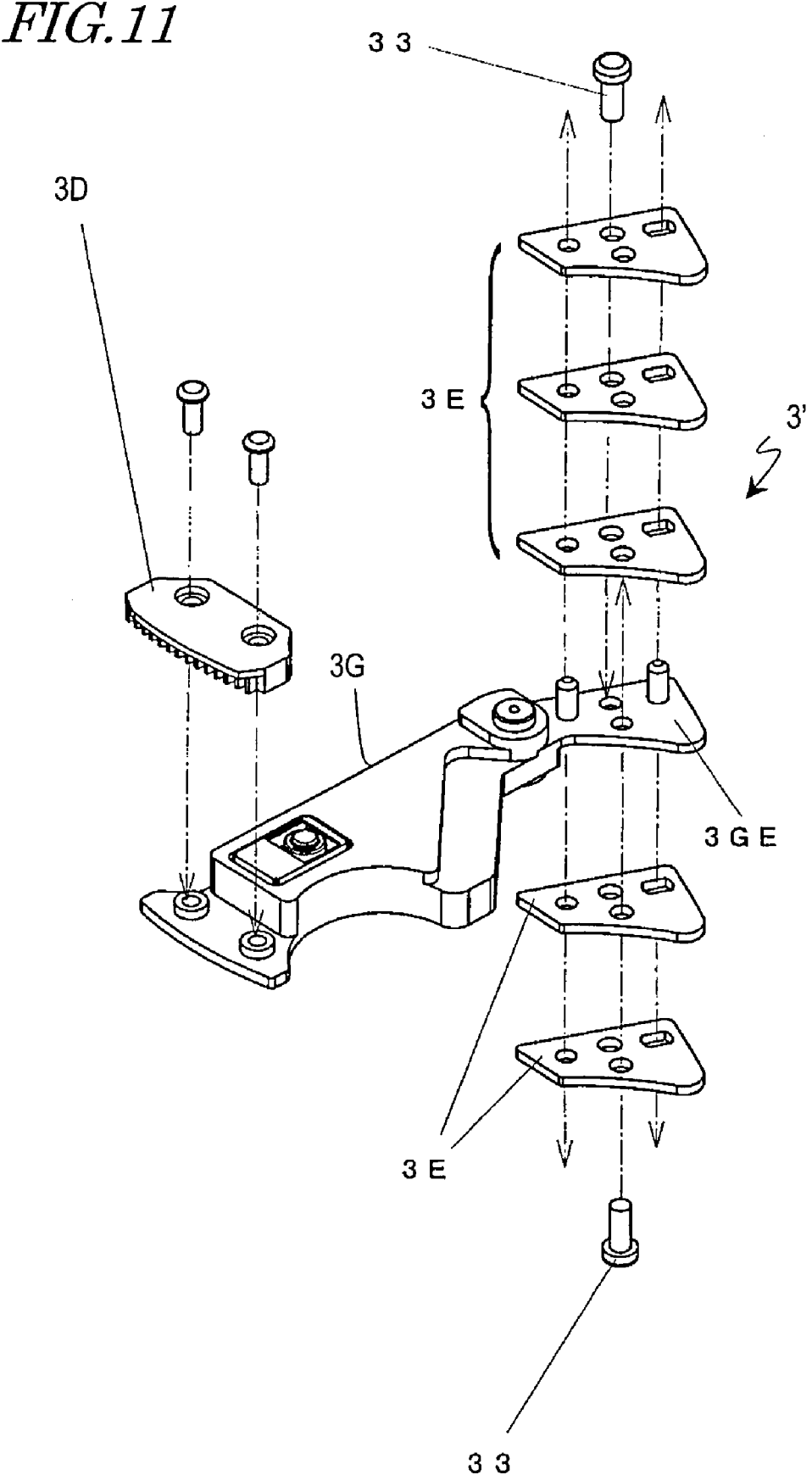
FIG. 11 is an exploded isometric view of an optical pickup in the optical disc apparatus in Embodiment 2.

As shown in FIG. 11, the balancing weight 3E includes, for example, five plate-like members. As shown in FIG. 11, three upper members are fixed via a screw 33, and two lower members are fixed via a screw 33, while being positioned with respect to a weight attaching part 3GE provided on the pickup base 3G. It is preferable that the pickup gear 3D is formed of a material suitable to a gear, like in Embodiment 1. Therefore, the pickup gear 3D is formed separately from the pickup base 3G and is fixed to the pickup base 3G via screws as shown in FIG. 11.

Figure 12:
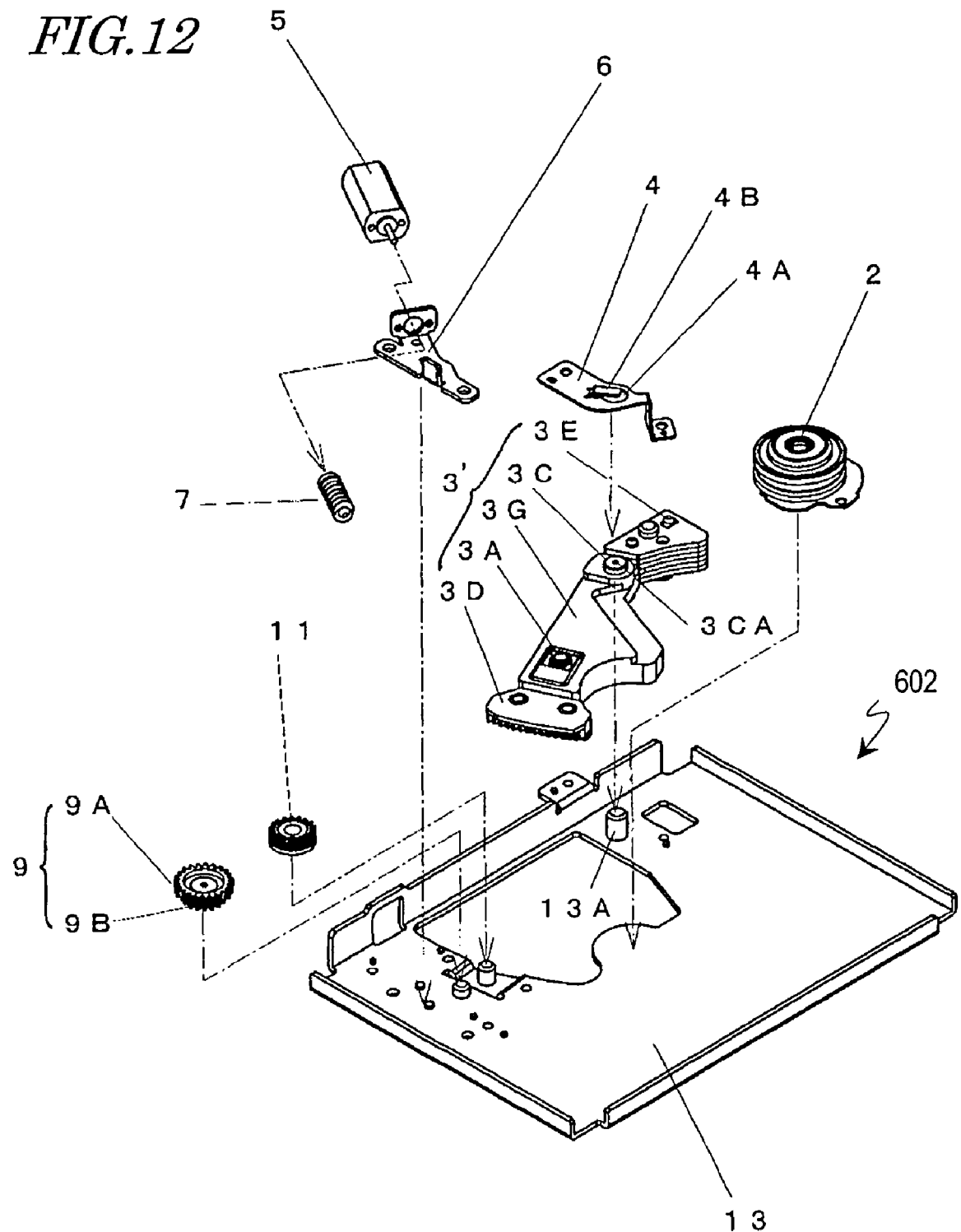
FIG. 12 is an exploded isometric view of the optical disc apparatus in Embodiment 2.
Figure 13:
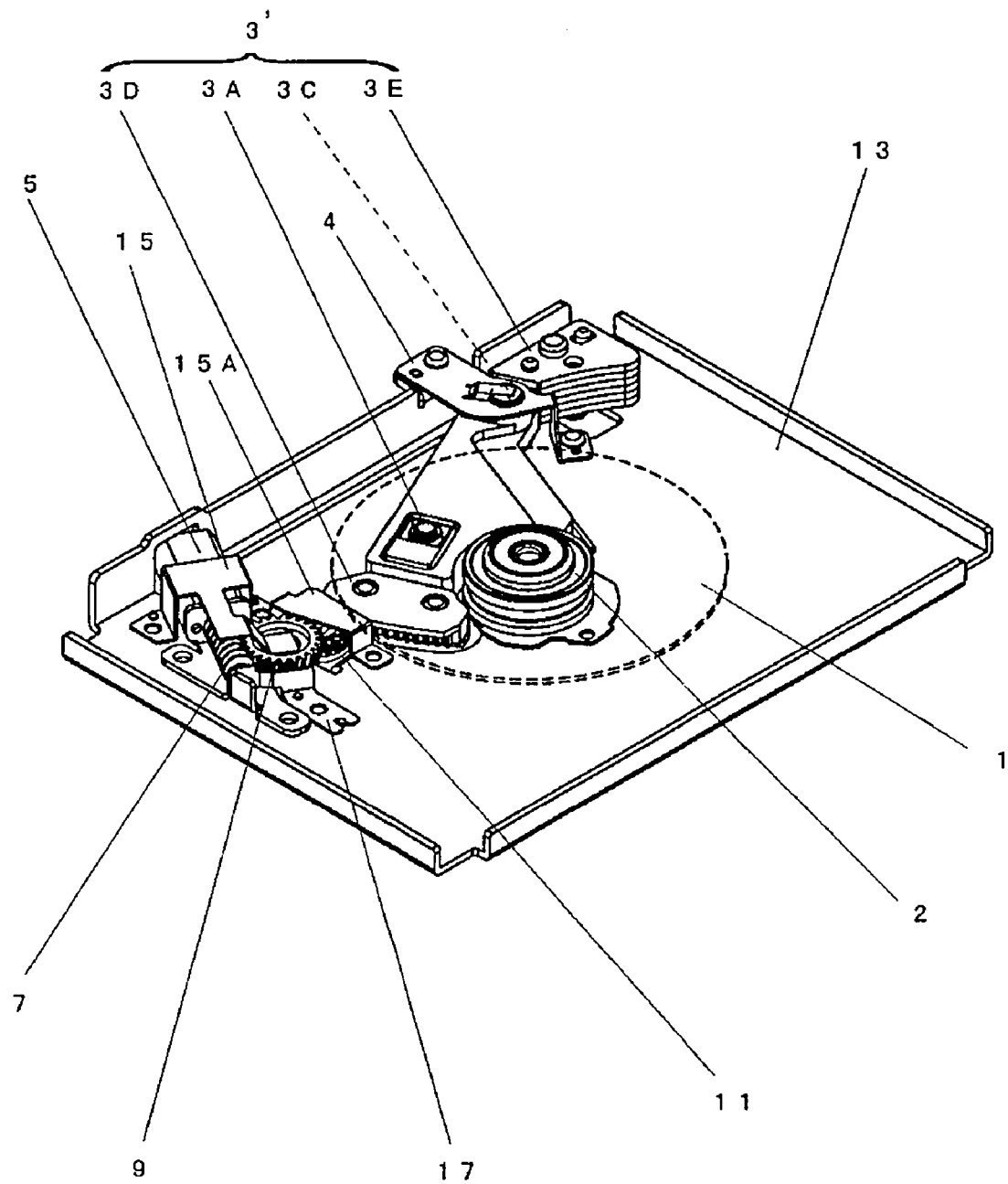
FIG. 13 is an isometric view showing an overall structure of the optical disc apparatus in Embodiment 2.
Figure 14:
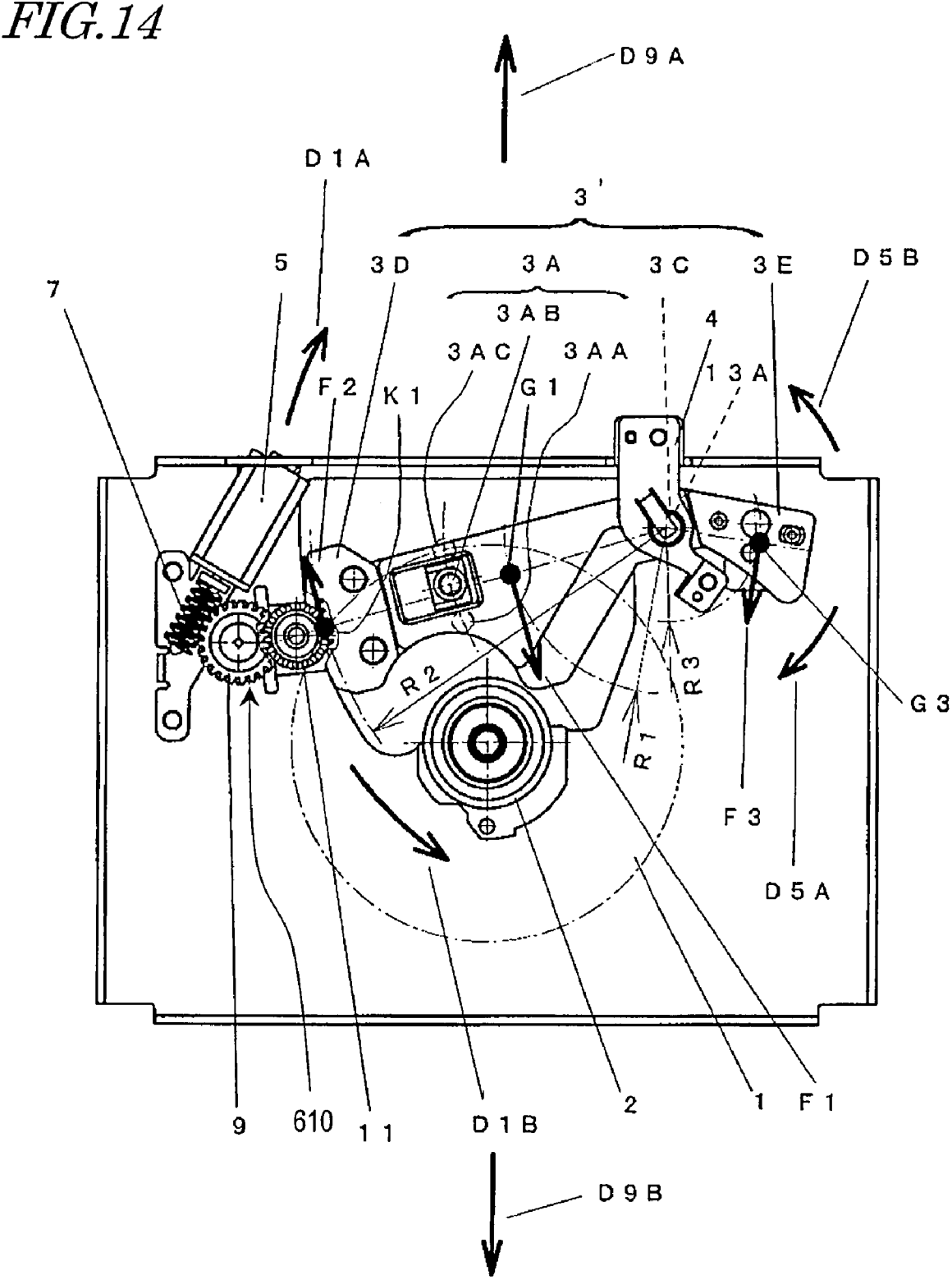
FIG. 14 is a plan view showing an overall structure of the optical disc apparatus in Embodiment 2.

FIG. 12 is an exploded isometric view of the optical disc apparatus 602. FIG. 13 is an isometric view showing a state where the contact 17 and the protective cover 15 are attached to the base main body 13 like in Embodiment 1. FIG. 14 is a plan view of the optical disc apparatus 602 shown in FIG. 10 seen in the direction of arrow D7B. In FIG. 14, G3 represents the position, on a plane parallel to the recording face of the optical disc 1 placed on the disc motor 2, of the center of gravity of the balancing weight 3E with respect to the base shaft 13A. The distance between the center of gravity G3 and the rotating axis of the optical pickup 3' is R3.

By providing the balancing weight 3E in the optical disc apparatus 602 as shown in FIG. 14, the following occurs. Where the entire apparatus receives an impact force in, for example, the direction of arrow D9B, when, for example, the tangential force F1 acts on the center of gravity G1, the moment M1 represented by expression 8 is generated as described in Embodiment 1. In addition, the tangential force F3, for example, acts on the center of gravity G3 of the balancing weight 3E, and moment M3 represented by expression 21 is generated.

$$M3 = F3 \cdot R3 \quad \text{expression 21}$$

When the moment M1 and the moment M3 are generated, a condition for preventing the optical pickup 3' from rotating in the direction of arrow D1B can be represented by expression 22.

$$M1 - M3 < M2 \quad \text{expression 22}$$

Expression 22 may also be represented by expression 23 from expressions 8, 9, 21 and 22.

$$F2 > (F1 \cdot R1 - F3 \cdot R3)/R2 \quad \text{expression 23}$$

As is clear from comparing expression 23 and expression 11, the moment generated by the balancing weight 3E counteracts the moment generated by the center of gravity of the optical pickup 3'. Therefore, F2 is decreased. Namely, assuming that when the optical disc apparatus 602 is dropped, gravity is applied in the direction of arrow D9A or arrow D9B in FIG. 14, the moment generated by the structure of the optical pickup 3' on the side of the objective lens 3A can be decreased by the balancing weight 3E.

Accordingly, by providing the balancing weight 3E, the force applied on the pickup gear 3D and the pickup driving gear 11 can be alleviated. Thus, the safety factor of the pickup gear 3D and the pickup driving gear 11 (the ratio between the stress at which a component is not broken or deformed (allowable stress) and stress at which the component is broken or deformed (ultimate stress)) can be increased and the impact resistance of the optical disc apparatus 602 can be improved.

As specific gravity of the material forming the balancing weight 3E becomes higher as compared with the specific gravity of the material forming the pickup base 3G, the above-described effect becomes more significant, for the following reason. Even if the balancing weight 3E has an equivalent volume to that of the pickup base 3G, the moment M3 increases to be closer to the moment M1. This enables the left term of expression 22 to become smaller. This also means that where the balancing weight 3E is formed of a material having a high specific gravity, an equivalent counteracting effect may possibly be provided with a smaller volume.

For example, the pickup base 3G may be formed of an aluminum material having a specific gravity of about 2.7 and the balancing weight 3E may be formed of iron having a specific gravity of about 7.9. In this case, the above-described effect can be provided with an appropriate volume while both the pickup base 3G and the balancing weight 3E obtain a necessary strength. Hereinafter, the impact force received by the optical disc apparatus 602 will be described with specific values like in Embodiment 1.

For example, the weight of the balancing weight 3E is set to 4 g, which is more lightweight than the optical pickup 3', and the distance between the center of gravity 3G and the rotating axis of the optical pickup 3' (rotating radius) is labeled as R3.

In this embodiment, expression 23 holds true instead of expression 11. Hence, expression 24 holds true from expressions 23 and 16.

$$(F1 \cdot R1 - F3 \cdot R3)/R2 < 3.5 \text{ kgf} \qquad \text{expression 24}$$

Namely, expression 25 is derived.

$$R1 < (3.5 \cdot R2 + F3 \cdot R3)/F1 \text{ mm} \qquad \text{expression 25}$$

The impact values F1 and F3 applied on the centers of gravity G1 and G3 of the optical pickup 3' and the balancing weight 3E can be respectively represented by expression 26 and expression 27 when the shock acceleration is 10,000 m/s².

$$F1 = 5.1 \text{ to } 7.1 \text{ kgf} \qquad \text{expression 26}$$

$$F3 = 4.1 \text{ kgf} \qquad \text{expression 27}$$

When the shock acceleration is 30,000 M/s², the impact values F1 and F3 can be respectively represented by expression 28 and expression 29.

$$F1 = 15.3 \text{ to } 21 \text{ kgf} \qquad \text{expression 28}$$

$$F3 = 12.2 \text{ kgf} \qquad \text{expression 29}$$

Based on expression 25, R1 as represented by expression 30 is obtained as fulfilling all the conditions in consideration of the respective shock acceleration and the range of F1.

$$R1 < 0.2 \cdot R2 + 0.6 \cdot R3 \qquad \text{expression 30}$$

For example, under the above conditions, it is assumed that R2 (the radius of the engaging pitch circle of the pickup gear 3D)=43.6 mm (=1.5 to 2.2 $D_d/2$), R3 (the rotating radius of the center of gravity G3 of the balancing weight 3E)=10 mm (0.15 to 0.25 $D_d$), and R1 (the rotating radius of the center of gravity G1 of the optical pickup 3') is equal to or smaller than about 12 mm. When the diameter of the disc used is 40 to 60 mm (=0.8·R2 to 1.4·R2), expression 30 holds true. Namely, when the optical disc apparatus 602 is dropped from a height of about 1.5 m, neither pickup driving gear 11 nor the pickup gear 3D is broken and the optical pickup 3' can be prevented from rotating due to the impact force generated by the dropping.

Comparing expression 20 and expression 30, the condition of expression 30 allows R1 to be longer owing to the term 0.6·R3. Accordingly, by providing the balancing weight 3E, the designing freedom regarding the position of the center of gravity of the optical pickup 3' on the side of the objective lens 3A is improved. Generally in the case of an optical system for emitting a light beam for recording or reproduction and detecting the reflected light, the positions of the optical components included therein often cannot be arbitrarily set due to the optical designing restrictions. Even with such restrictions, however, the optical pickup 3' allows the position of the center of gravity G1 to be determined from a wider range of selection than in Embodiment 1. This enables the optical system with many restrictions to be accommodated.

Embodiment 3

Figure 15:
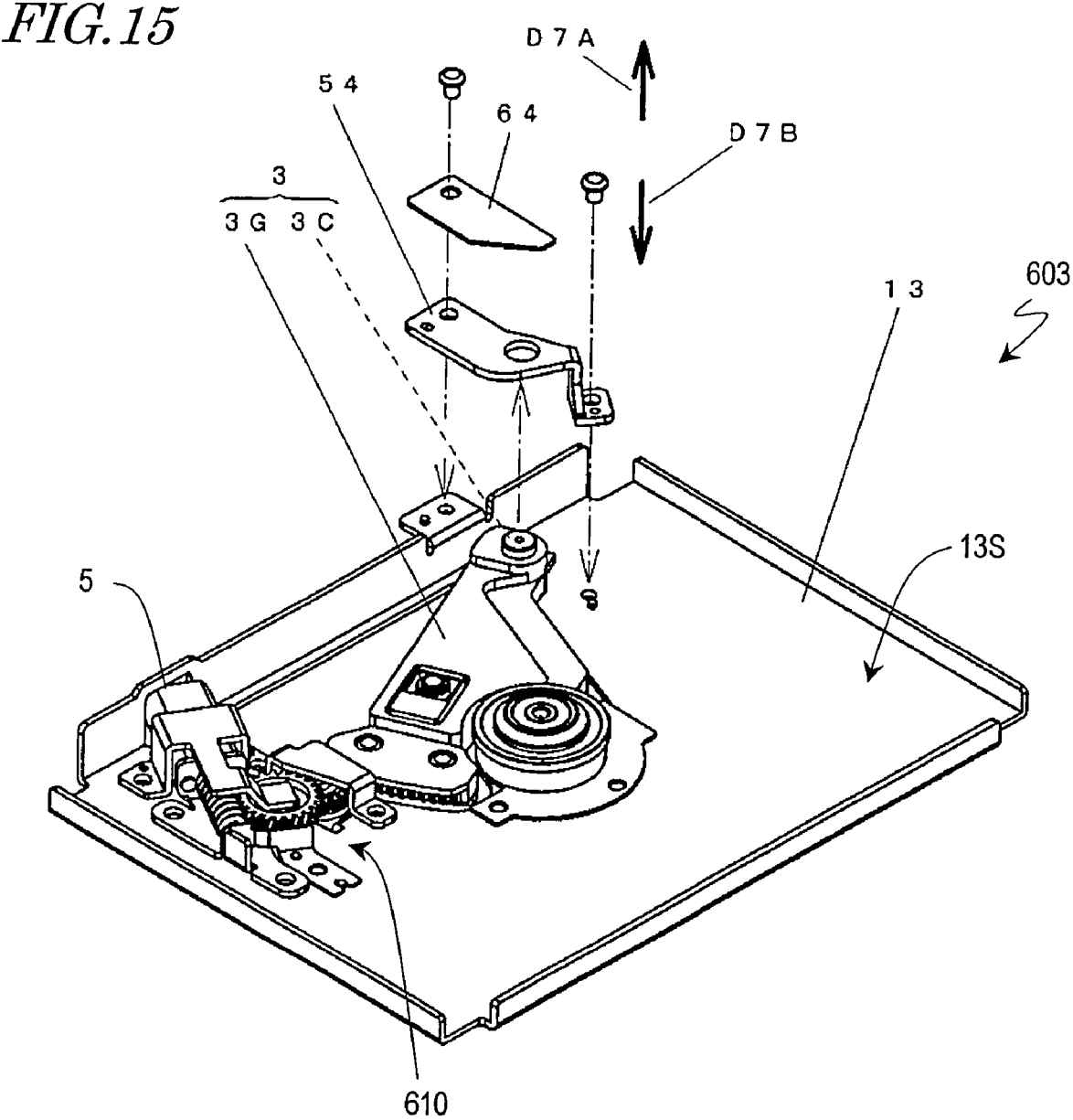
FIG. 15 is an exploded isometric view of an optical disc apparatus in Embodiment 3 according to the present invention.

Hereinafter, an optical disc apparatus in Embodiment 3 according to the present invention will be described. FIG. 15 is an partially exploded isometric view showing a part of the elements of an optical disc apparatus 603. The optical disc apparatus 603 includes a pickup holding section 54 having a different structure from that of the corresponding element in Embodiment 1. As shown in FIG. 15, the structures and functions of the optical pickup 3, the disc motor 5, and the driving force transmission mechanism 610 are as described in Embodiment. To the pickup holding section 54, a plate-like shaft forcing spring 64 formed separately is attached via a screw or the like.

Figure 16:
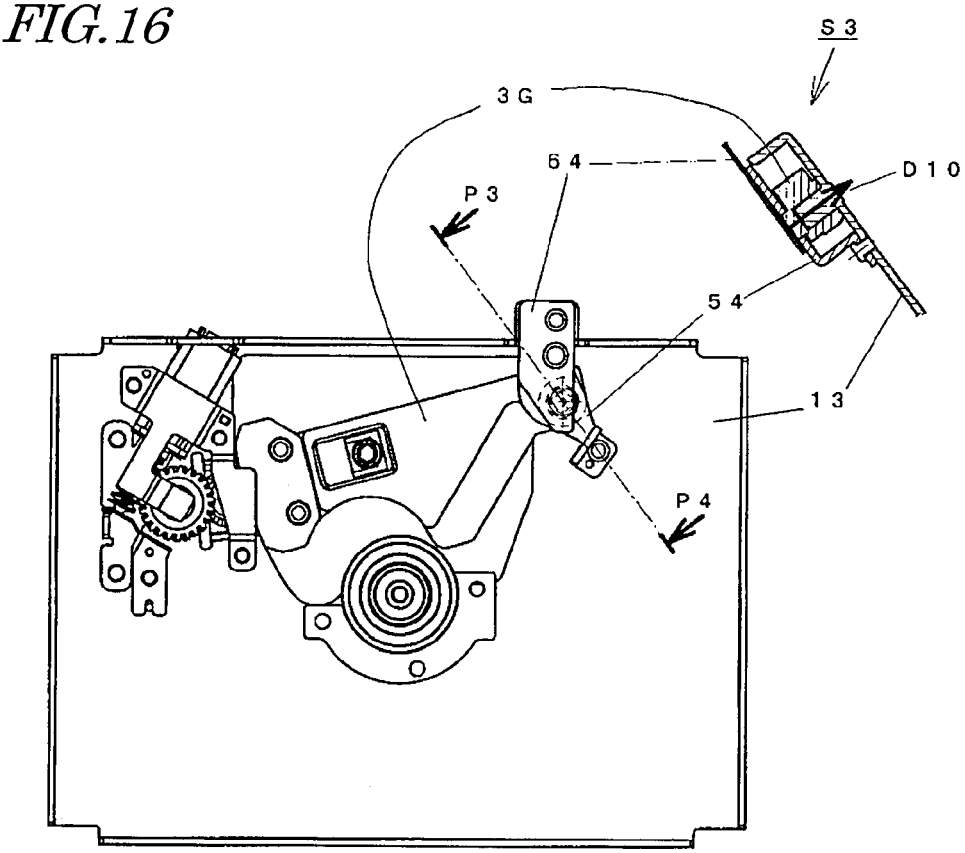
FIG. 16 (a) is a plan view showing an overall structure of the optical disc apparatus in Embodiment 3, and (b) is a cross-sectional view of (a) taken along line P3-P4.
Figure 16:
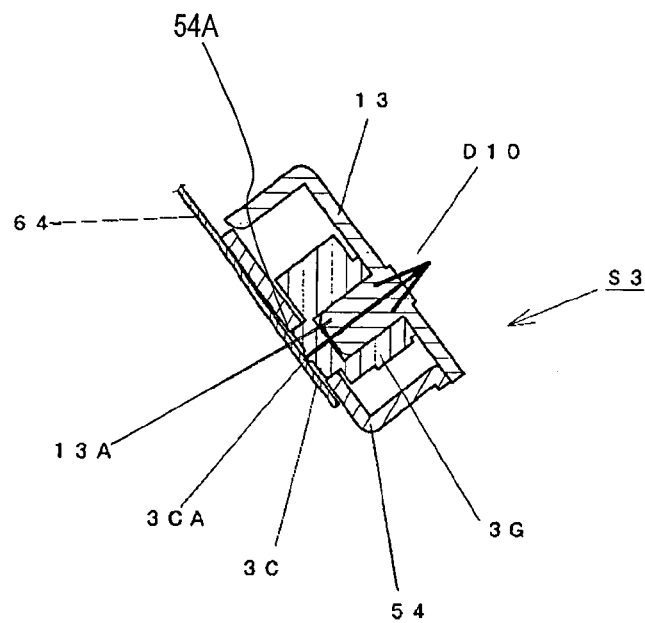

FIG. 16(a) is a plan view of the optical disc apparatus 603 shown in FIG. 15 seen in the direction of arrow D7B. S3 is a partial cross-sectional view taken along line P3-P4. FIG. 16(b) is an enlarged view of S3. As shown in FIG. 16(b), the shaft forcing spring 64 forces the support boss 3C via the projection 3CA toward the main surface 13S of the base main body 13.

Like in Embodiments 1 and 2, an inner circumferential face of a support hole 54A and the outer circumferential face of the support boss 3C have a gap therebetween so as not to contact with each other. This is for accommodating an axial shift, caused by an assembly error, between the base shaft 13A and the support hole 54A in the state where the pickup holding section 4 is attached to the base main body 13. This gap is set to have a size in such a range that even when at least a part of the inner circumferential face of the support hole 54A and at least a part of the outer circumferential face of the support boss 3C contact each other, the base main body 13, the pickup base 3G and the base shaft 13A can all be regulated not to deform beyond the elastic deformation region of the respective material. Thus, the base main body 13, the pickup base 3G and the base shaft 13A are prevented from being plastically deformed beyond the respective elastic deformation amount. Namely, even if these components are deformed by an external impact, the deformation can be restricted to the respective elastic deformation region, and these components are protected against being broken.

With the optical disc apparatus 603, the pickup holding section 54 and the shaft forcing spring 64 can be formed as separate members. Therefore, the strength required for the function of preventing the optical pickup 3 from coming off in the direction of arrow D7A shown in FIG. 15, and the elastic strength required for the function of forcing in the direction of arrow D10 in FIG. 16(a), can be separately set. Hence, the structures and materials of the pickup holding section 54 and the shaft forcing spring 64 can be easily optimized for both of the functions. Since the shape of the shaft forcing spring 64 can be larger than that of the support hole 54A, a good spring characteristic can be realized.

Embodiment 4

Figure 17:
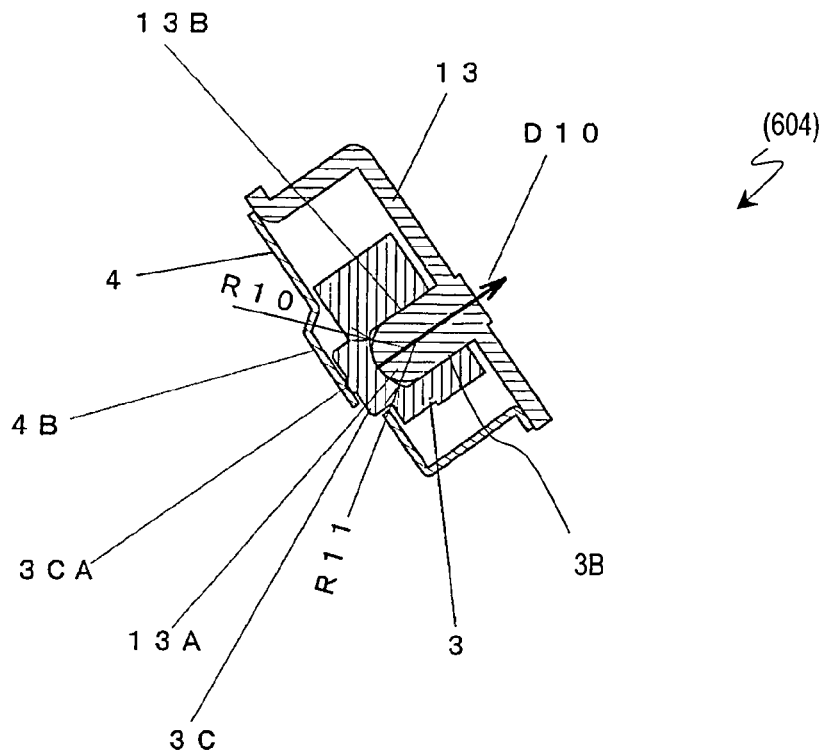
FIG. 17 is a cross-sectional view of a base shaft and the vicinity thereof in an optical disc apparatus in Embodiment 4 according to the present invention.

Hereinafter, an optical disc apparatus in Embodiment 4 according to the present invention will be described. FIG. 17 shows a cross-sectional structure of an optical disc apparatus 604 taken along a plane passing the rotation axis of the optical pickup 3. The optical disc apparatus 604 is different from the corresponding apparatus in Embodiment 1 in the shape of a base shaft 13B of the base main body 13 and the shape of the pickup rotating hole 3B of the optical pickup 3. The structures not shown in FIG. 17, specifically the structures and functions of the disc motor 5, the driving force transmission mechanism 610, the pickup holding section 4, and the other elements of the optical pickup 3 are as described in Embodiment 1.

As shown in FIG. 17, a tip of the base shaft 13B has a convexed spherical shape, and the radius of the spherical face is R10. Meanwhile, a bottom of the pickup rotating hole 3B of the optical pickup 3 has a concaved spherical shape, and the radius of the spherical face is R11. The radius R11 is larger than the radius R10. The base shaft 13B is inserted into the pickup rotating hole 3B and the tip of the base shaft 13B is in contact with the bottom of the pickup rotating hole 3B. Thus, the optical pickup 3 is supported by the base main body 13. Therefore, unlike in Embodiment 1, the thrust bearing face 3GJ (FIG. 9(a)) is not provided, and the position in height of the pickup 3 in the axial direction of the base shaft 13A is uniquely determined by this contact face. The forcing part 4B forces the optical pickup 3 in the direction of arrow D10, i.e., toward the main surface of the base main body 13 like in Embodiment 1. Therefore, the contact at the contact face can be provided with certainty.

With the optical disc apparatus 604, the contact state of the base shaft 13A and the pickup rotating hole 3B is close to a point contact state, and so the contact area can be minimized. Therefore, the frictional force at the rotating axis of the optical pickup 3 generated when the optical pickup 3 is rotated can be very small, and the load generated at the engaging point K1 of the pickup gear 3D and the pickup driving gear 11 can be almost zero. In this manner, the load applied when the pickup 3 rotates can be alleviated as compared with Embodiment 1 in which a frictional force is generated between the thrust bearing face 3GJ and the base main body 13.

Embodiment 5

Figure 18:
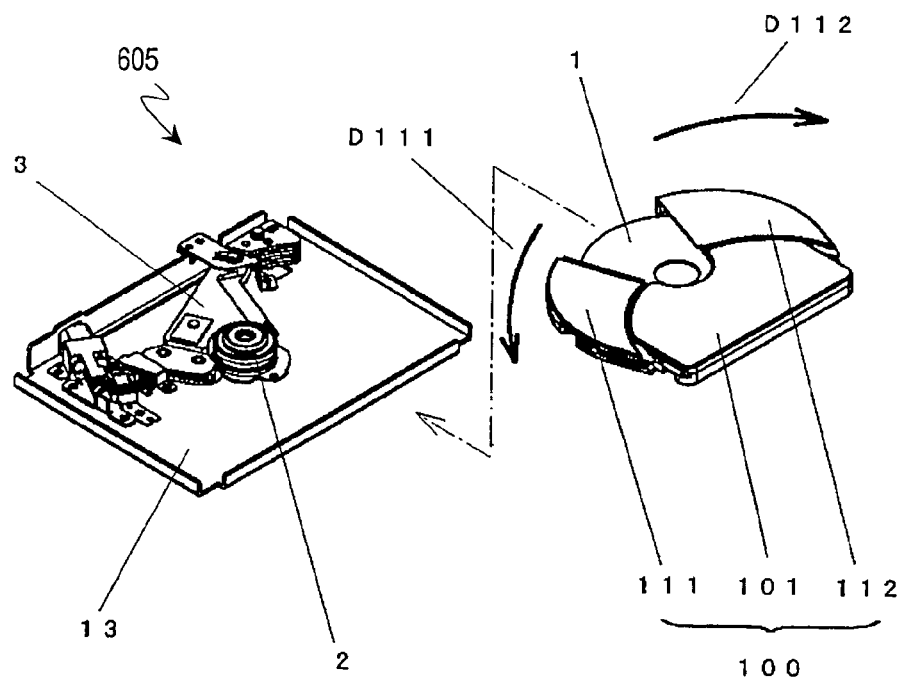
FIG. 18 is an isometric view showing an overall structure of an optical disc apparatus in Embodiment 5 according to the present invention.

Hereinafter, an optical disc apparatus in Embodiment 5 according to the present invention will be described. FIG. 18 is an isometric view showing an overall structure of an optical disc apparatus 605. In this embodiment, as shown in FIG. 18, the optical disc 1 to be used is accommodated in a disc cartridge 100.

The disc cartridge 100 shown in FIG. 18 is disclosed in, for example, the pamphlet of PCT International Patent Publication 07/126,144 of an application filed by the present applicant. The disclosure of the pamphlet of PCT International Patent Publication 07/126,144 is incorporated herein by reference. The disc cartridge 100 includes first and second disc accommodating section 111 and 112 which each have a space for accommodating a part of the optical disc 1 and, when combined together, accommodates the entire disc, and a support base member 101 for chucking the optical disc 1 from outside and also rotating and supporting the first and second disc accommodating section 111 and 112 such that a window through which the an optical pickup accesses the recording face of the optical disc 1 to perform at least one of information recording and information reproduction is opened or closed. At least a part of the support base member 101 overlaps the first and second disc accommodating section 111 and 112 so as to inhibit the first and second disc accommodating section 111 and 112 from moving in a direction vertical to the optical disc 1.

As shown in FIG. 18, the cartridge 100 in which the first and second disc accommodating section 111 and 112 are opened is mounted on the optical disc apparatus 605 as being held by a cartridge holding structure (not shown), and the accommodated optical disc 1 is placed on the disc motor 2 to be put into a state recordable or reproducible by the optical pickup 3.

Figure 19:
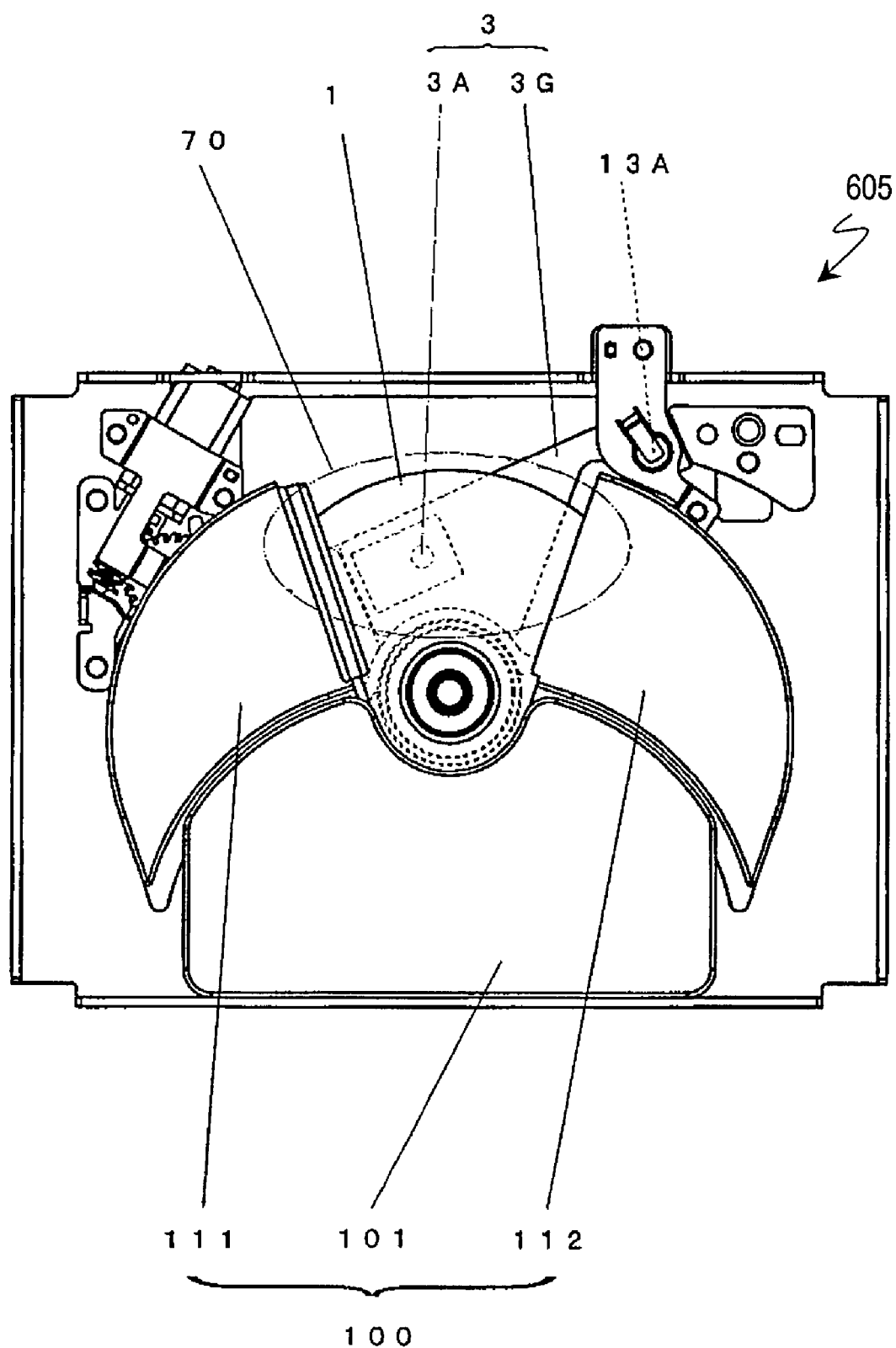
FIG. 19 is a plan view showing an overall structure of the optical disc apparatus in Embodiment 5.

FIG. 19 is a plan view showing a state where the disc cartridge 100 is mounted on the optical disc apparatus 605 such that recording to, or reproduction from, the accommodated optical disc 1 is made possible.

As shown in FIG. 19, in the state where the first and second disc accommodating section 111 and 112 are opened, an exposed area 70 of the accommodated optical disc 1 is fan-shaped, and a part of the optical pickup 3 can be inserted into a space below this area of the optical disc 1.

It is possible to locate only the base shaft 13A, which is engaged with the optical pickup 3, in a small area outside the planar area of the mounted disc cartridge 100. Hence, it is not necessary to provide a structure for supporting the optical pickup 3 below the first and second disc accommodating section 111 and 112. This enables the objective lens 3A to rotate in a radial direction of the optical disc 1. As a result, where the disc cartridge 100 is used, the thickness of the optical disc apparatus 605 can be inhibited.

As described above, with the optical disc apparatus 605, where the disc cartridge 100 is used, the space can be effectively used. Therefore, the external shape of the optical disc apparatus 605, i.e., the sizes thereof in the thickness direction and the planar direction can be easily decreased to make the optical disc apparatus 605 compact.

Embodiment 6

Figure 20:
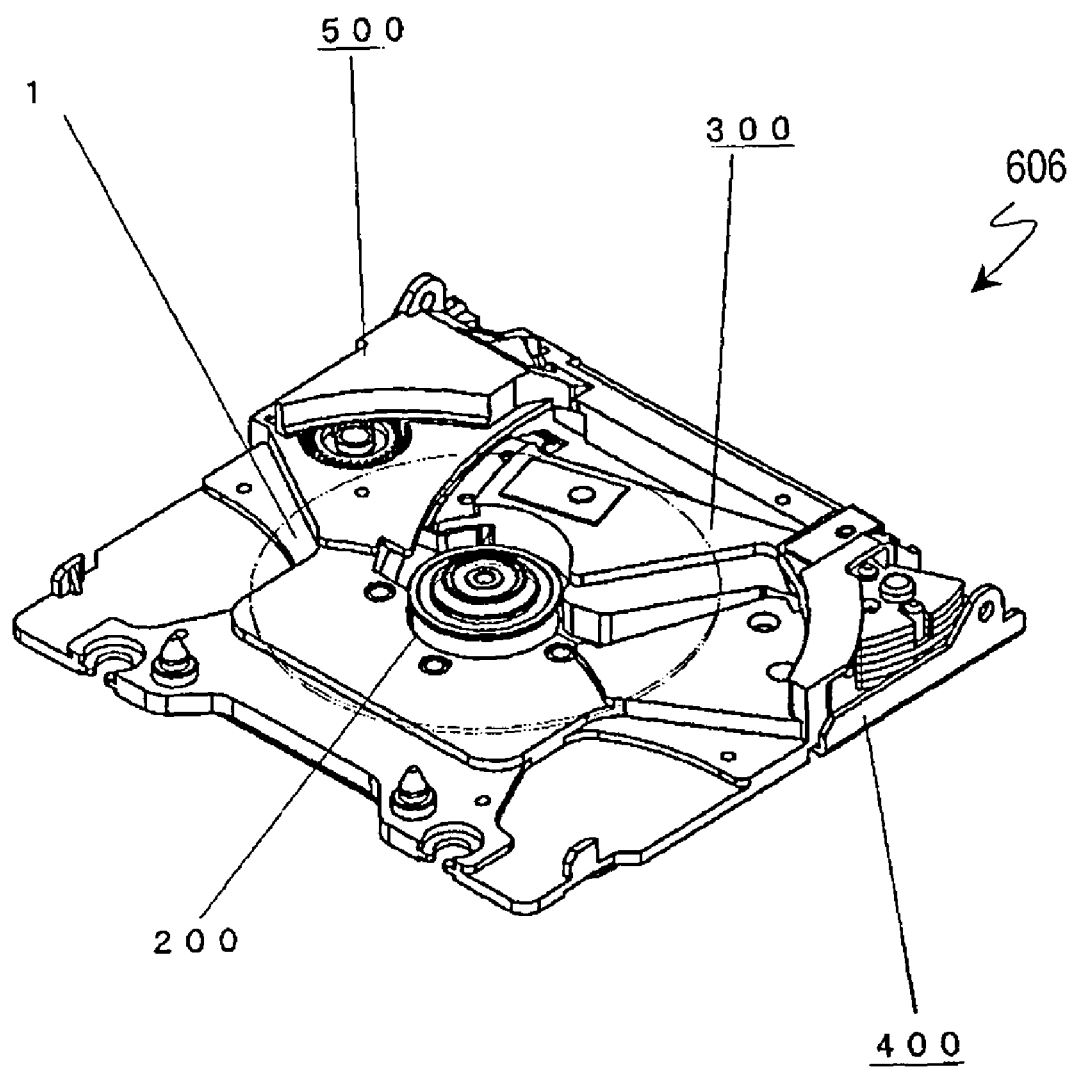
FIG. 20 is an isometric view showing an optical disc apparatus in Embodiment 6 according to the present invention.
Figure 21:
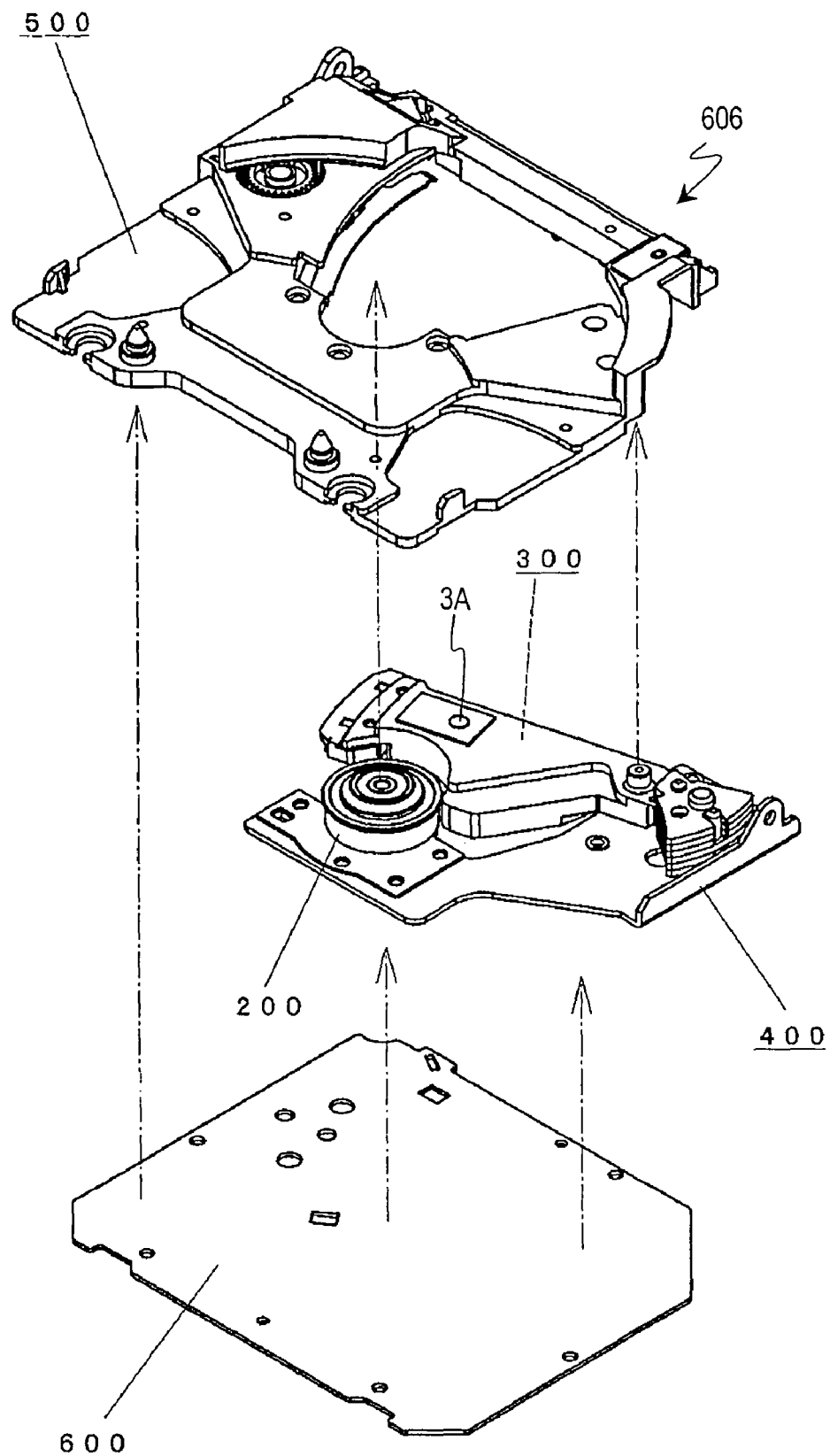
FIG. 21 is an exploded isometric view of the optical disc apparatus in Embodiment 6 on the basis of units thereof.

Hereinafter, an optical disc apparatus in Embodiment 6 according to the present invention will be described. FIG. 20 is an isometric view showing an overall structure of an optical disc apparatus 606, and FIG. 21 is an exploded isometric view of the optical disc apparatus 606 on the basis of units thereof.

The optical disc apparatus 606 includes a first base unit 400, a second base unit 500, and a control circuit board 600.

The first base unit 400 includes a disc motor 200 and an optical pickup 300. The disc motor 200 is a disc rotation mechanism for allowing the optical disc 1 to be placed thereon and rotating the optical disc 1. The optical disc 1 is represented with the dashed line in FIG. 20, and a face of the optical disc 1 facing the optical pickup 300 is an information recording face.

The optical pickup 300 includes an objective lens 3A and irradiates the information recording face of the optical disc 1 placed on the disc motor 200 with a light beam through the objective lens 3A. By modulating the light beam in accordance with the information to be recorded, a recording mark or pit in accordance with the information to be recorded is formed on the information recording face of the optical disc 1. By irradiating the recording mark formed on the information recording face of the optical disc 1 with a light beam and thus detecting the reflected light, the optical pickup 300 reproduces information recorded on the optical disc 1. The optical pickup 300 is rotatably supported in the first base unit 400.

The second base unit 500 includes a driving system for rotating and driving the optical pickup 300, and covers the disc motor 200 and the optical pickup 300 of the first base unit 400. The control circuit board 600 electrically controls the disc motor 200, the optical pickup 300, and the driving system.

Hereinafter, the structure of the optical pickup 300, the first base unit 400 and the second base unit 500 will be described.

Figure 22:
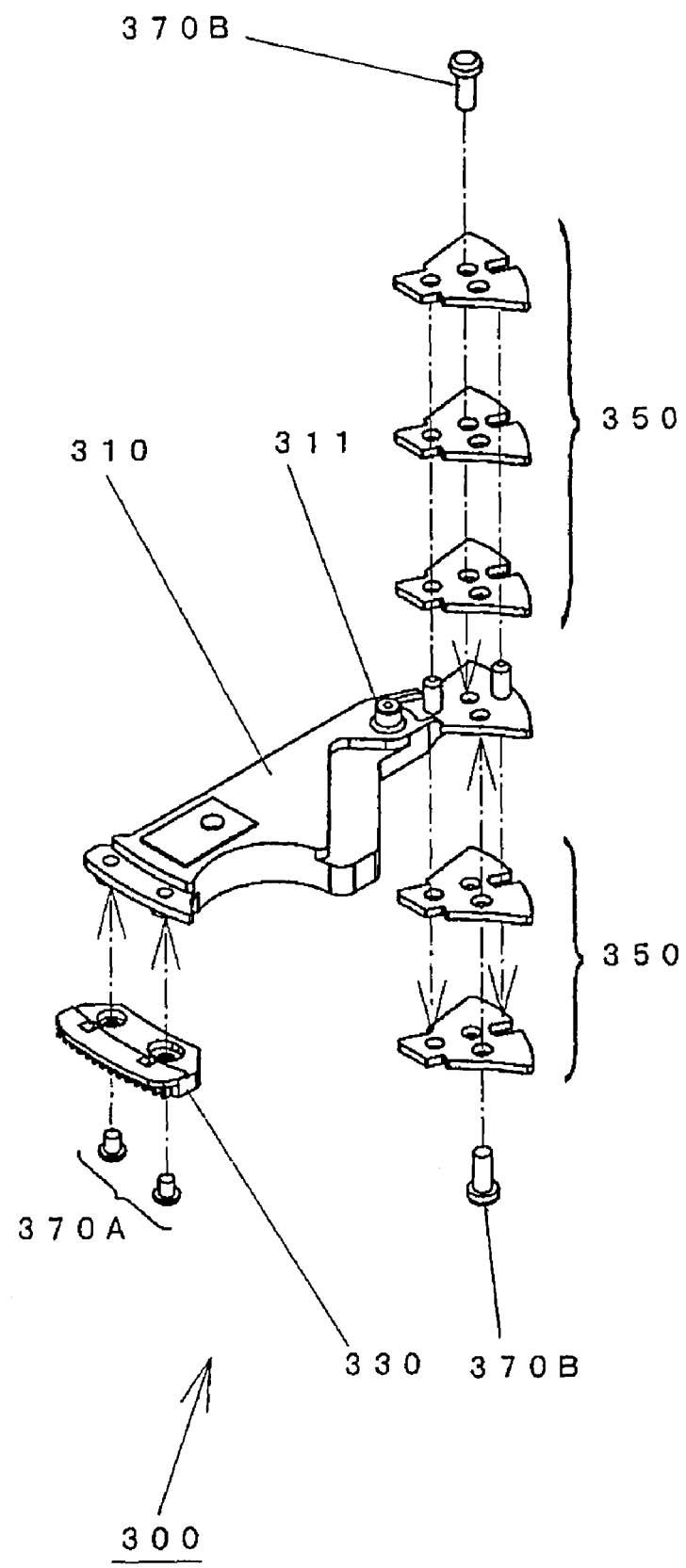
FIG. 22 is an exploded isometric view of an optical pickup in an optical disc apparatus in Embodiment 6.

FIG. 22 is an exploded isometric view of the optical pickup 300. As shown in FIG. 22, the optical pickup 300 includes a pickup base 310, a pickup gear 330, and a balancing weight 350.

The pickup base 310 has a support boss 311 provided in the vicinity of one end thereof. At the other end of the pickup base 310, the pickup gear 330, which is an engaging section engageable with a driving force transmission mechanism 610 (FIG. 30), is attached via gear fixing screws 370A. The balancing weight 350 includes five plates. At the one end of the pickup base 310, three upper plates and two lower plates are accumulated so as to interpose the pickup base 310 therebetween, and are fixed via fixing screws 370B.

Preferably, the pickup base 310 is formed of a light metal material such as aluminum, magnesium or the like, a resin or the like, whereas the balancing weight 350 is formed of a material having a higher specific gravity than that of the pickup base 310, for example, iron.

Figure 23:
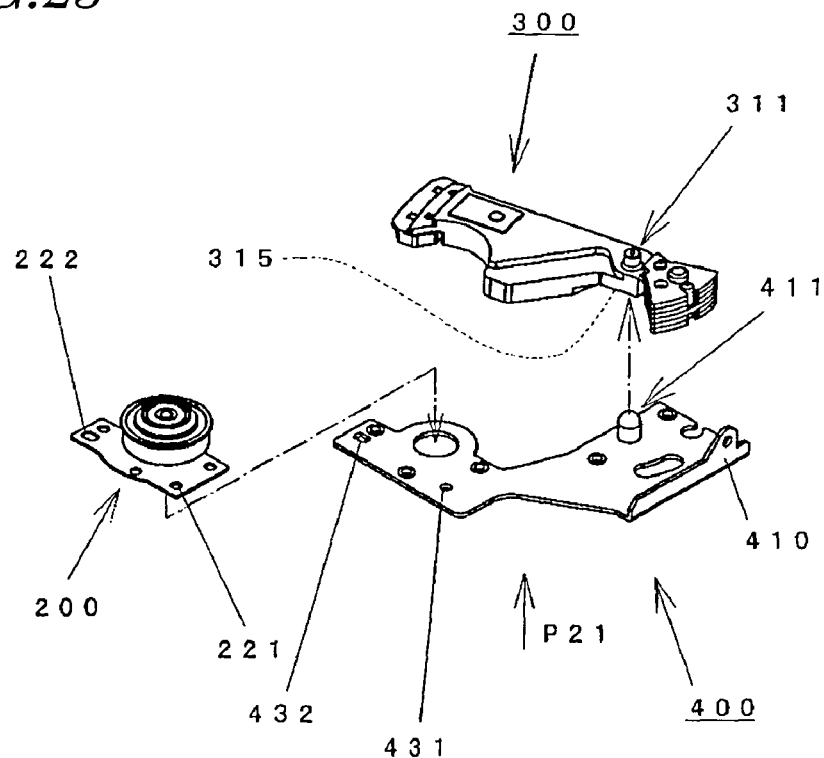
FIGS. 23 (a) and (b) are each an exploded isometric view of a first base unit in the optical disc apparatus in Embodiment 6.
Figure 23:
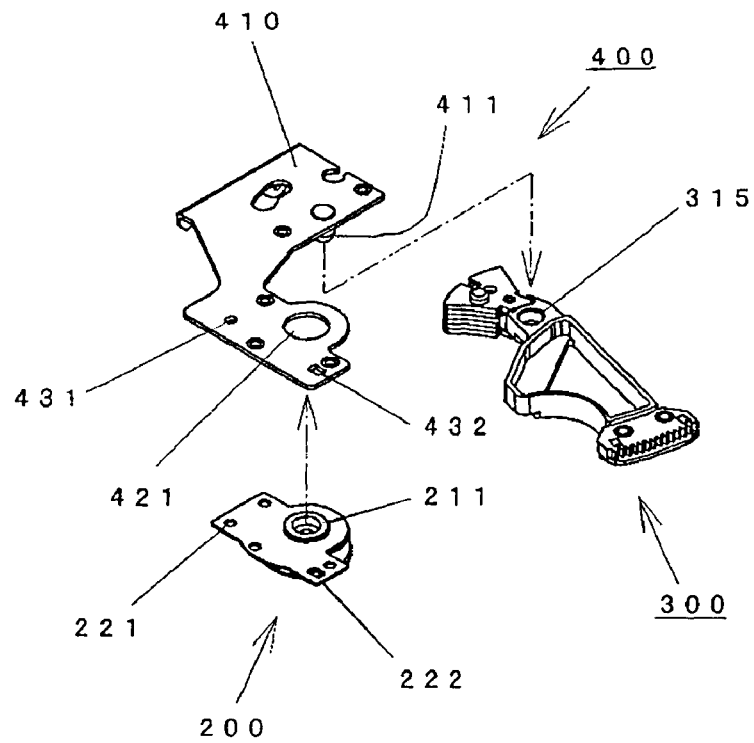

FIG. 23(a) and FIG. 23(b) are each an exploded isometric view of the first base unit 400. FIG. 23(b) shows a state seen from a direction of arrow P21 in FIG. 23(a). Since the viewpoints of FIG. 23(a) and FIG. 23(b) are different, the locations of the elements are varied so as to be easily viewed in each figure.

As shown in FIG. 23(a) and FIG. 23(b), the first base unit 400 includes a first base 410. A base shaft 411 provided on the first base 410 is inserted into the pickup rotating hole 315, and thus the optical pickup 300 is rotatably supported by the first base 410. The disc motor 200 is provisionally held with respect to the first base 410. As shown in FIG. 23(b), a motor positioning boss 211 provided in the disc motor 200 is fit to a motor positioning boss hole 421, and thus the disc motor 200 is positioned with respect to the first base 410.

Figure 24:
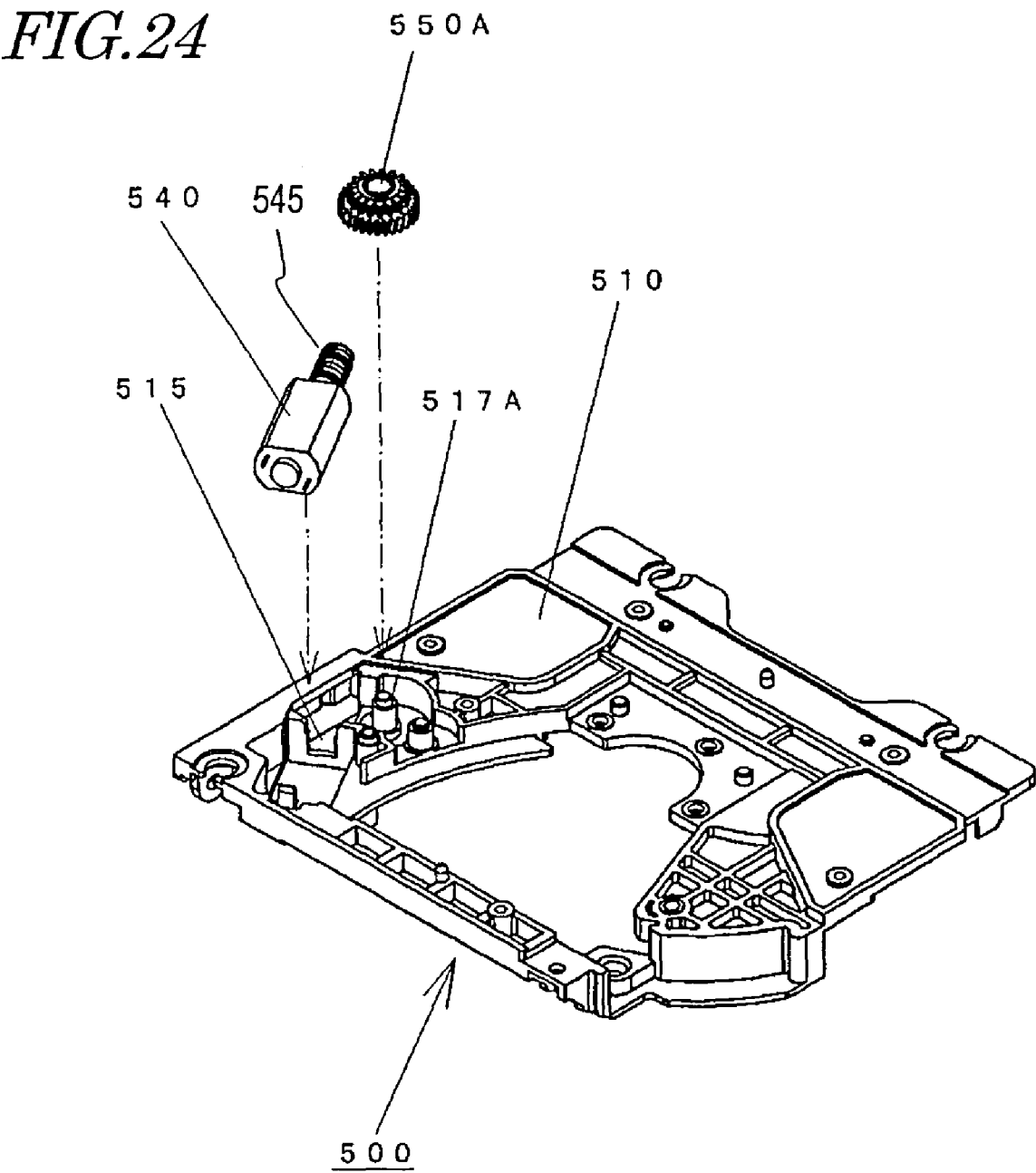
FIG. 24 is an exploded isometric view of a second base unit in the optical disc apparatus in Embodiment 6.

FIG. 24 is an exploded isometric view of the second base unit 500. The second base unit 500 includes a second base 510, a transportation motor 540, a worm 545, and a middle gear 550A. The transportation motor 540 is a driving source for rotating the optical pickup 300. The worm 545 and the middle gear 550A are included in the driving force transmission mechanism 610. The transportation motor 540 is fit into a motor blanket section 515 provided on the second base 510. The worm 545 is attached to a shaft of the transportation motor 540. The middle gear 550A is rotatably held by a middle shaft 517A of the second base 500.

Figure 25:
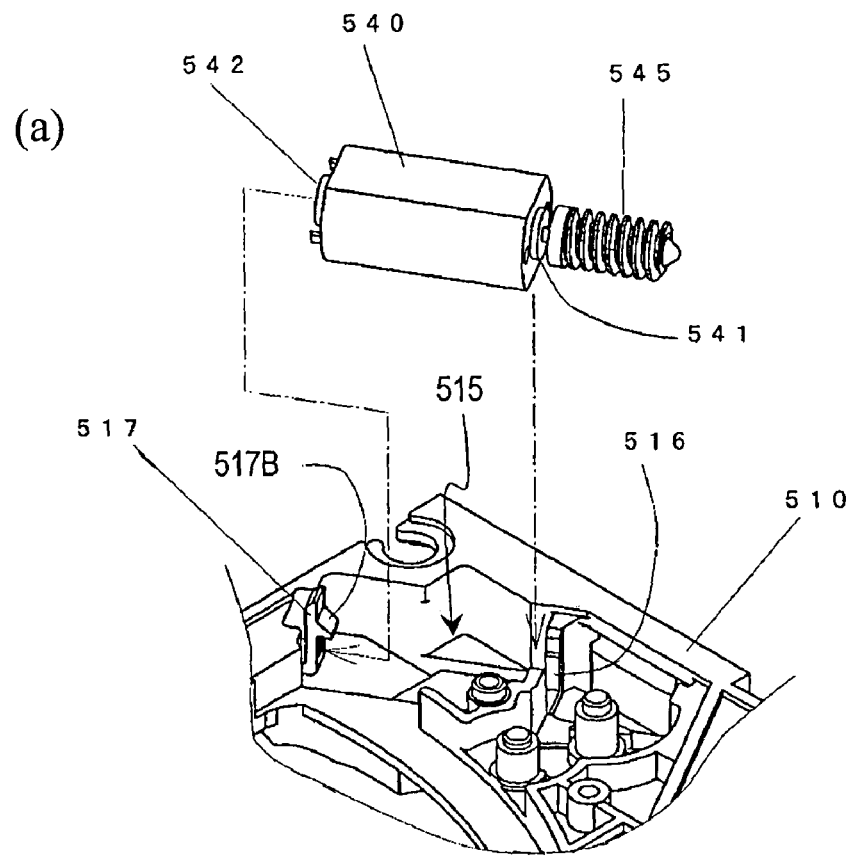
FIGS. 25 (a) and (b) are each an isometric view showing assembly of the second base unit in the optical disc apparatus in Embodiment 6.
Figure 25:
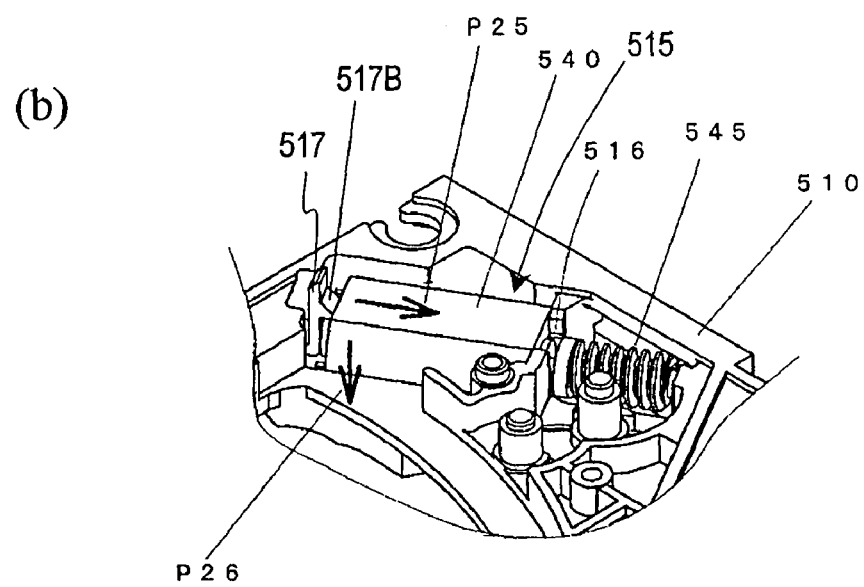

FIG. 25(a) and FIG. 25(b) each show how the transportation motor 540 is incorporated into the second base 510 in detail. As described above, the worm 545 is attached to the shaft of the transportation motor 540. A front end flange 541 is provided at the foot of the shaft between the motor main body and the worm 545, and a rear end flange 542 is provided at the foot of the shaft on the side where the shaft does not project.

In the motor blanket section 515, a front holding section 516 for holding the front end flange 541 and a rear holding section 517 for holding the rear end flange 542 are provided. In the state where the front end flange 541 and the rear end flange 542 of the transportation motor 540 are respectively accommodated in the front holding section 516 and the rear holding section 517 on the second base 510, the transportation motor 540 is forced in a direction of arrow P25 toward the front holding section 516 by the elasticity of the rear holding section 517 as shown in FIG. 25(b). The transportation motor 540 is also forced in a direction of arrow P26 by a rear end stopper 517B provided in the rear end holding section 517, and thus is fixed and held.

FIG. 26(a) and FIG. 26(b) are each an isometric view showing pickup rollers 360 incorporated into the pickup gear 330. The pickup rollers 360 are provided in order to reduce the sliding load on a contact face of the pickup gear 330 and the second base 510 and a contact face of a rotating gear forcing part 561 and the second base 510. As shown in FIG. 26(a) and FIG. 26(b), the pickup rollers 360 are lightly held in a state rotatable in a direction of arrow P28 or arrow P29 while being inserted into recesses 330A and 330B provided in the pickup gear 330.

Figure 27:
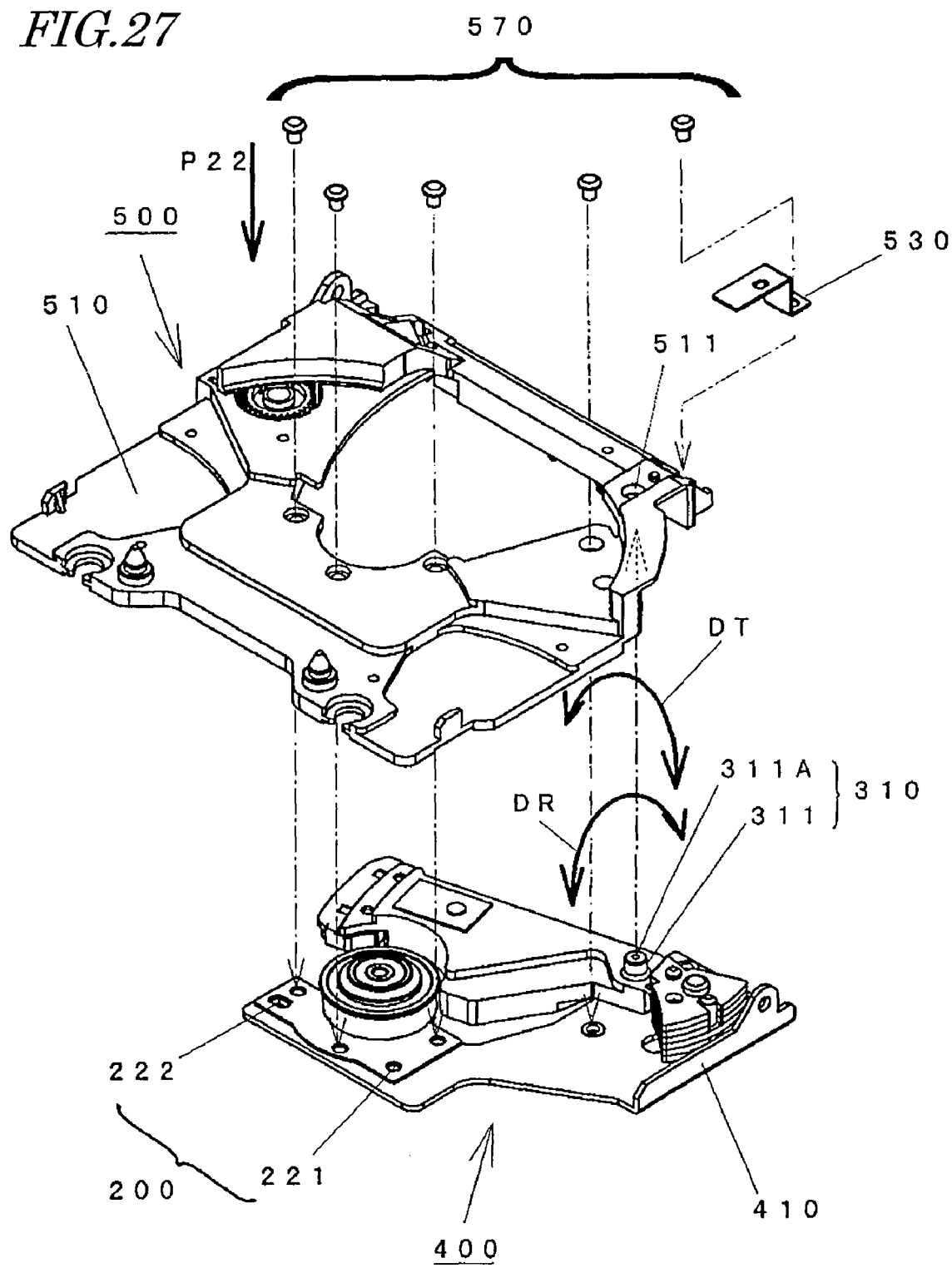
FIG. 27 is an isometric view of showing assembly of the first and second base units in the optical disc apparatus in Embodiment 6.
Figure 28:
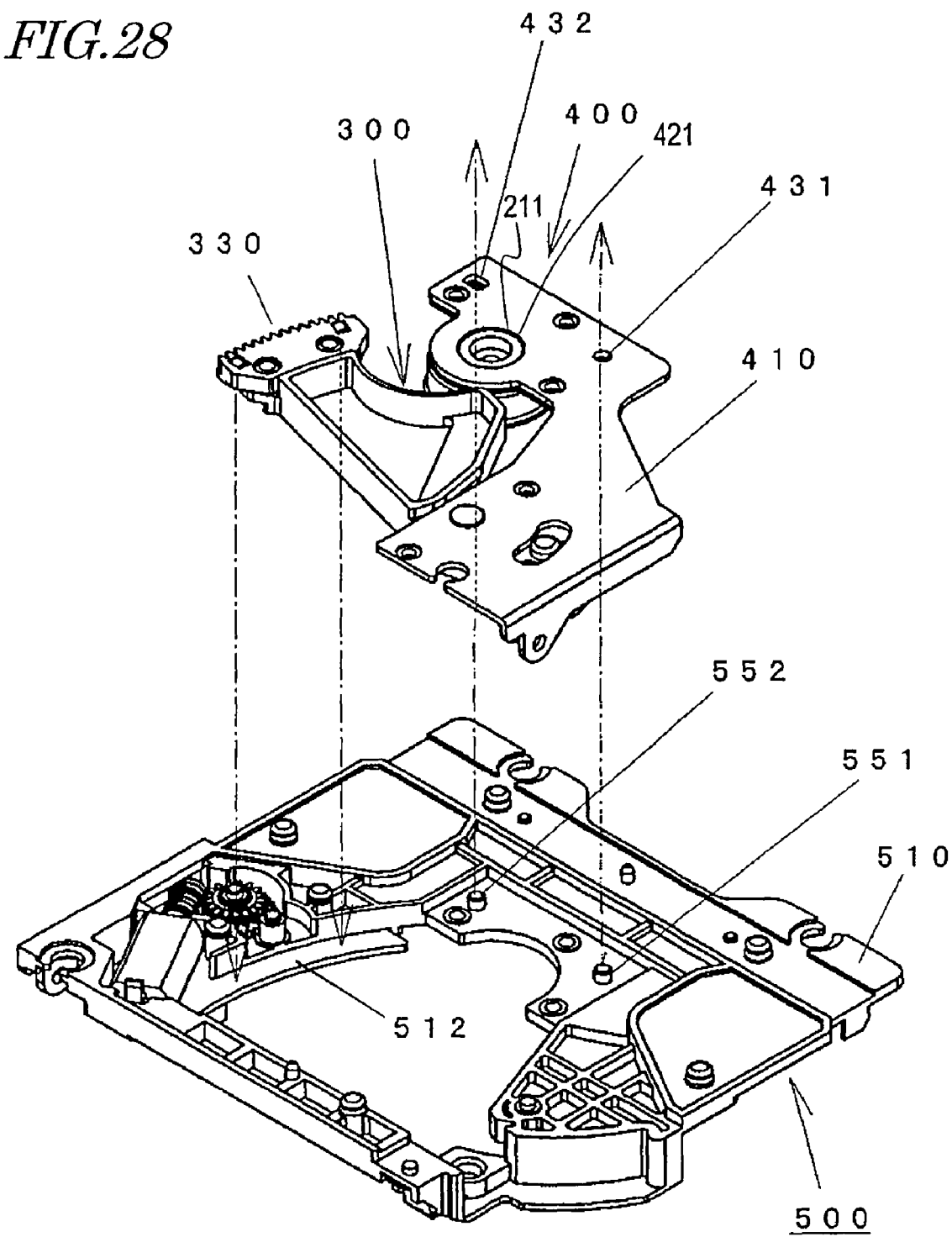
FIG. 28 is an isometric view of showing assembly of the first and second base units in the optical disc apparatus in Embodiment 6.

FIG. 27 and FIG. 28 show how to assemble the first base unit 400 and the second base unit 500 together, as seen from different directions.

As shown in FIG. 27 and FIG. 28, the support boss 311 provided on the pickup base 310 is inserted through a support hole 511 provided in the second base 510. It is noted here that an outer circumferential face of the support boss 311 and an inner circumferential face of the support hole 511 have a gap therebetween. The gap is sufficient to prevent the support boss 311 and the support hole 511 from contact each other in consideration of the positional shift error between the first base 410 and the second base 510. The positional shift error is determined by base positioning pins 551 and 552, a base positioning pin circular hole 431 and a base positioning pin rectangular hole 432.

As shown in FIG. 28, the base positioning pins 551 and 552 provided on the second base 510 are inserted through the base positioning pin circular hole 431 and the base positioning pin rectangular hole 432 provided in the first base 410, and thus the second base unit 500 is positioned with respect to the first base unit 400. The pickup gear 330 is in contact with an forcing bearing face 512 provided on the second base 510.

Figure 29:
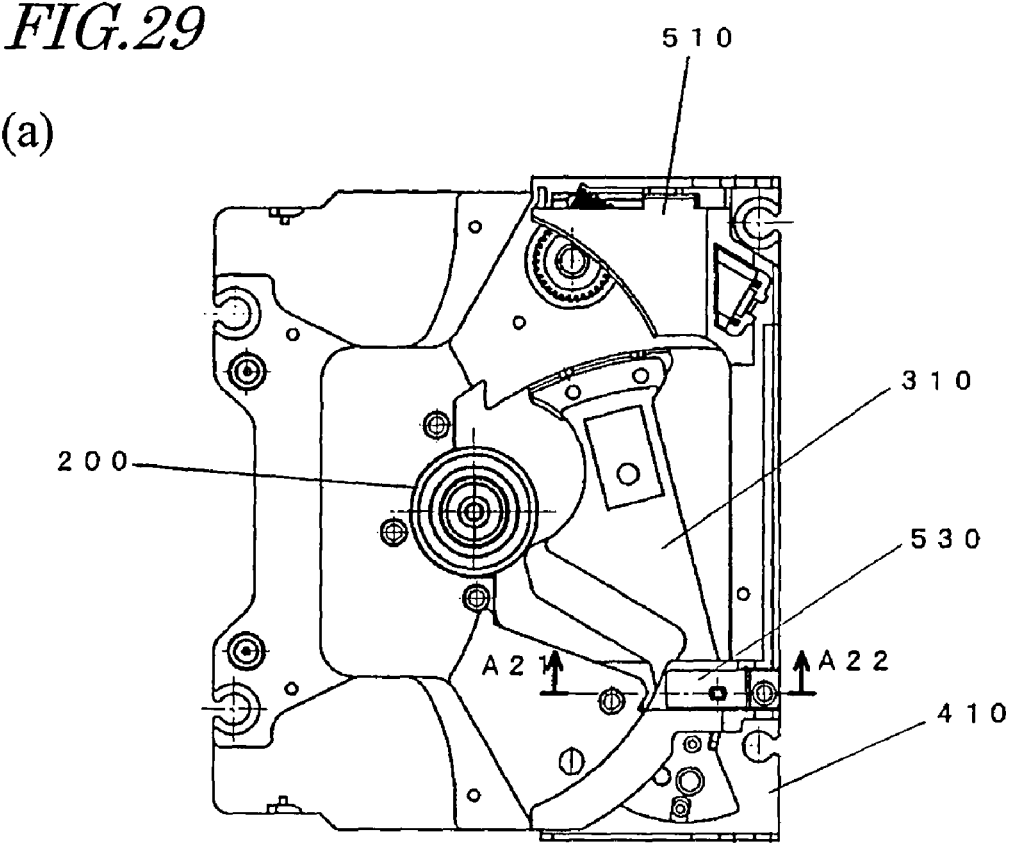
FIG. 29 (a) is a plan view showing a structure of the optical disc apparatus in Embodiment 6, and (b) is a cross-sectional view of (a) taken along line A21-A22.
Figure 29:
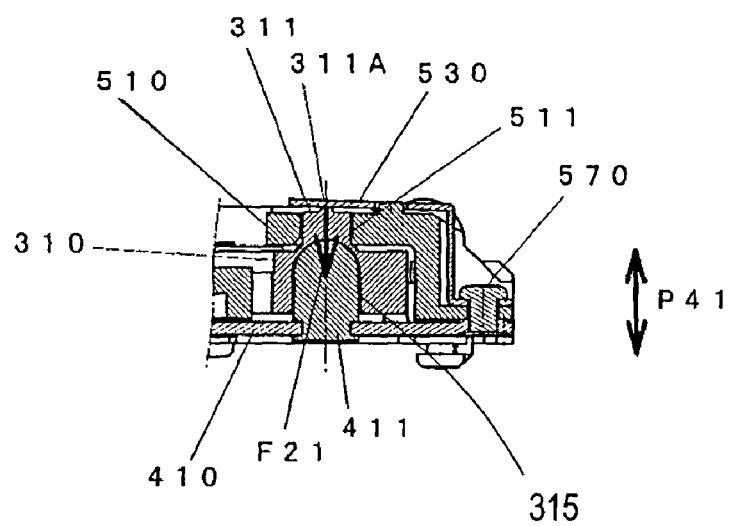

In this state, the first base unit 400 and the second base unit 500 are fixed to each other via a plurality of fixing screws 570 as shown in FIG. 27. Concurrently, a shaft forcing part 530 is fixed in the state of forcing the support boss 311 in the axial direction toward the first base 410. FIG. 29(a) is a plan view of the optical disc apparatus 606 seen in a direction of arrow P22 in FIG. 27. FIG. 29(b) shows a cross-section taken along line A21-A21 in FIG. 29(a), which is a cross-section taken along a plane including the axis thereof of the base shaft 411.

As shown in FIG. 29(b), the pickup base 310 is forced in a direction of arrow F21, i.e., toward the first base 410 by the shaft forcing part 530 via a contact projection 311A provided at an end of the support boss 311. Like in Embodiment 4, a tip of the base shaft 411 has a convexed spherical shape, and a bottom of the pickup rotating hole 315 has a concaved spherical shape. Therefore, forced by the shaft forcing part 530, the tip of the base shaft 411 and the bottom of the pickup rotating hole 315 make a point contact with each other. The position of the optical pickup 300 is adjusted such that the axis of the base shaft 411 and the axis of the pickup rotating hole 315 automatically match each other. Thus, the position of the rotating axis of the optical pickup 300 in a plane parallel to the optical disc 1 (the plane shown in FIG. 29(a)), and the position in height of the contact point of the tip of the base shaft 411 and the bottom of the pickup rotating hole 315, i.e., the position of the contact point in a direction of arrow P41, are defined. It is noted that since the base shaft 411 and the pickup rotating hole 315 make a point contact, inclinations of the optical pickup 300 with respect to the base shaft 411, i.e., inclinations the optical pickup 300 in a direction of arrow DR and a direction of arrow DT shown in FIG. 27 are not determined.

Alternatively, as shown in FIG. 28, the disc motor 200 may be positioned with respect to the first base 410 as follows, instead of by fitting the motor positioning boss 211 to the motor positioning boss hole 421 provided in the first base 410. The base positioning pins 551 and 552 provided on the second base 510 are inserted through the base positioning pin circular hole 431 and the base positioning pin rectangular hole 432 provided on the first base 410 and concurrently also through a motor positioning pin circular hole 221 and a motor positioning pin rectangular hole 222 provided on an attaching base face of the disc motor 200.

Using such a positioning structure, the attaching base face of the disc motor 200 having the motor positioning pin circular hole 221 and the motor positioning pin rectangular hole 222 can be held by the first base 410 and the second base 510, and also can be directly positioned with respect to the second base 510 as well as with respect to the first base 410. Therefore, the assembly precision of the optical disc 1 placed on the disc motor 200 and the second base 510 can be improved. As a result, for example, the engaging error between the pickup gear 330 and a pickup driving gear 550B described later can be reduced. It is noted here that an outer circumference face of the motor positioning boss 211 and the inner circumference face of the motor positioning boss hole 421 need to have a clearance therebetween, which is sufficient to prevent interference of the motor positioning boss 211 and the motor positioning boss hole 421 by an error.

Figure 30:
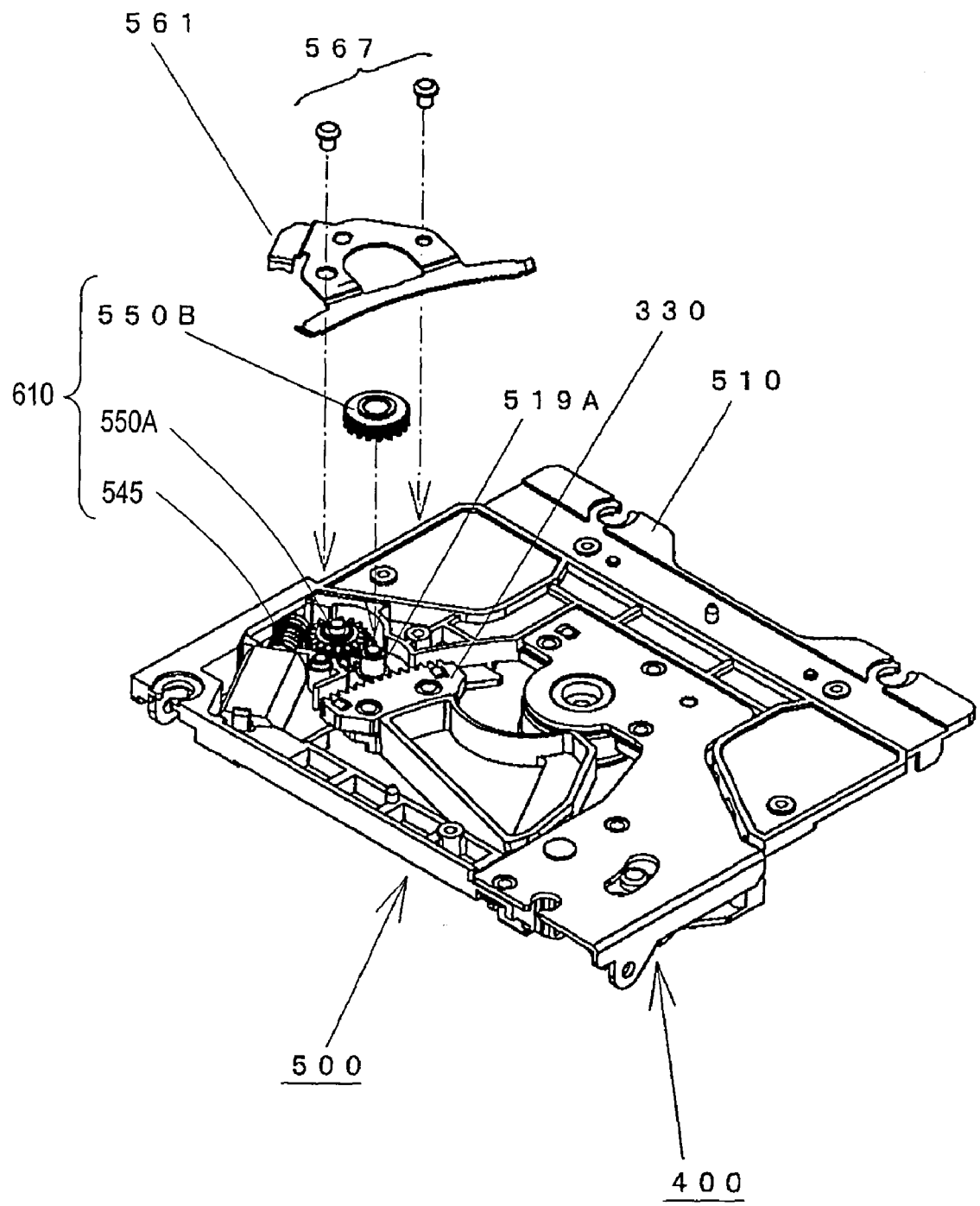
FIG. 30 is an isometric view showing assembly of the optical disc apparatus in Embodiment 6.

After the first base unit 400 is attached to the second base unit 500, as shown in FIG. 30, the rotating gear forcing part 561 is fixed to the second base 510 via forcing spring screws 567, and the pickup driving gear 550B is rotatably held by a driving gear shaft 519A. In this case, the pickup gear 330 is in contact with the rotating gear forcing part 561. Thus, the driving force transmission mechanism 610 is supported by the second base 500.

Figure 31:
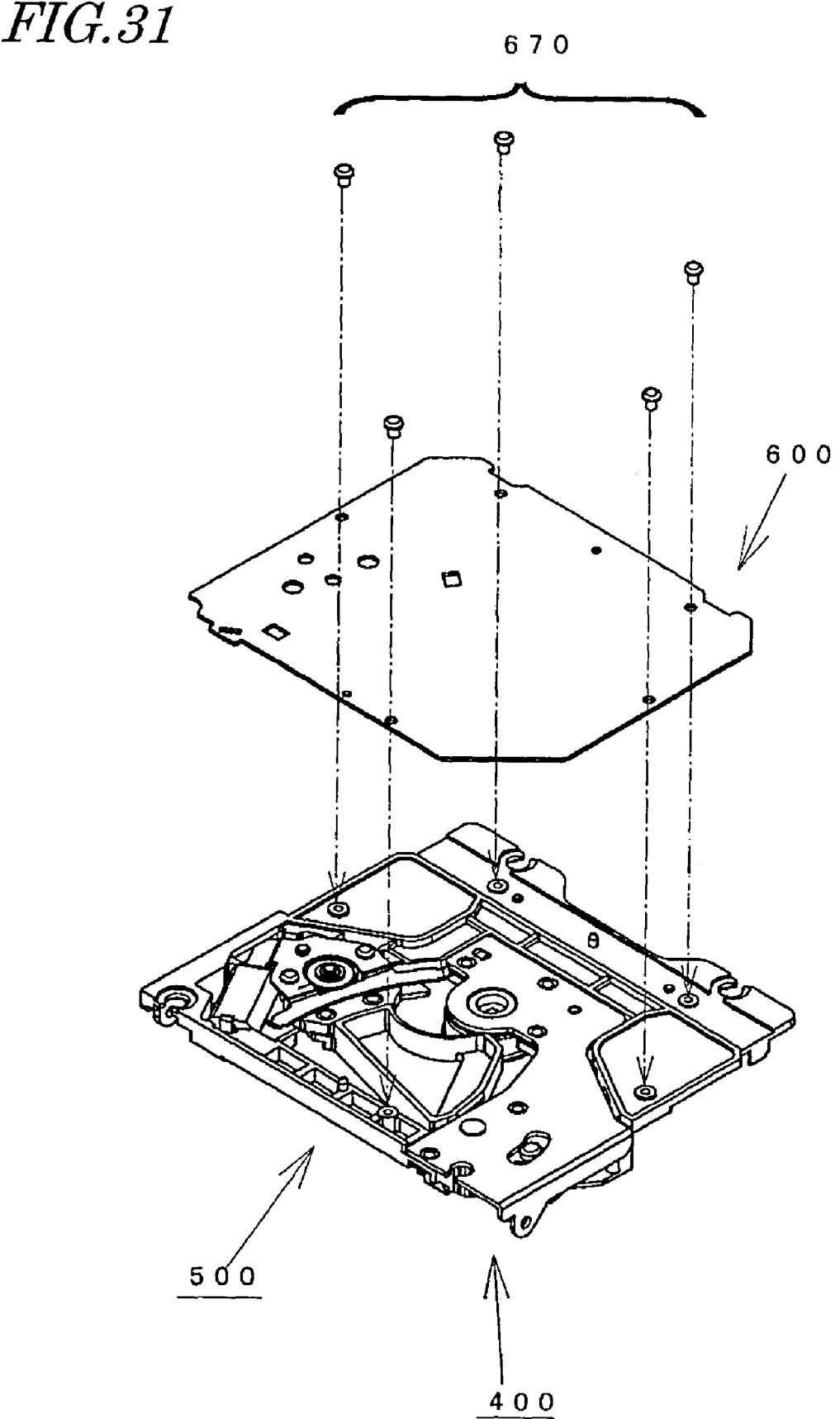
FIG. 31 is an isometric view showing assembly of the optical disc apparatus in Embodiment 6.

Finally, as shown in FIG. 31, the control circuit board 600 is fixed to the first base unit 400 and the second base unit 500 via circuit board fixing screws 670. In FIGS. 31, 20 and 21, the electronic circuits or lines provided in the control circuit board 600 are not shown.

Figure 26:
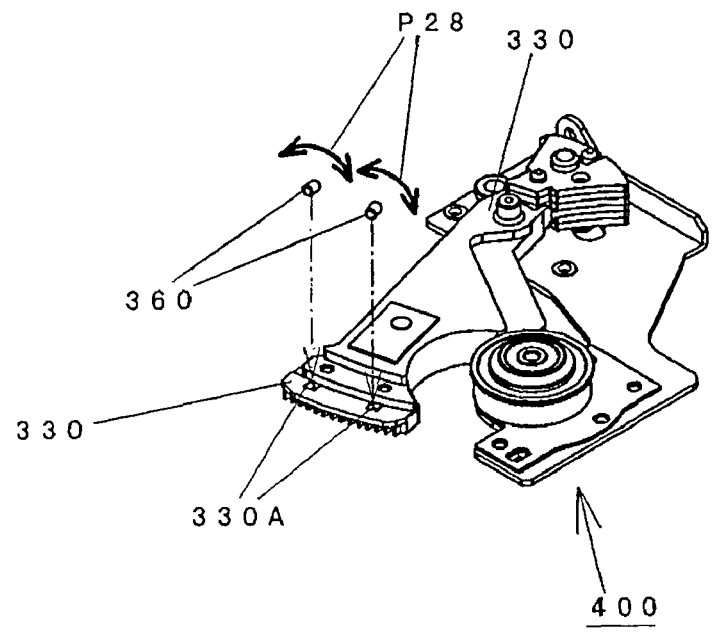
FIG. 26 (a) and (b) are each an isometric view showing assembly of the first base unit in the optical disc apparatus in Embodiment 6.
Figure 26:
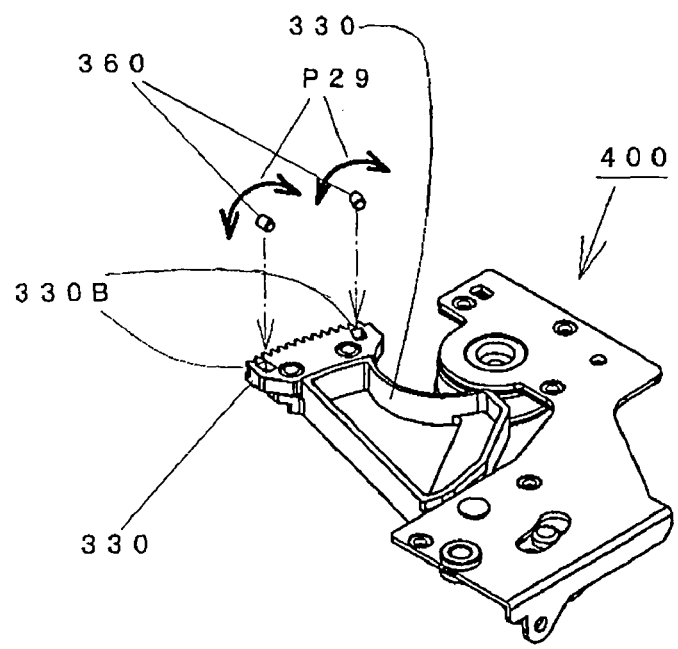
Figure 32:
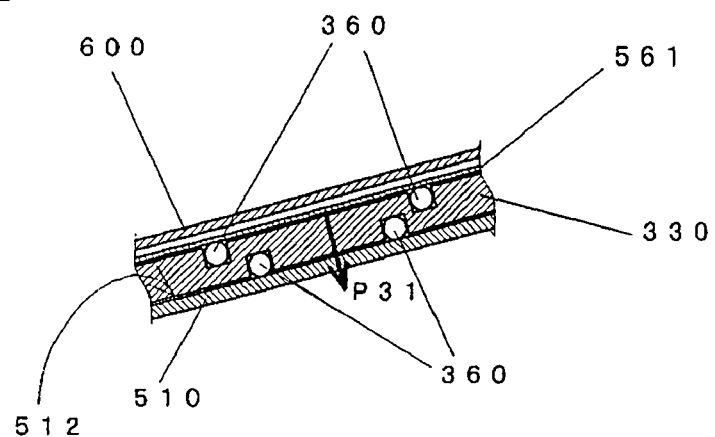
FIGS. 32 (a) and (b) are respectively a cross-sectional view and a plan view showing the contact state of pickup rollers and each of the second base and a rotating gear forcing part in the optical disc apparatus in Embodiment 6.
Figure 32:
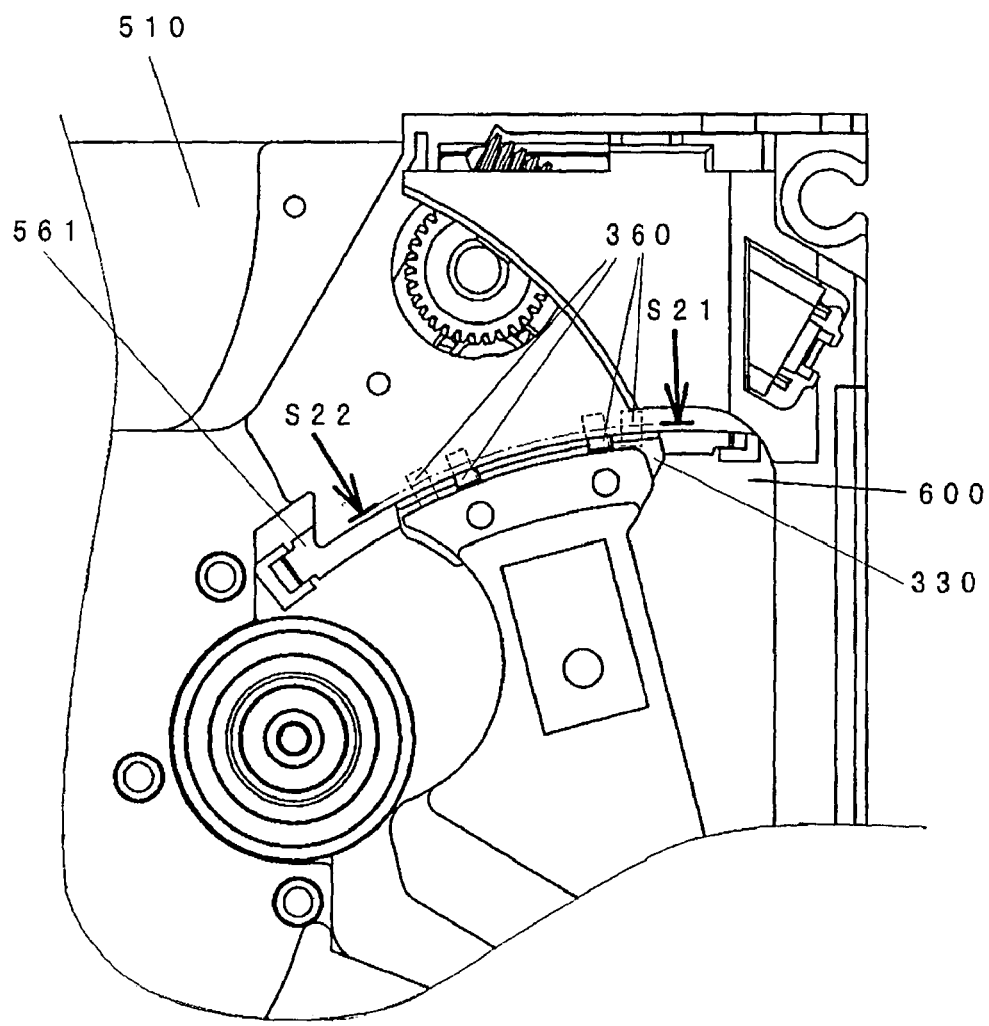

FIG. 32(*a*) and FIG. 32(*b*) show a contact part of the pickup gear 330 and each of the forcing bearing face 512 and the rotating gear forcing part 561. FIG. 32(*a*) shows a cross-section taken along a curved face S21-S22 in FIG. 32(*b*), the cross-section being represented as a two-dimensional plane for the sake of convenience. As shown in FIG. 32(*a*), the pickup gear 330 is forced in a direction of arrow P31 by the rotating gear forcing part 561 via the pickup rollers 360, and is also pressed against the forcing bearing face 512 of the second base 510 also via the pickup rollers 360. The rotating gear forcing part 561 and the control circuit board 600 has a gap therebetween. The rotation axis of the pickup rollers 360 is perpendicular to the rotating axis of the optical pickup 300 as shown in FIG. 26(*a*) and FIG. 26(*b*).

As shown in FIG. 32(*a*) and FIG. 32(*b*), the pickup gear 330 is forced toward the forcing bearing face 512 by the rotating gear forcing part 561 to eliminate the unsteadiness of the optical pickup 300 with respect to the rotating axis. In this case, it is preferable that the inner diameter of the pickup rotating hole 315 provided in the pickup base 310 and the outer diameter of the base shaft 411 are set to be sufficiently different from each other so as to prevent interference between the pickup rotating hole 315 and the base shaft 411.

The rotating gear forcing part 561 and the forcing bearing face 512 act as a second regulating part. The rotating gear forcing part 561 forces the pickup gear 330 toward the forcing bearing face 512 to regulate the pickup gear 330 in the direction of the rotating axis. Thus, the unsteadiness of the optical pickup 300 with respect to the rotating axis is eliminated, and the posture of the optical pickup 300 with respect to the rotating axis is determined. In this case, when, for example, the optical pickup 300 receives an external force in a direction parallel to the rotating axis, the posture can be maintained against the external force with a lighter load as compared with the case where the posture of the optical pickup 300 is determined by the pickup rotating hole 315 and the base shaft 411. As a result, even when a large external force is applied to the optical pickup 300, the elements thereof can be prevented from being deformed or broken and so an inadvertent change of the posture thereof can be avoided. Therefore, the adverse influences on the recording to and/or the reproduction from the optical disc 1 performed by the optical pickup 300 can be eliminated.

Figure 33:
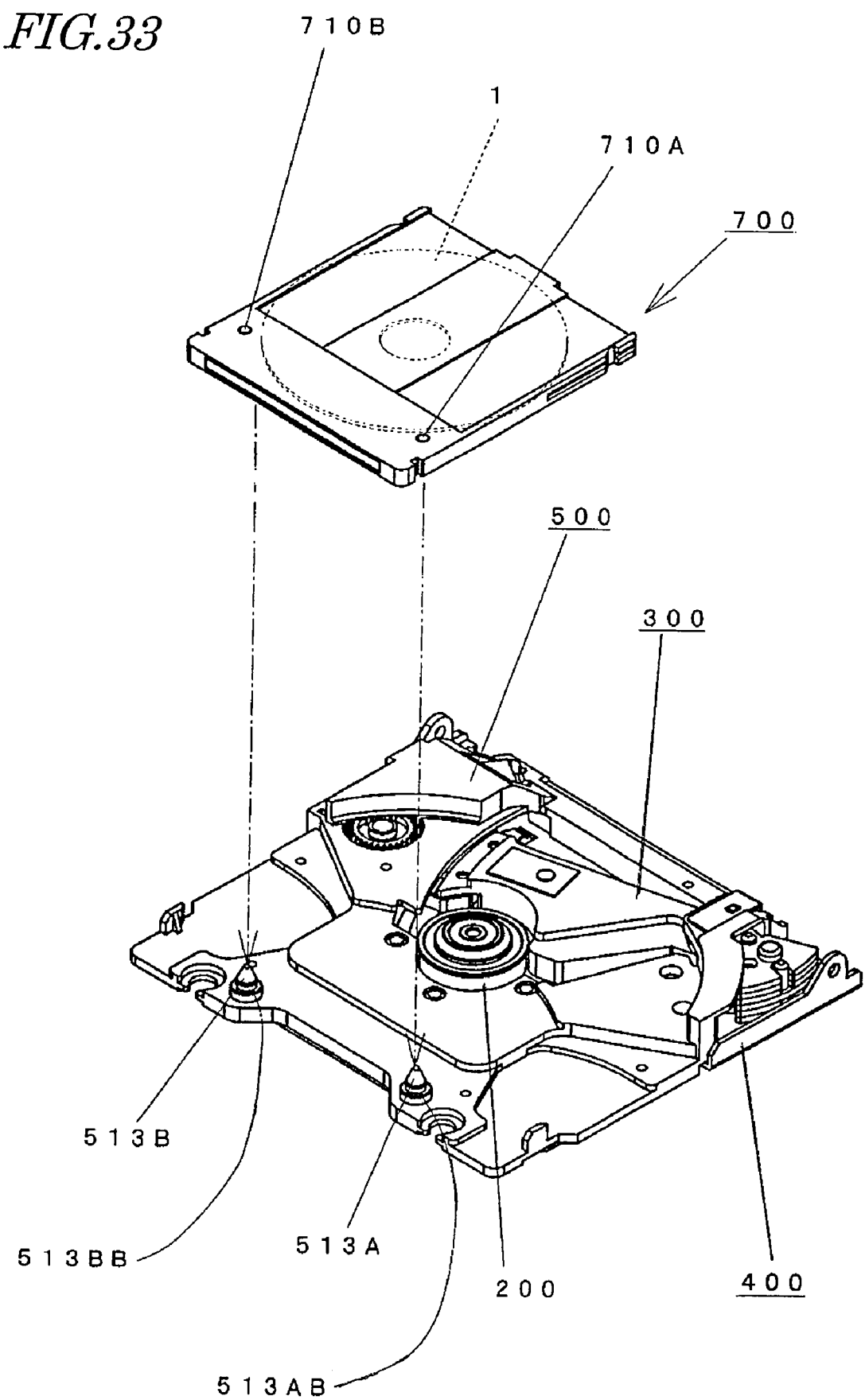
FIG. 33 is an isometric view showing a state of mounting a disc accommodated in a disc cartridge in the optical disc apparatus in Embodiment 6.

The optical disc apparatus 606 is usable with the optical disc 1 being accommodated in a disc cartridge for, for example, DVD-RAM. FIG. 33 shows how the optical disc 1 is placed on the disc motor 200 while being accommodated in a disc cartridge 700.

The disc cartridge 700 has two positioning holes 710A and 710B for positioning the disc cartridge 700 in a direction parallel to the optical disc 1. The second base 510 has positioning pins 513A and 513B at positions corresponding to the positioning holes 710A and 710B. At the foot of the positioning pins 513A and 513B, seats 513AB and 513BB are provided. The disc cartridge 700, when being mounted, contacts the seats 513AB and 513BB, and the position of the disc cartridge 700 in a direction perpendicular to the optical disc 1 is also determined. Thus, the disc cartridge 700 is restricted with respect to the second base 510, and as a result, also to the first base 410. In this state, the optical disc 1 accommodated in the disc cartridge 700 is placed on the disc motor 200.

The clearance between the optical disc 1 and an inner face of the disc cartridge 700 is usually set to be a minimum necessary value in order to inhibit the increase of the overall size of the disc cartridge 700. In order to minimize the clearance, it is effective to improve the positional precision between the disc cartridge 700 and the optical disc 1 in the state where the disc cartridge 700 is mounted on the optical disc apparatus 606.

With the optical disc apparatus 606, as described above and as shown in FIG. 27 and FIG. 28, the base positioning pins 551 and 552 are inserted through the base positioning pin circular hole 431 and the base positioning pin rectangular hole 432 as well as the motor positioning circular hole 221 and the motor positioning rectangular hole 222. Thus, the disc motor 200 is positioned with respect to the first base 410 as well as the second base 510. Therefore, the positional precision between the optical disc 1 placed on the disc motor 200 and the disc cartridge 700 placed on the second base 510 can be easily improved. As a result, the adverse influences on the recording to, or the reproduction from, the optical disc 1 can be eliminated. For example, the following situations can be prevented: the optical disc 1 contacts the disc cartridge 700 to flaw the information recording face of the optical disc 1; the rotation load on the optical disc 1 is increased or varied; or the optical disc 1 is vibrated.

Like in Embodiment 1, the distance between the pickup gear 330 and the rotating axis of the optical pickup 300 is longer than the distance between the center of gravity G1 of the entire optical pickup and the rotating axis of the optical pickup 300. Therefore, when the entire apparatus receives an impact force in the rotating direction of the pickup, the force applied on the center of gravity of the optical pickup 300 is divided into a component applied on the base shaft 411 and a component applied on the driving force transmission mechanism 610. As a result, the force applied on the driving force transmission mechanism 610 is alleviated. Hence, the driving force transmission mechanism 610 only needs to provide a small stopping force to prevent the optical pickup 300 from rotating due to the impact force. Thus, the strength of the components or the entire structure of the driving force transmission mechanism 610 can be reduced. As described in Embodiment 2, the force applied on the driving force transmission mechanism 610 is further alleviated by the balancing weight 350.

In this embodiment, the base main body includes the first base 410 and the second base 510. Therefore, only the optical pickup and the disc rotation mechanism, which need to have a certain level of mutual positional precision with certainty, are held by the first base formed of a material having a high specific gravity, for example, a metal material with little size change. The second base, which does not need to have such a high level of positional precision as the first base, may be formed of a material having a lower specific gravity than that of the first base. Thus, the weight of the entire optical disc apparatus can be reduced to a minimum necessary level.

Embodiment 7

Figure 34:
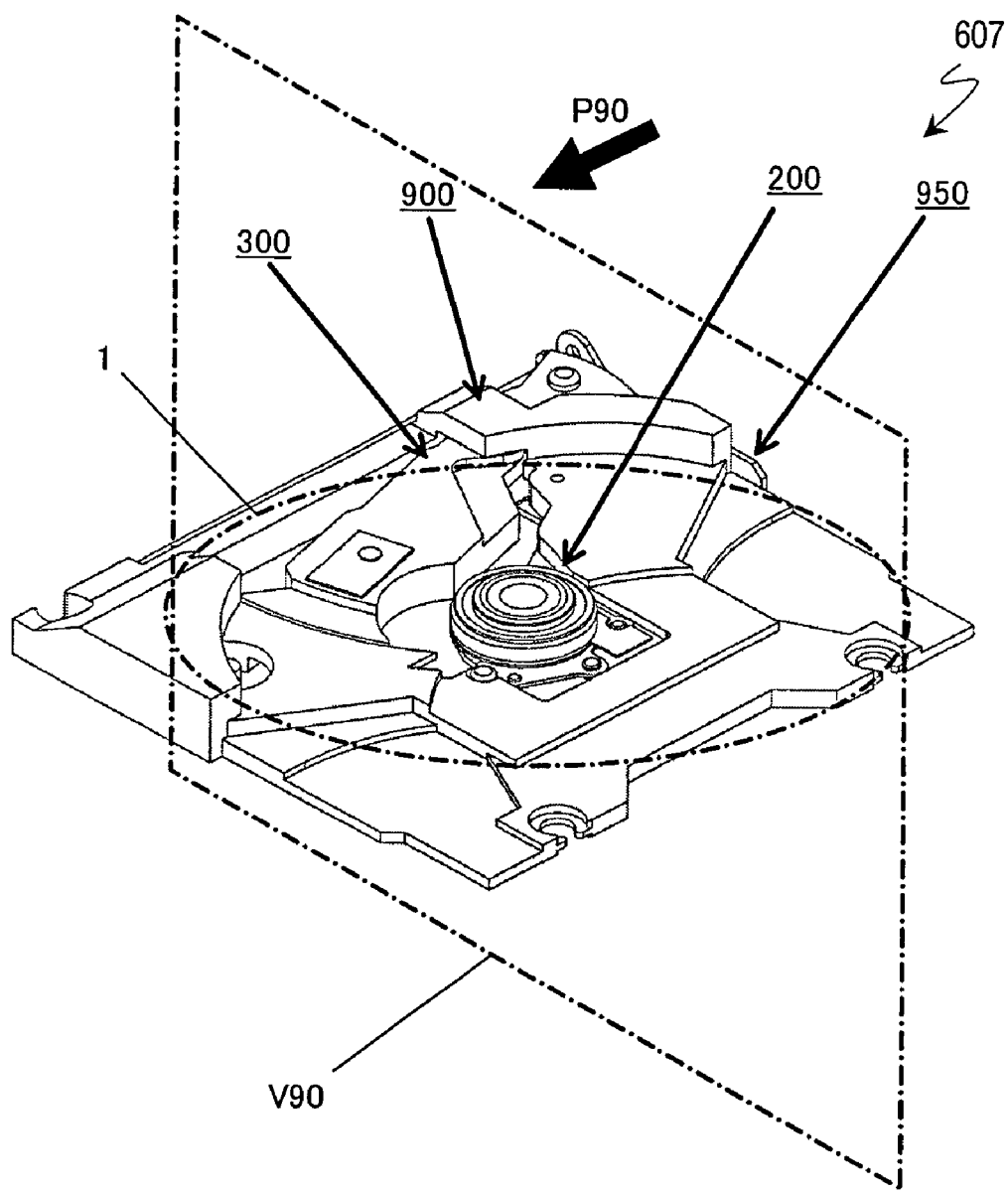
FIG. 34 is an isometric view showing an overall structure of an optical disc apparatus in Embodiment 7 according to the present invention.
Figure 35:
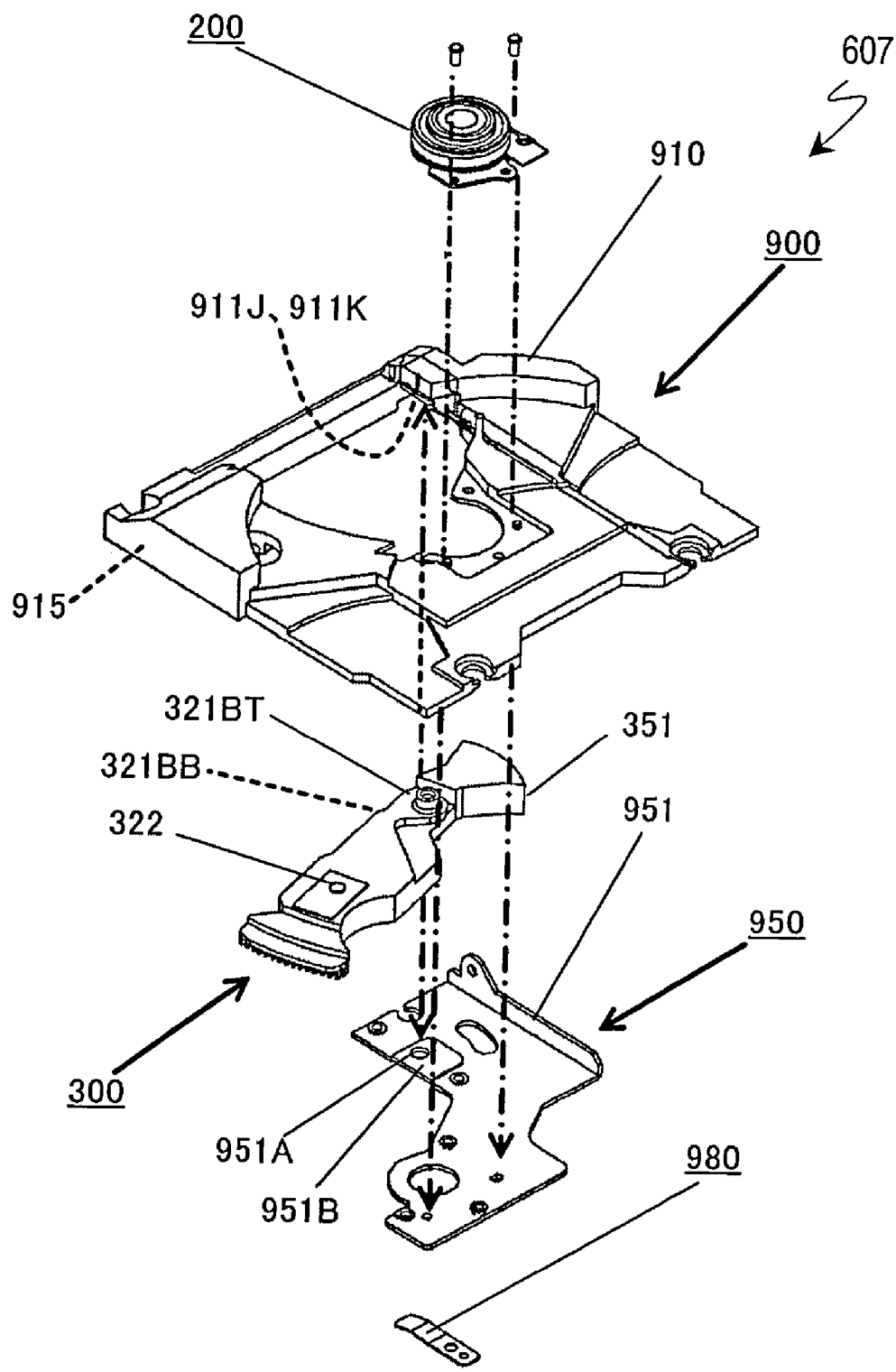
FIG. 35 is an exploded isometric view the optical disc apparatus in Embodiment 7.
Figure 36:
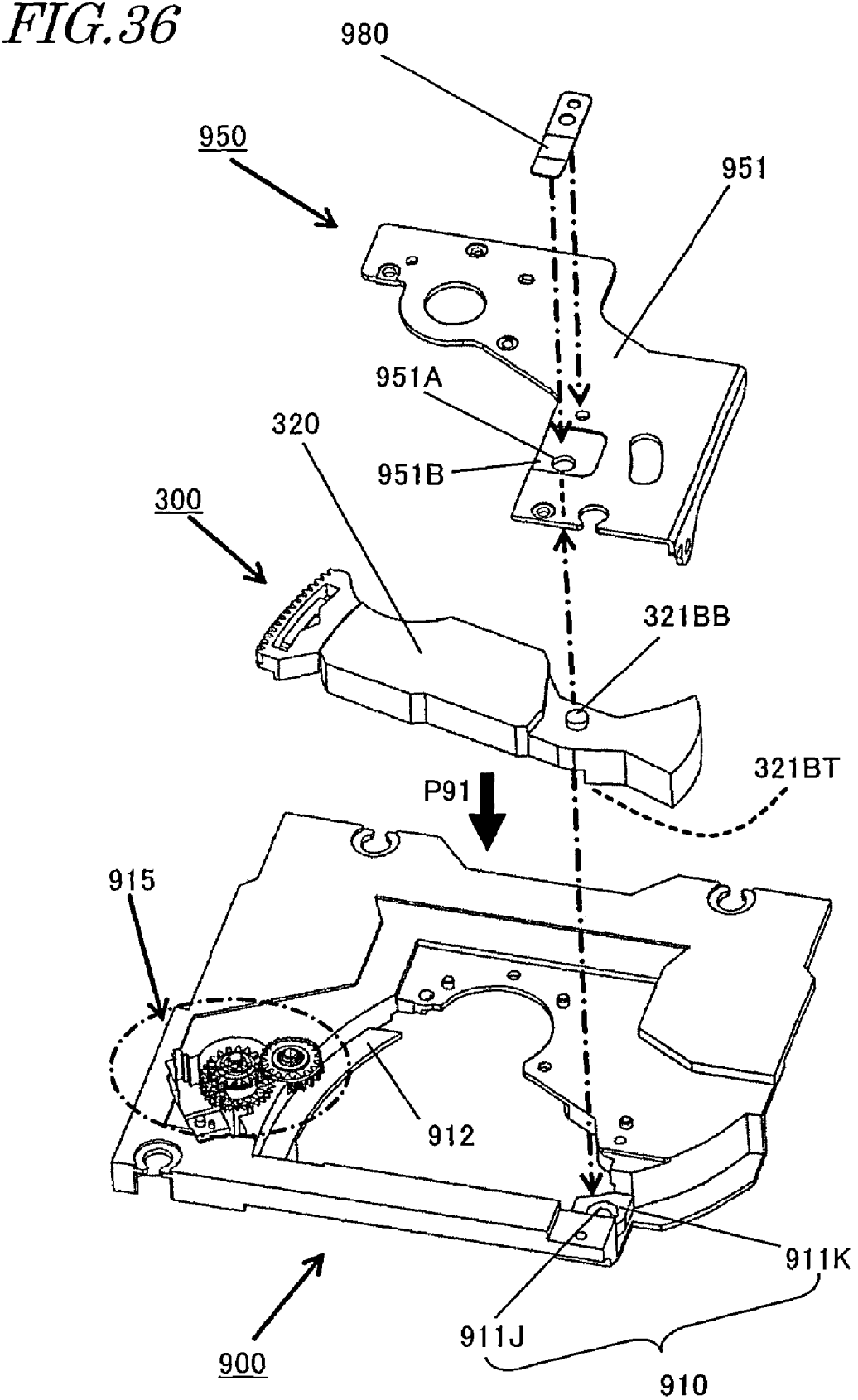
FIG. 36 is an exploded isometric view the optical disc apparatus in Embodiment 7.
Figure 37:
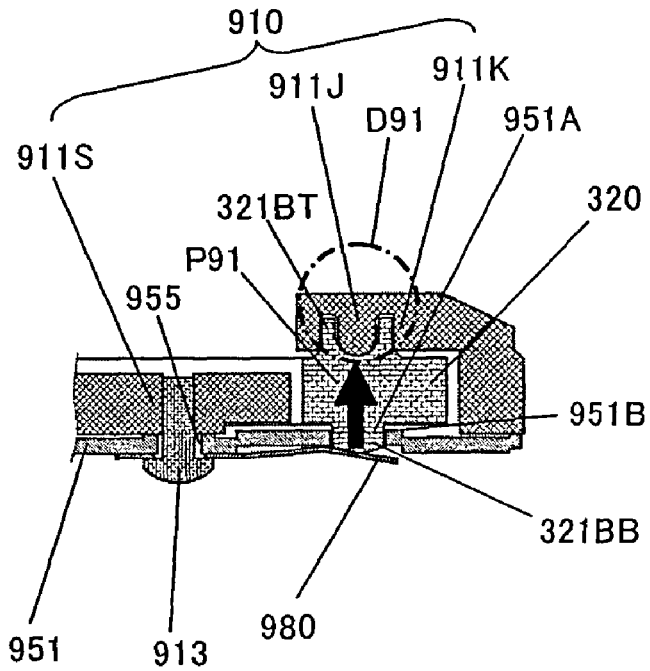
FIGS. 37 (a) and (b) are each a cross-sectional view of a rotating axis and the vicinity thereof of the optical disc apparatus in Embodiment 7.
Figure 37:
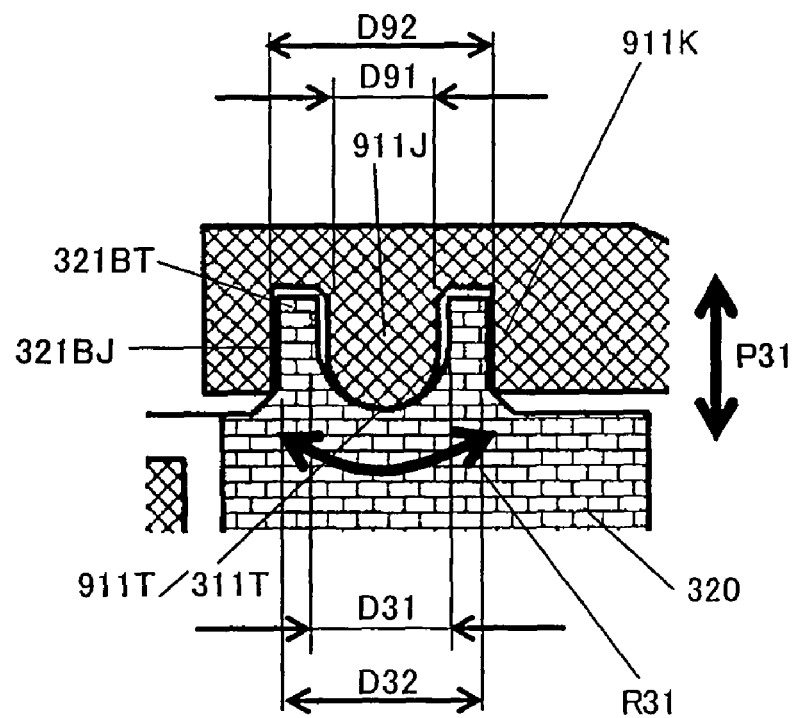

Hereinafter, an optical disc apparatus in Embodiment 7 according to the present invention will be described. FIG. 34 is an isometric view showing the entirety of an optical disc apparatus 607. FIG. 35 and FIG. 36 are each an exploded isometric view of the optical disc apparatus 607, seen from different directions. FIG. 37(a) shows a cross-section thereof taken along a plane which is parallel to face V90 in FIG. 34 and includes the rotating axis of the optical pickup. FIG. 37(a) shows the cross-section seen in a direction of arrow P90. FIG. 37(b) is an enlarged view of part D91 in FIG. 37(a).

The optical disc apparatus 607 is different from the corresponding apparatus in Embodiment 6 in the structure for supporting the optical pickup 300.

Like in Embodiment 6, the optical disc apparatus 607 includes a disc motor 200, an optical pickup 300, a first base unit 950, and a second base unit 900. The disc motor 200 allows an optical disc 1 having an information recording face on at least one surface thereof, and rotates the optical disc 1. The optical pickup records information on the information recording face of the optical disc 1 and reproduces information recorded on the information recording face.

The second base unit 900 fixes the disc motor 200 and rotatably holds the optical pickup 300. A driving system 915 for rotating the optical pickup 300 is incorporated into the second base unit 900. The first base unit 950 covers and holds the disc motor 200 and the optical pickup 300 incorporated into the second base unit 900.

Like in Embodiment 6, the driving system 915 includes a transportation motor and a driving force transmission mechanism. The driving force transmission mechanism includes a worm, a middle gear, and a pickup driving gear. The structures and functions of these elements are the same as in Embodiment 6.

As shown in FIG. 36, a second base 910 has an forcing bearing face 912 provided thereon. Like in Embodiment 6, the pickup rotating gear of the optical pickup 300 is forced toward the forcing bearing face 912 by a component corresponding to the rotating gear forcing part 561 (not shown).

Although omitted in FIGS. 34, 35 and 36, the optical disc apparatus 607 includes a control circuit board, which controls the disc motor 200, the optical pickup 300 and the driving system 915.

As shown in FIGS. 35, 36, 37(a) and 37(b), a rotating shaft 911J provided on the second base 910 is inserted into the pickup rotating hole 321BT provided in a pickup base 320 until the end of the rotating shaft 911J, and thus the pickup base 320 is rotatably held with respect to the second base 910. A support boss 321BB provided on the pickup base 320 coaxially with the rotating shaft 911J is inserted into a support hole 951A provided in a first base 951. The support hole 951A and the support boss 321BB have a gap therebetween, which is sufficient to accommodate a positional shift error between the second base 910 and the first base 951 in a direction perpendicular to the axial line of the rotating shaft 911J.

Like in Embodiment 6, the first base 951 and the second base 910 are positioned to each other. As shown in FIG. 37(a) and FIG. 37(b), the second base 910 and the first base 951 are tightened together by use of a screw hole 911S provided in the second base 910, a fixing hole 955 provided in the first base 951, and a screw 913.

As shown in FIGS. 35, 36 and 37(a), an end tip of the support boss 321BB of the pickup base 320 is forced in a direction of arrow P91, i.e., toward the second base 910 by an axis forcing part 980 fixed to the first base 951. Thus, a tip of the rotating shaft 911J having a convexed spherical shape is pressure-contacted against a bottom of the pickup rotating hole 321BT having a concaved spherical shape, and is positioned in a direction of arrow P31 shown in FIG. 37(b). The forcing force of the axis forcing part 980 at this point is set to be at least a level at which the tip of the rotating shaft 911J would not be separated from the bottom of the pickup rotating hole 321BT in any situation during the operation of the optical disc apparatus 607. It is noted that if a force beyond the assumed level is generated, an escape occurs in a direction opposite to the direction of arrow P91. In such a case, the movement of the pickup base 320 is regulated by a regulating face 951B provided on the first base 951. The regulating face 951B is provided as a stepped part from a main surface of the first base 951 and has a height which defines a necessary escape amount.

As shown in FIG. 37(b), an outer diameter D91 of the rotating shaft 911J is set to be smaller than an inner diameter D31 of the pickup rotating hole 321BT, and so the pickup base 320 has a certain degree of freedom in a direction of arrow R31 with respect to the first base 910.

As shown in FIG. 37(b), the pickup base 320 has a pickup rotating hole outer cylinder 321BJ having a cylindrical side face around the outer circumferential face of the pickup rotating hole 321BT. The pickup rotating hole outer cylinder 321BJ projects from the pickup base 320 along the rotating axis on the opposite side to the support boss 321BB. The pickup rotating hole 321BT is formed by such projection.

The pickup rotating hole outer cylinder 321BJ is surrounded by an assisting cylindrical part 911K provided on the second base 910 and is restricted in terms of moving. It is noted that an outer diameter D32 of the pickup rotating hole outer cylinder 321BJ is set to be smaller than an inner diameter D92 of the assisting cylindrical part 911K, and a gap is present between the two elements. Thus, during a usual operation, the pickup base 320 has a certain degree of freedom in the direction of arrow R31 in FIG. 37(b) with certainty.

Owing to such a structure, the optical pickup 300 is rotatably supported by the first base 950 and the second base 910 as in Embodiment 6.

Figure 38:
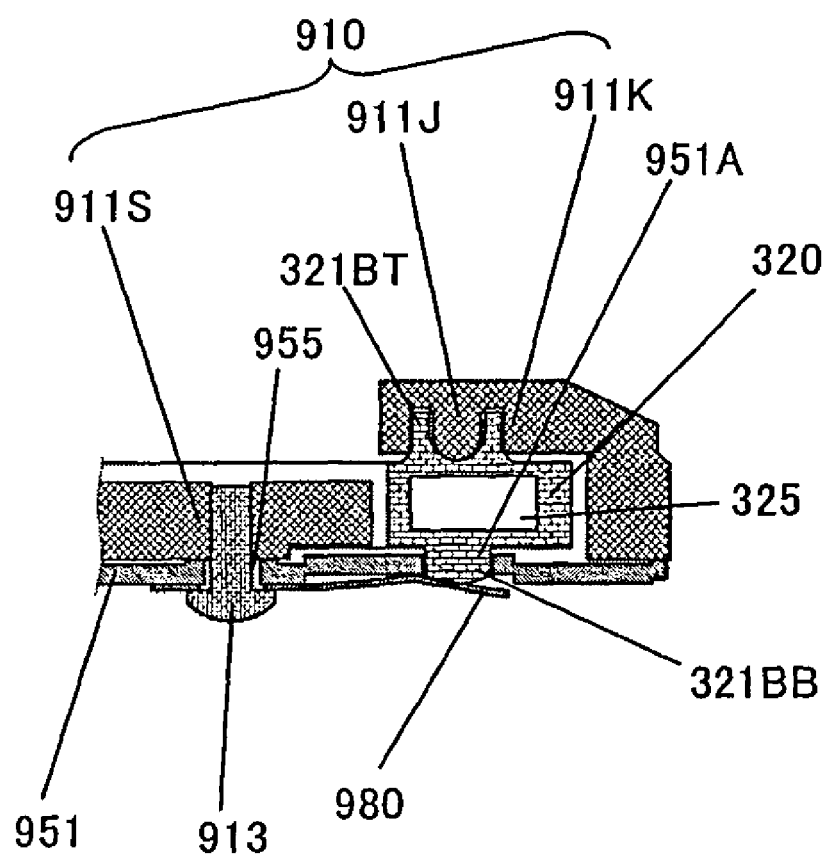
FIG. 38 is a cross-sectional view of the rotating axis and the vicinity thereof of the optical disc apparatus in Embodiment 7.
Figure 39:
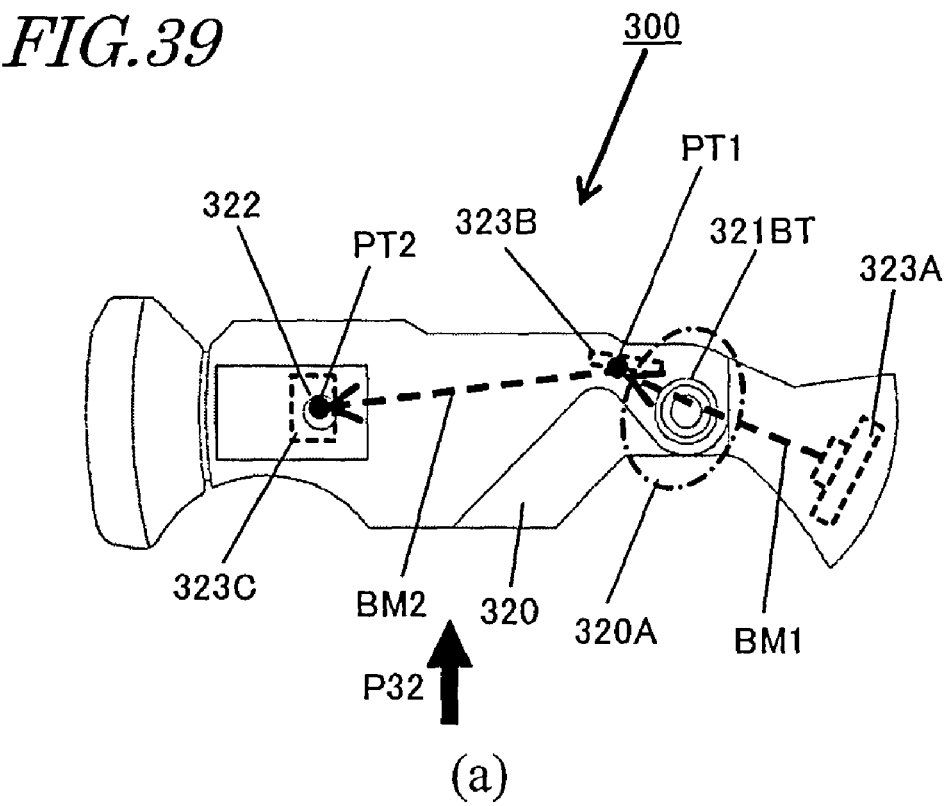
FIGS. 39 (a) and (b) are each a schematic view showing a structure of an optical system inside an optical pickup in the optical disc apparatus in Embodiment 7.
Figure 39:
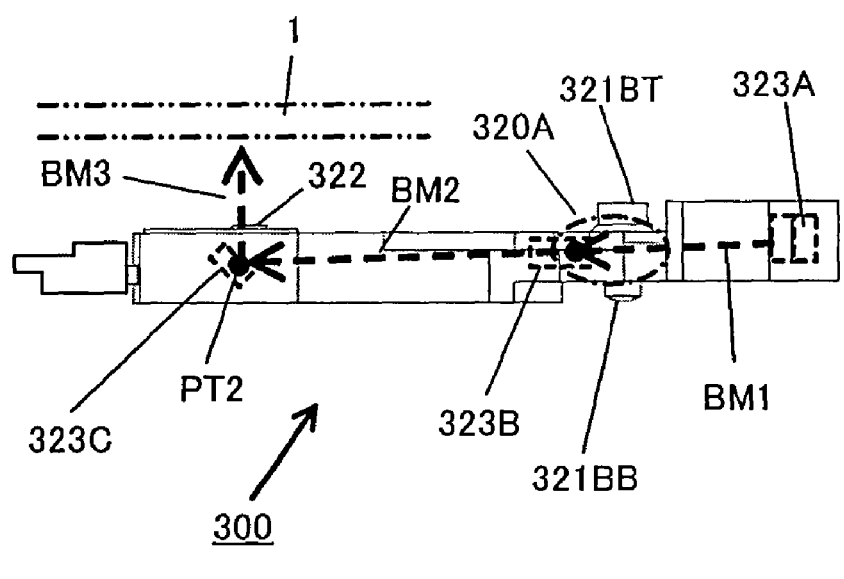
Figure 40:
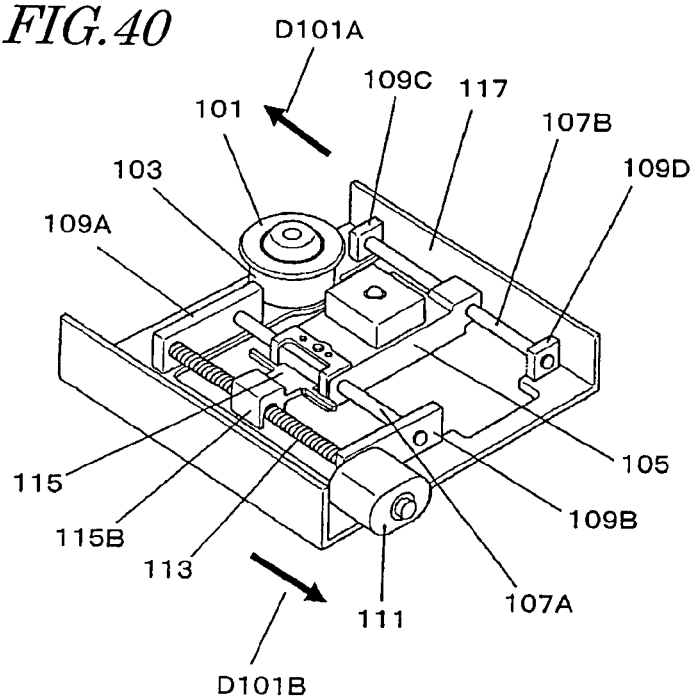
FIG. 40 is an isometric view showing an overall structure of a conventional optical disc apparatus.
Figure 41:
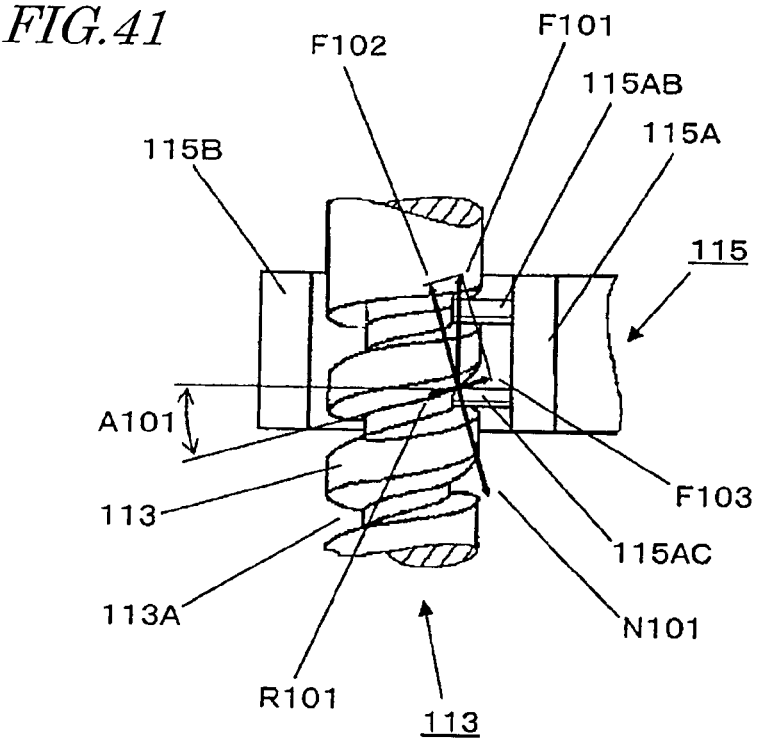
FIG. 41 shows a pickup transportation driving mechanism in the conventional optical disc apparatus in detail.

In this embodiment, the pickup rotating hole outer cylinder 321BJ projecting from the pickup base 320 is provided, and the pickup rotating hole 321BT is located inside the pickup rotating hole outer cylinder 321BJ. The pickup base 320 is rotatably held by the pickup rotating hole 321BT and the support boss 321BB. Therefore, as shown in FIG. 38, a space can be provided in an area 325 with certainty. In this case, the balancing weight 350 is not provided, unlike in Embodiment 6. The area 325 is provided inside the pickup base 320 and so is usable for locating an optical system or the like. A structure thereof will be described with reference to FIG. 39.

FIG. 39(a) shows the optical pickup 300 seen in a direction parallel to the rotating shaft 911J, and FIG. 39(b) shows the optical pickup 300 seen in a direction of arrow P32 in FIG. 39(a). As shown in FIG. 39(a) and FIG. 39(b), the optical pickup 300 includes an objective lens 322, a laser light source 323A, a bending mirror 323B, and a rising mirror 323C. The laser light source 323A, the bending mirror 323B and the rising mirror 323C are represented with the dashed lines in FIG. 39(a) and FIG. 39(b).

In the optical pickup 300, the objective lens 322 is supported by an actuator (not shown) for driving the objective lens 322 and is located at a position facing the optical disc 1. The laser light source 323A is located in the area 325 shown in FIG. 38. A laser light beam BM1 emitted from the laser light source 323A passes through an area 320A including the area 325 of the optical pickup 300, is reflected by the bending mirror 323B and reaches the rising mirror 323C located below the objective lens 322 as a light beam BM2. The light beam BM2 is reflected by the rising mirror 323C toward the objective lens 322, and a light beam BM3 is incident on, and collected to, the objective lens 322. The information recording face of the optical disc 1 is irradiated with the collected light beam BM3.

As described above, with the optical disc apparatus 607, an optical path of the optical system is located so as to cross a cross-section passing through the rotating axis of the optical pickup 300. Therefore, the designing freedom of the optical system in the optical pickup 300 can be improved. In this case, the pickup base 320 itself can have a function corresponding to the balancing weight 350 described in Embodiment 6. Alternatively, the weight of an optical component may be used as the balancing weight 350.

The optical system of the optical pickup 300 described in this embodiment has a simple structure. However, there is no specific limitation on the structure of the optical system, and an optical system of another structure may be incorporated into the optical pickup 300.

In this embodiment, an area around the rotating axis of the pickup base 320, i.e., the area 325 shown in FIG. 38 is used as an area through which the first beam BM1 passes. Alternatively, an optical component such as a lens or a prism or the like may be located in this area.

In the above-described embodiments, the inner circumferential face of the support hole 4A is structured so as not to contact the outer circumferential face of the support boss 3C in a usual state. However, it is not necessary to positively provide a gap between the two elements in the case where the axis shift error and the diameter error between these elements can be properly inhibited and the assembly error can be managed, or an adjustment is made in order to eliminate the assembly error.

In the above-described embodiments, the pickup gear 3D and the pickup driving gear 11 are structured to be mutually driven by spur teeth thereof. In the case where the freedom of the optical pickup 3 other than the rotating around the base shaft 13A is completely eliminated by supporting the optical pickup 3 more strongly by the base shaft 13A or by increasing the rigidity of the pickup base 3G, the optical pickup 3 does not move unnecessarily in a direction parallel to the rotating axis thereof or vibrate while the pickup gear 3D is being driven by the pickup driving gear 11. Therefore, the spur teeth part 9B provided in the middle gear 9 may be a helical gear, in which case the specifications thereof need to be matched with those of the pickup driving gear 11 and the pickup gear 3D. Thus, the sound pressure of a driving noise generated when the optical pickup 3 is transported in the direction of arrow D1A or arrow D1B can be reduced.

In the case where the pickup base 3G is formed of a material which does not obstruct the engagement with the pickup driving gear 11, the pickup gear 3D may be formed integrally with the pickup base 3G. This can decrease the number of components and also the number of assembly steps.

The balancing weight 3E has a plate-like structure. Substantially the same effect can be provided by integrating the upper three plates and also integrating the lower two plates. The balancing weight 3E may have an attaching structure capable of integrating the upper plates and the lower plates together.

As described above by way of various embodiments, with an optical disc according to the present invention, the pickup is rotatably supported on the base main body, and the position of the engaging section is farther from the rotating axis of the optical pickup than the center of gravity of the entire optical pickup. Therefore, when the entire apparatus receives an impact force in the transportation direction, the force applied on the center of gravity of the optical pickup is divided into a component applied on the rotating axis of the pickup and a component applied on the driving force transmission mechanism. As a result, the force applied on the driving force transmission mechanism is alleviated. Hence, the driving force transmission mechanism only needs to provide a small stopping force to forcibly prevent the optical pickup from rotating. It is not necessary to provide a specifically strong structure for the driving force transmission mechanism.

The driving force transmission mechanism includes a worm. Therefore, when the optical pickup receives an impact force in a rotation direction thereof, inverse transmission of the driving force toward the driving source can be avoided with a simple structure.

Since the rotating radius of the driving position during the rotating of the optical pickup is large, the driving force for rotating can be reduced. Thus, it is not necessary to give a specific consideration to the axis loss or the like while the optical pickup is being rotatably supported. Therefore, the driving force transmission mechanism can be structured without using an expensive loss-reducing component, such as a bearing, which would increase the cost of the apparatus. This can contribute to cost reduction.

When the optical pickup receives an impact force in a rotation direction thereof, inverse transmission of the driving force by the worm toward the driving source can be avoided on the stage of designing with certainty.

With an optical disc apparatus according to the present invention, generation of a force in a direction of the rotating axis direction of the optical pickup from the driving force transmission mechanism can be inhibited with a simple structure. Thus, generation of vibrations, jitters or the like can be prevented during the rotating of the optical pickup with a simple structure.

The driving spur gear or the pickup spur gear can be prevented from being broken at the foot of the teeth with a simple structure. It is also possible to inhibit the movement of the pickup spur gear in an axial direction thereof; i.e., it is possible to inhibit the movement of the engaging section of the pickup spur gear and the driving spur gear in the axial direction and thus to prevent the entire optical pickup from inclining.

When the optical pickup receives an impact force in the rotation direction thereof, it is possible to avoid the teeth of the pickup spur gear and the driving spur gear from being broken at the engaging section, on the stage of designing with certainty.

The unsteady wavering of the optical pickup in the rotating direction and the vibration of the optical pickup during the operation can be avoided by forcing the rotating axis toward the base main body. Since the forcing position is on the rotating axis, the frictional force generated by the forcing does not have a moment around the rotating axis. Therefore, the influence on the rotating motion of the optical pickup can be minimized. In addition, the rotating support shaft itself can be structured to be short. Therefore, when a force is applied on the tip of the rotating support shaft, the strength of the shaft in the inclining direction can be substantially increased.

The sliding load on the holding section for rotatably holding the optical pickup is very small. This makes it possible to reduce the driving load for rotating.

The direction in which the base shaft is inclined is restricted so that the pickup base, the base shaft and the base main body are not deformed beyond the elastic deformation region of the respective material. This makes it possible to avoid each of these members from being plastically deformed.

The base shaft can be supported throughout the circumference thereof so as not to be inclined. Therefore, the base shaft has a high impact resistance in all the directions.

The axial direction support member can be prevented from being deformed beyond the elastic deformation region thereof.

The support on the base shaft in a direction in which the base shaft is inclined and in a direction in which the base shaft comes off from the base shaft can be provided with one, same member. This can decrease the number of the components and the number of assembly steps.

The support on the base shaft in a direction in which the base shaft is inclined and in a direction in which the base shaft comes off from the base shaft can be provided with one, same member, and further the axial direction forcing member can also be formed of the same member. This can further decrease the number of the components and the number of assembly steps.

The optical pickup is supported in a direction in which the optical pickup comes off, i.e., in the rotating axis direction of the optical pickup, is provided at the driving position or the vicinity thereof as well as at the position of the rotating axis or the vicinity thereof. Therefore, the strength of inhibiting the optical pickup from coming off in the rotating direction can be further increased.

When the entire apparatus receives an impact force in the rotating direction of the optical pickup, at least a part of the rotating force is counteracted by the weight. Therefore, the force applied on the driving force transmission mechanism can be further alleviated.

The weight may be provided on the opposite side to the center of gravity. In this case, when the optical pickup receives an impact force in the rotation direction, it is possible to avoid the teeth of the pickup spur gear and the driving spur gear from being broken at the engaging section, on the stage of designing with certainty.

A disc cartridge, having a structure by which two disc accommodating sections having both a shutter function and a housing function are rotated in both of two directions to open or close the window, may be used. In this case, it is possible to insert a part of the optical pickup into an area created in the state where the accommodated disc is exposed for the purpose of recording or reproduction, so that the space is effectively used. Thus, the size of the entire optical disc apparatus can be reduced.

The optical pickup is rotatably supported, and is restricted in the axial direction of the rotating center by a first regulating part in the vicinity of the rotating center and a second regulating part having a rotating radius larger than the rotating radius of the center of gravity of the entire optical pickup from the rotating center. Therefore, when the optical pickup receives an external force such as an impact force or the like in the axial direction of the rotating center, the optical pickup is held by the first regulating part and the second regulating part interposing the center of gravity. Thus, it is possible to prevent, with certainty, the optical pickup from coming off from the optical disc apparatus, or being deformed, in this direction.

The unsteady wavering of the optical pickup at or in the vicinity of the rotating center thereof in the axial direction is eliminated, or the vibrations at the rotating center part during the rotating operation or the like are inhibited. Thus, system malfunctions regarding the recording to, or reproduction from, the disc can be prevented.

The optical pickup is rotatably held in the state where the rotating shaft and the rotating hole having a spherical shape at the tip and at the bottom respectively contact with each other. Therefore, the contact area is made significantly small, and the rotating load can be reduced.

The disc rotation mechanism is held while being interposed between the first base and the second base. This makes it possible to obtain, with certainty, a large holding strength in the direction of the rotation axis of the disc rotation mechanism.

The disc rotation mechanism is positioned with respect to the first base by the same positioning pin as used for the second base. Therefore, substantially the same level of positional precision can be provided for both the first base and the second base.

The optical pickup is rotated in rolling contact with the second base and the second forcing member. This makes it possible to reduce the rotating load.

Only the optical pickup and the disc rotation mechanism, which need to have a certain level of mutual positional precision with certainty, may be held by the first base formed of a material having a high specific gravity, for example, a metal material with little size change. The second base, which does not need to have such a high level of positional precision as the first base, may be formed of a material having a lower specific gravity than that of the first base. In this case, the weight of the entire optical disc apparatus can be reduced to a minimum necessary level.

The optical pickup can be rotatably held in the state where a space is made in the vicinity of the rotating axis of the optical pickup. Therefore, the area inside the optical pickup can be effectively used even in the vicinity of the rotating axis. Thus, the entire area inside the optical pickup including an area in the vicinity of the rotating axis can be used for locating the optical system. This improves the freedom in structuring the optical system. It is also possible to locate the optical system in the entire area including the vicinity of the rotating axis and to reduce the eccentric center of gravity of the optical pickup around the rotating axis.

INDUSTRIAL APPLICABILITY

An optical disc apparatus according to the present invention is suitable to uses in applications in which a large impact force may be applied to the optical pickup, for example, the apparatus may be dropped. An optical disc apparatus according to the present invention is significantly effective in the case where it is highly possible that the apparatus is dropped with no external protection, such as in the case of a mobile phone. The effects of the present invention can be provided at low cost.

The invention claimed is:
1. An optical disc apparatus, comprising:
   a disc rotation mechanism for allowing an optical disc having an information recording face to be placed thereon and rotating the optical disc;
   an optical pickup including an engaging section and irradiating the information recording face with a light beam to perform at least one of information recording and information reproduction;
   a base main body for rotatably supporting the optical pickup and having the disc rotation mechanism;
   a driving source, supported by the base main body, for generating a force for rotating the optical pickup; and a driving force transmission mechanism supported by the base main body, including a worm, and engaged with the engaging section to transmit a driving force of the driving source to the optical pickup, thereby rotating the optical pickup;

wherein a distance between the engaging section and a rotating axis of the optical pickup is longer than a distance between the center of gravity of the optical pickup and the rotating axis of the optical pickup; and the driving force transmission mechanism includes a worm wheel engageable with the worm and driven by the worm, and where the advancing angle of the worm is θ and a static coefficient of friction for the worm is μ, tan θ<μ.

2. The optical disc apparatus of claim 1, wherein:

the base main body includes a base shaft for rotatably holding the optical pickup;

the optical pickup includes a pickup rotating hole for allowing the base shaft to be inserted thereto and having a bottom; and the base main body includes a shaft forcing part for forcing the optical pickup toward the base main body at a general axis of the base shaft in the state where the base shaft is inserted into the pickup rotating hole.

3. The optical disc apparatus of claim 1, wherein the optical pickup includes a weight in an area located opposite to the center of gravity of the optical pickup with respect to the rotating axis.

4. The optical disc apparatus of claim 1, wherein the base main body includes:

a first base including a first regulating part for rotatably supporting the optical pickup and regulating a movement of the optical pickup in a direction of the rotating axis; and a second base including a second regulating part for supporting the driving source and the driving force transmission mechanism and regulating a movement of the engaging section in the direction of the rotating axis.

5. The optical disc apparatus of claim 4, wherein:

the first base includes a base shaft for rotatably supporting the optical pickup and a shaft forcing part;

the optical pickup includes a pickup rotating hole for allowing the base shaft to be inserted thereto and having a bottom; and the shaft forcing part forces the optical pickup toward the first base at a general axis of the base shaft in the state where the base shaft is inserted into the pickup rotating hole.

6. The optical disc apparatus of claim 4, wherein the second base is formed of a material having a lower specific gravity than that of the first base.

7. The optical disc apparatus of claim 1, wherein:

the optical pickup includes a pickup rotating hole outer cylinder projecting on the rotating axis, a pickup rotating hole provided inside the pickup rotating hole outer cylinder, a support boss projecting in the direction of the rotating axis on the opposite side to the pickup rotating hole outer cylinder, and a space provided between the pickup rotating hole outer cylinder and the support boss; and the base main body includes a first base having a support hole for receiving the support boss and a second base having a base shaft insertable into the pickup rotating hole.

8. The optical disc apparatus of claim 7, wherein the optical pickup includes an optical system including a light source, an optical element, and an objective lens; and an optical path of the optical system crosses the space.

9. An optical disc apparatus, comprising:

a disc rotation mechanism for allowing an optical disc having an information recording face to be placed thereon and rotating the optical disc;

an optical pickup including an engaging section and irradiating the information recording face with a light beam to perform at least one of information recording and information reproduction;

a base main body for rotatably supporting the optical pickup and having the disc rotation mechanism;

a driving source, supported by the base main body, for generating a force for rotating the optical pickup; and a driving force transmission mechanism supported by the base main body, including a worm, and engaged with the engaging section to transmit a driving force of the driving source to the optical pickup, thereby rotating the optical pickup;

wherein a distance between the engaging section and a rotating axis of the optical pickup is longer than a distance between the center of gravity of the optical pickup and the rotating axis of the optical pickup;

the base main body includes a base shaft for rotatably holding the optical pickup;

the optical pickup includes a pickup rotating hole for allowing the base shaft to be inserted thereto and having a bottom;

the base main body includes a shaft forcing part for forcing the optical pickup toward the base main body at a general axis of the base shaft in the state where the base shaft is inserted into the pickup rotating hole;

the base shaft has a tip contactable with the bottom of the pickup rotating hole; and the tip of the base shaft has a convexed spherical shape, and the bottom of the pickup rotating hole has a concaved spherical shape.

10. The optical disc apparatus of claim 9, wherein:

the base main body includes an engaging section forcing part for forcing optical pickup at the engaging section or the vicinity thereof toward a main surface of the base main body; and the optical pickup includes a roller contactable with the engaging section forcing part of the base main body and having a rotation axis in a direction perpendicular to the rotating axis of the optical pickup.

11. The optical disc apparatus of claim 9, wherein:

the spherical shape of the bottom of the pickup rotating hole has a radius larger than a radius of the spherical shape of the tip of the base shaft; and the bottom of the pickup rotating hole and the tip of the base shaft contact each other to determine the height of the optical pickup from the base main body.

12. The optical disc apparatus of claim 11, wherein:

the base main body includes a pickup holding section for, when at least one of the optical pickup, the base shaft and the base main body receives an external force, contacting the optical pickup so as to inhibit an axis of the base shaft from being inclined beyond a prescribed range and thus deformed.

13. The optical disc apparatus of claim 12, wherein the optical pickup includes a support boss provided coaxially with the rotating axis and projecting on the opposite side to the pickup rotating hole, and the pickup holding section inhibits the support boss from being inclined beyond a prescribed range and thus deformed.

14. The optical disc apparatus of claim 13, wherein the pickup holding section inhibits the optical pickup from moving away from the base main body beyond a prescribed range.

15. An optical disc apparatus, comprising:
- a disc rotation mechanism for allowing an optical disc having an information recording face to be placed thereon and rotating the optical disc;
- an optical pickup including an engaging section and irradiating the information recording face with a light beam to perform at least one of information recording and information reproduction;
- a base main body for rotatably supporting the optical pickup and having the disc rotation mechanism;
- a driving source, supported by the base main body, for generating a force for rotating the optical pickup; and
- a driving force transmission mechanism supported by the base main body, including a worm, and engaged with the engaging section to transmit a driving force of the driving source to the optical pickup, thereby rotating the optical pickup;
- wherein a distance between the engaging section and a rotating axis of the optical pickup is longer than a distance between the center of gravity of the optical pickup and the rotating axis of the optical pickup;
- wherein the base main body includes:
  - a first base including a first regulating part for rotatably supporting the optical pickup and regulating a movement of the optical pickup in a direction of the rotating axis; and
  - a second base including a second regulating part for supporting the driving source and the driving force transmission mechanism and regulating a movement of the engaging section in the direction of the rotating axis;
- wherein:
- the first base includes a base shaft for rotatably supporting the optical pickup and a shaft forcing part;
- the optical pickup includes a pickup rotating hole for allowing the base shaft to be inserted thereto and having a bottom;
- the shaft forcing part forces the optical pickup toward the first base at a general axis of the base shaft in the state where the base shaft is inserted into the pickup rotating hole; and
- the disc rotation mechanism includes an attaching base face facing a main surface of the first base, and the attaching base face is interposed between the first base and the second base.

* * * * *

UNITED STATES PATENT AND TRADEMARK OFFICE
CERTIFICATE OF CORRECTION

PATENT NO.        : 8,077,562 B2
APPLICATION NO.   : 12/375975
DATED             : December 13, 2011
INVENTOR(S)       : Kozo Ezawa et al.

It is certified that error appears in the above-identified patent and that said Letters Patent is hereby corrected as shown below:

Column 31, line 14, "θand" should read -- θ and --.

Column 32, line 41, "forcing optical pickup" should read
-- forcing the optical pickup --.

Signed and Sealed this
Nineteenth Day of June, 2012

David J. Kappos
*Director of the United States Patent and Trademark Office*